(12) United States Patent
Matsui et al.

(10) Patent No.: US 7,525,919 B2
(45) Date of Patent: Apr. 28, 2009

(54) PACKET COMMUNICATION METHOD WITH INCREASED TRAFFIC ENGINEERING EFFICIENCY

(75) Inventors: Kenichi Matsui, Tokyo (JP); Takeshi Yagi, Saitama (JP); Yuuichi Naruse, Kanagawa (JP); Junichi Murayama, Tokyo (JP); Masaki Kaneda, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 595 days.

(21) Appl. No.: 10/532,636

(22) PCT Filed: Aug. 27, 2004

(86) PCT No.: PCT/JP2004/012375

§ 371 (c)(1), (2), (4) Date: Apr. 21, 2005

(87) PCT Pub. No.: WO2005/022850

PCT Pub. Date: Mar. 10, 2005

(65) Prior Publication Data

US 2006/0050702 A1 Mar. 9, 2006

(30) Foreign Application Priority Data

Sep. 1, 2003 (JP) .............................. 2003-309040
Sep. 5, 2003 (JP) .............................. 2003-314449
Sep. 5, 2003 (JP) .............................. 2003-314479

(51) Int. Cl.
*G06F 11/00* (2006.01)

(52) U.S. Cl. ..................................... 370/238; 370/392

(58) Field of Classification Search ......... 370/229–235, 370/237, 238, 392
See application file for complete search history.

(56) References Cited

U.S. PATENT DOCUMENTS

| 5,317,563 | A | * | 5/1994 | Oouchi et al. ............... 370/232 |
| 6,618,397 | B1 | * | 9/2003 | Huang ........................ 370/474 |
| 6,813,245 | B1 | * | 11/2004 | Furuno ...................... 370/236 |
| 7,023,857 | B1 | * | 4/2006 | Chiussi et al. ........... 370/395.4 |
| 7,058,015 | B1 | * | 6/2006 | Wetherall et al. .......... 370/236 |
| 7,304,942 | B1 | * | 12/2007 | Malladi et al. .............. 370/229 |

(Continued)

FOREIGN PATENT DOCUMENTS

JP           08-037535 A        2/1996

(Continued)

OTHER PUBLICATIONS

"Control Architecture in Optical Burst-Switched WDM Networks" by Yijun Xiong, et al; *IEEE Journal on Selected Areas in Communications*; vol. 18, No. 10, Oct. 2000; pp. 1838.1851.

(Continued)

*Primary Examiner*—Kwang B Yao
*Assistant Examiner*—Kenan Cehic
(74) *Attorney, Agent, or Firm*—Blakely, Sokoloff, Taylor & Zafman LLP

(57) ABSTRACT

When a lower layer address pair of a transferred lower layer frame is counted a predetermined number of times or more, a packet transfer apparatus (2) sends the lower layer address pair to a frame transfer apparatus (3). The frame transfer apparatus (3) counts the transfer frequency of the lower layer frame having the lower layer address pair.

24 Claims, 25 Drawing Sheets

U.S. PATENT DOCUMENTS

| | | | |
|---|---|---|---|
| 2001/0046235 A1* | 11/2001 | Trevitt et al. | 370/412 |
| 2002/0110089 A1* | 8/2002 | Goldshtein et al. | 370/252 |
| 2003/0043802 A1 | 3/2003 | Yazaki et al. | |
| 2003/0086422 A1 | 5/2003 | Klinker et al. | |
| 2003/0088529 A1 | 5/2003 | Klinker et al. | |
| 2003/0088671 A1 | 5/2003 | Klinker et al. | |
| 2004/0114569 A1* | 6/2004 | Naden et al. | 370/351 |
| 2005/0018608 A1* | 1/2005 | Wetherall et al. | 370/235 |
| 2007/0140128 A1* | 6/2007 | Klinker et al. | 370/238 |

FOREIGN PATENT DOCUMENTS

| | | |
|---|---|---|
| JP | 10-070571 A | 3/1998 |
| JP | 2002-111668 A | 4/2002 |

OTHER PUBLICATIONS

Murayama et al., "Development of Tera-bit Super Network (TSN) Technologies", IEICE General Conference, 2003, B-7-81, Mar. 2003.

Murayama et al., "Traffic-Driven Optical IP Networking Architecture", IEICE Transactions on Communications, vol. E86-B, No. 8, p. 2294-2301, Aug. 2003.

Tsujimoto et al., "Evaluation of Optical Cut-Through Schemes in TSN", IEICE General Conference, 2003, B-7-82, Mar. 2003.

Matsui et al., "A Study of Multi-Layer Traffic Engineering for Tera-bit Super Network", IEICE Technical Report, NS2002-316, IN2002-289, p. 297-302, Mar. 2003.

Matsui et al., "A Multi-Layered Traffic Engineering Architecture for the Electronic/Optical Hybrid Network", Communications, Computers and Signal Conference on Publication, vol. 1 p. 293-296, Aug. 2003.

Rosen et al., "Multiprotocol Label Switching Architecture", RFC3031, Internet Engineering Task Force: IETF, Jan. 2001.

Mannie, "Generalized Multi Protocol Label Switching (GMPLS) Architecture", Internet Engineering Task Force: IETF, Internet Draft, May 2003.

Matsui et al., "Design of a cut-through optical path allocation scheme for TSN", IEICE General Conference, 2003, B-7-84, Mar. 2003.

* cited by examiner

| UPPER LAYER DESTINATION ADDRESS | LOWER LAYER DESTINATION ADDRESS | OUTPUT LINK |
|---|---|---|
| IP#5 | CORE#3 | LINK1101 |
| IP#8 | CORE#4 | LINK1105 |
| ⋮ | ⋮ | ⋮ |

FIG. 6

| LOWER LAYER TRANSMISSION SOURCE ADDRESS | LOWER LAYER DESTINATION ADDRESS | COUNTER | TIMER |
|---|---|---|---|
| CORE#1 | CORE#3 | 1102 | 23 |
| CORE#2 | CORE#4 | 0 | 60 |
| ⋮ | ⋮ | ⋮ | ⋮ |

FIG. 7

| LOWER LAYER TRANSMISSION SOURCE ADDRESS | LOWER LAYER DESTINATION ADDRESS | COUNTER | TIMER |
|---|---|---|---|
| CORE#1 | CORE#3 | 444,111,102 | 102 |
| CORE#2 | CORE#3 | 0 | 600 |
| ⋮ | ⋮ | ⋮ | ⋮ |

FIG. 8

| IPv6 FLOW STATISTICAL INFORMATION LIST | | | | 303 |
|---|---|---|---|---|
| TRANSMISSION SOURCE IPv6 | DESTINATION IPv6 | PRIORITY | BAND | |
| IPv6#A | IPv6#B | 3 | 0.5 | |
| IPv6#A | IPv6#C | 3 | 0.5 | |
| IPv6#A | IPv6#D | 1 | 6 | |
| IPv6#A | IPv6#E | 1 | 2 | |
| IPv6#A | IPv6#F | 3 | 0.5 | |
| IPv6#A | IPv6#G | 3 | 0.5 | |
| IPv6#A | IPv6#H | 3 | 0.5 | |
| IPv6#A | IPv6#I | 3 | 0.5 | |
| IPv6#B | IPv6#A | 3 | 0.5 | |
| IPv6#B | IPv6#C | 3 | 0.5 | |
| IPv6#B | IPv6#D | 1 | 4 | |
| IPv6#B | IPv6#E | 1 | 1 | |
| IPv6#B | IPv6#F | 3 | 0.5 | |
| IPv6#B | IPv6#G | 3 | 0.5 | |
| IPv6#B | IPv6#H | 3 | 0.5 | |
| IPv6#B | IPv6#I | 3 | 0.5 | |
| IPv6#C | IPv6#A | 3 | 0.5 | |
| IPv6#C | IPv6#B | 3 | 0.5 | |
| IPv6#C | IPv6#D | 1 | 3 | |
| IPv6#C | IPv6#E | 3 | 0.5 | |
| IPv6#C | IPv6#F | 3 | 0.5 | |
| IPv6#C | IPv6#G | 3 | 0.5 | |
| IPv6#C | IPv6#H | 3 | 0.5 | |
| IPv6#C | IPv6#I | 3 | 0.5 | |
| IPv6#D | IPv6#A | 3 | 0.5 | |
| IPv6#D | IPv6#B | 3 | 0.5 | |
| IPv6#D | IPv6#C | 3 | 0.5 | |
| IPv6#D | IPv6#E | 3 | 0.5 | |
| IPv6#D | IPv6#F | 3 | 0.5 | |
| IPv6#D | IPv6#G | 1 | 2 | |
| IPv6#D | IPv6#H | 2 | 2 | |
| IPv6#D | IPv6#I | 3 | 0.5 | |
| IPv6#E | IPv6#A | 3 | 0.5 | |
| IPv6#E | IPv6#B | 3 | 0.5 | |
| IPv6#E | IPv6#C | 3 | 0.5 | |
| IPv6#E | IPv6#D | 3 | 0.5 | |
| IPv6#E | IPv6#F | 3 | 0.5 | |
| IPv6#E | IPv6#G | 1 | 1 | |
| IPv6#E | IPv6#H | 2 | 1 | |
| IPv6#E | IPv6#I | 3 | 0.5 | |
| IPv6#F | IPv6#A | 3 | 0.5 | |
| IPv6#F | IPv6#B | 3 | 0.5 | |
| IPv6#F | IPv6#C | 3 | 0.5 | |
| IPv6#F | IPv6#D | 3 | 0.5 | |
| IPv6#F | IPv6#E | 3 | 0.5 | |
| IPv6#F | IPv6#G | 1 | 1 | |
| IPv6#F | IPv6#H | 2 | 1 | |
| IPv6#F | IPv6#I | 3 | 0.5 | |
| IPv6#G | IPv6#A | 3 | 0.5 | |
| IPv6#G | IPv6#B | 3 | 0.5 | |
| IPv6#G | IPv6#C | 2 | 4 | |
| IPv6#G | IPv6#D | 3 | 0.5 | |
| IPv6#G | IPv6#E | 3 | 0.5 | |
| IPv6#G | IPv6#F | 3 | 0.5 | |
| IPv6#G | IPv6#H | 3 | 0.5 | |
| IPv6#G | IPv6#I | 3 | 0.5 | |
| IPv6#H | IPv6#A | 3 | 0.5 | |
| IPv6#H | IPv6#B | 3 | 0.5 | |
| IPv6#H | IPv6#C | 2 | 2 | |
| IPv6#H | IPv6#D | 3 | 0.5 | |
| IPv6#H | IPv6#E | 3 | 0.5 | |
| IPv6#H | IPv6#F | 3 | 0.5 | |
| IPv6#H | IPv6#G | 3 | 0.5 | |
| IPv6#H | IPv6#I | 3 | 0.5 | |
| IPv6#I | IPv6#A | 3 | 0.5 | |
| IPv6#I | IPv6#B | 3 | 0.5 | |
| IPv6#I | IPv6#C | 2 | 1 | |
| IPv6#I | IPv6#D | 3 | 0.5 | |
| IPv6#I | IPv6#E | 3 | 0.5 | |
| IPv6#I | IPv6#F | 3 | 0.5 | |
| IPv6#I | IPv6#G | 3 | 0.5 | |
| IPv6#I | IPv6#H | 3 | 0.5 | |

FIG. 13

| IPv6 FLOW STATISTICAL INFORMATION LIST | | | | ~303 |
|---|---|---|---|---|
| TRANSMISSION SOURCE IPv6 | DESTINATION IPv6 | PRIORITY | BAND | |
| IPv6#A | IPv6#D | 1 | 6 | |
| IPv6#B | IPv6#D | 1 | 4 | |
| IPv6#C | IPv6#D | 1 | 3 | |
| IPv6#A | IPv6#E | 1 | 2 | |
| IPv6#D | IPv6#G | 1 | 2 | |
| IPv6#E | IPv6#G | 1 | 2 | |
| IPv6#B | IPv6#E | 1 | 1 | |
| IPv6#F | IPv6#G | 1 | 1 | |
| IPv6#G | IPv6#C | 2 | 4 | |
| IPv6#D | IPv6#H | 2 | 2 | |
| IPv6#E | IPv6#H | 2 | 2 | |
| IPv6#H | IPv6#C | 2 | 2 | |
| IPv6#F | IPv6#H | 2 | 1 | |
| IPv6#I | IPv6#C | 2 | 1 | |
| IPv6#A | IPv6#B | 3 | 0.5 | |
| IPv6#A | IPv6#C | 3 | 0.5 | |
| IPv6#A | IPv6#F | 3 | 0.5 | |
| IPv6#A | IPv6#G | 3 | 0.5 | |
| IPv6#A | IPv6#H | 3 | 0.5 | |
| IPv6#A | IPv6#I | 3 | 0.5 | |
| IPv6#B | IPv6#A | 3 | 0.5 | |
| IPv6#B | IPv6#C | 3 | 0.5 | |
| IPv6#B | IPv6#F | 3 | 0.5 | |
| IPv6#B | IPv6#G | 3 | 0.5 | |
| IPv6#B | IPv6#H | 3 | 0.5 | |
| IPv6#B | IPv6#I | 3 | 0.5 | |
| IPv6#C | IPv6#A | 3 | 0.5 | |
| IPv6#C | IPv6#B | 3 | 0.5 | |
| IPv6#C | IPv6#E | 3 | 0.5 | |
| IPv6#C | IPv6#F | 3 | 0.5 | |
| IPv6#C | IPv6#G | 3 | 0.5 | |
| IPv6#C | IPv6#H | 3 | 0.5 | |
| IPv6#C | IPv6#I | 3 | 0.5 | |
| IPv6#D | IPv6#A | 3 | 0.5 | |
| IPv6#D | IPv6#B | 3 | 0.5 | |
| IPv6#D | IPv6#C | 3 | 0.5 | |
| IPv6#D | IPv6#E | 3 | 0.5 | |
| IPv6#D | IPv6#F | 3 | 0.5 | |
| IPv6#D | IPv6#I | 3 | 0.5 | |
| IPv6#E | IPv6#A | 3 | 0.5 | |
| IPv6#E | IPv6#B | 3 | 0.5 | |
| IPv6#E | IPv6#C | 3 | 0.5 | |
| IPv6#E | IPv6#D | 3 | 0.5 | |
| IPv6#E | IPv6#F | 3 | 0.5 | |
| IPv6#E | IPv6#I | 3 | 0.5 | |
| IPv6#F | IPv6#A | 3 | 0.5 | |
| IPv6#F | IPv6#B | 3 | 0.5 | |
| IPv6#F | IPv6#C | 3 | 0.5 | |
| IPv6#F | IPv6#D | 3 | 0.5 | |
| IPv6#F | IPv6#E | 3 | 0.5 | |
| IPv6#F | IPv6#I | 3 | 0.5 | |
| IPv6#G | IPv6#A | 3 | 0.5 | |
| IPv6#G | IPv6#B | 3 | 0.5 | |
| IPv6#G | IPv6#D | 3 | 0.5 | |
| IPv6#G | IPv6#E | 3 | 0.5 | |
| IPv6#G | IPv6#F | 3 | 0.5 | |
| IPv6#G | IPv6#H | 3 | 0.5 | |
| IPv6#G | IPv6#I | 3 | 0.5 | |
| IPv6#H | IPv6#A | 3 | 0.5 | |
| IPv6#H | IPv6#B | 3 | 0.5 | |
| IPv6#H | IPv6#D | 3 | 0.5 | |
| IPv6#H | IPv6#E | 3 | 0.5 | |
| IPv6#H | IPv6#F | 3 | 0.5 | |
| IPv6#H | IPv6#G | 3 | 0.5 | |
| IPv6#H | IPv6#I | 3 | 0.5 | |
| IPv6#I | IPv6#A | 3 | 0.5 | |
| IPv6#I | IPv6#B | 3 | 0.5 | |
| IPv6#I | IPv6#D | 3 | 0.5 | |
| IPv6#I | IPv6#E | 3 | 0.5 | |
| IPv6#I | IPv6#F | 3 | 0.5 | |
| IPv6#I | IPv6#G | 3 | 0.5 | |
| IPv6#I | IPv6#H | 3 | 0.5 | |

FIG. 14

IPv6 FLOW STATISTICAL INFORMATION LIST — 303

| TRANSMISSION SOURCE IPv6 | DESTINATION IPv6 | PRIORITY | BAND |
|---|---|---|---|
| IPv6#A | IPv6#D | 1 | 6 |
| IPv6#B | IPv6#D | 1 | 4 |
| IPv6#C | IPv6#D | 1 | 3 |
| IPv6#A | IPv6#E | 1 | 2 |
| IPv6#D | IPv6#G | 1 | 2 |
| IPv6#E | IPv6#G | 1 | 2 |
| IPv6#B | IPv6#E | 1 | 1 |
| IPv6#F | IPv6#G | 1 | 1 |
| IPv6#G | IPv6#C | 2 | 4 |
| IPv6#D | IPv6#H | 2 | 2 |
| IPv6#E | IPv6#H | 2 | 2 |
| IPv6#H | IPv6#C | 2 | 2 |
| IPv6#F | IPv6#H | 2 | 1 |
| IPv6#I | IPv6#C | 2 | 1 |
| IPv6#A | IPv6#B | 3 | 0.5 |
| IPv6#A | IPv6#C | 3 | 0.5 |
| IPv6#A | IPv6#F | 3 | 0.5 |
| IPv6#A | IPv6#G | 3 | 0.5 |
| IPv6#A | IPv6#H | 3 | 0.5 |
| IPv6#A | IPv6#I | 3 | 0.5 |
| IPv6#B | IPv6#A | 3 | 0.5 |
| IPv6#B | IPv6#C | 3 | 0.5 |
| IPv6#B | IPv6#F | 3 | 0.5 |
| IPv6#B | IPv6#G | 3 | 0.5 |
| IPv6#B | IPv6#H | 3 | 0.5 |
| IPv6#B | IPv6#I | 3 | 0.5 |
| IPv6#C | IPv6#A | 3 | 0.5 |
| IPv6#C | IPv6#B | 3 | 0.5 |
| IPv6#C | IPv6#E | 3 | 0.5 |
| IPv6#C | IPv6#F | 3 | 0.5 |
| IPv6#C | IPv6#G | 3 | 0.5 |
| IPv6#C | IPv6#H | 3 | 0.5 |
| IPv6#C | IPv6#I | 3 | 0.5 |
| IPv6#D | IPv6#A | 3 | 0.5 |
| IPv6#D | IPv6#B | 3 | 0.5 |
| IPv6#D | IPv6#C | 3 | 0.5 |
| IPv6#D | IPv6#E | 3 | 0.5 |
| IPv6#D | IPv6#F | 3 | 0.5 |
| IPv6#D | IPv6#I | 3 | 0.5 |
| IPv6#E | IPv6#A | 3 | 0.5 |
| IPv6#E | IPv6#B | 3 | 0.5 |
| IPv6#E | IPv6#C | 3 | 0.5 |
| IPv6#E | IPv6#D | 3 | 0.5 |
| IPv6#E | IPv6#F | 3 | 0.5 |
| IPv6#E | IPv6#I | 3 | 0.5 |
| IPv6#F | IPv6#A | 3 | 0.5 |
| IPv6#F | IPv6#B | 3 | 0.5 |
| IPv6#F | IPv6#C | 3 | 0.5 |
| IPv6#F | IPv6#D | 3 | 0.5 |
| IPv6#F | IPv6#E | 3 | 0.5 |
| IPv6#F | IPv6#I | 3 | 0.5 |
| IPv6#G | IPv6#A | 3 | 0.5 |
| IPv6#G | IPv6#B | 3 | 0.5 |
| IPv6#G | IPv6#D | 3 | 0.5 |
| IPv6#G | IPv6#E | 3 | 0.5 |
| IPv6#G | IPv6#F | 3 | 0.5 |
| IPv6#G | IPv6#H | 3 | 0.5 |
| IPv6#G | IPv6#I | 3 | 0.5 |
| IPv6#H | IPv6#A | 3 | 0.5 |
| IPv6#H | IPv6#B | 3 | 0.5 |
| IPv6#H | IPv6#D | 3 | 0.5 |
| IPv6#H | IPv6#E | 3 | 0.5 |
| IPv6#H | IPv6#F | 3 | 0.5 |
| IPv6#H | IPv6#G | 3 | 0.5 |
| IPv6#H | IPv6#I | 3 | 0.5 |
| IPv6#I | IPv6#A | 3 | 0.5 |
| IPv6#I | IPv6#B | 3 | 0.5 |
| IPv6#I | IPv6#D | 3 | 0.5 |
| IPv6#I | IPv6#E | 3 | 0.5 |
| IPv6#I | IPv6#F | 3 | 0.5 |
| IPv6#I | IPv6#G | 3 | 0.5 |
| IPv6#I | IPv6#H | 3 | 0.5 |

WAVELENGTH PATH CANDIDATE LIST — 308

| TRANSMISSION SOURCE EN | DESTINATION EN | PRIORITY | BAND |
|---|---|---|---|
| EN105 | EN112 | 1 | 10 |
| EN105 | EN112 | 1 | 5 |
| EN112 | EN119 | 1 | 8 |
| EN119 | EN105 | 2 | 7 |
| EN112 | EN119 | 2 | 8 |
| EN105 | EN119 | 3 | 4.5 |
| EN112 | EN105 | 3 | 4.5 |
| EN119 | EN112 | 3 | 4.5 |
| EN119 | EN105 | 3 | 3 |
| EN105 | EN112 | 3 | 1.5 |
| EN112 | EN119 | 3 | 1.5 |

FIG. 15

| WAVELENGTH PATH CANDIDATE LIST | | | | ~308 |
|---|---|---|---|---|
| TRANSMISSION SOURCE EN | DESTINATION EN | PRIORITY | BAND | |
| EN105 | EN112 | 1 | 10 | |
| EN112 | EN119 | 1 | 8 | |
| EN105 | EN112 | 1 | 5 | |
| EN112 | EN119 | 2 | 8 | |
| EN119 | EN105 | 2 | 7 | |
| EN105 | EN119 | 3 | 4.5 | |
| EN112 | EN105 | 3 | 4.5 | |
| EN119 | EN112 | 3 | 4.5 | |
| EN119 | EN105 | 3 | 3 | |
| EN105 | EN112 | 3 | 1.5 | |
| EN112 | EN119 | 3 | 1.5 | |

FIG. 16

| WAVELENGTH PATH CANDIDATE LIST | | | | ~308 |
|---|---|---|---|---|
| TRANSMISSION SOURCE EN | DESTINATION EN | PRIORITY | BAND | |
| EN105 | EN112 | 1 | 10 | → SETTING OK |
| EN112 | EN119 | 1 | 8 | → SETTING OK |
| EN105 | EN112 | 1 | 5 | → SETTING NG, NO WAVELENGTH |
| EN112 | EN119 | 2 | 8 | → SETTING NG, NO WAVELENGTH |
| EN119 | EN105 | 2 | 7 | → SETTING OK |
| EN105 | EN119 | 3 | 4.5 | → SETTING NG, NO CONNECTION INTERFACE |
| EN112 | EN105 | 3 | 4.5 | → SETTING NG, NO CONNECTION INTERFACE |
| EN119 | EN112 | 3 | 4.5 | → SETTING NG, NO CONNECTION INTERFACE |
| EN119 | EN105 | 3 | 3 | → SETTING NG, NO CONNECTION INTERFACE |
| EN105 | EN112 | 3 | 1.5 | → SETTING NG, NO CONNECTION INTERFACE |
| EN112 | EN119 | 3 | 1.5 | → SETTING NG, NO CONNECTION INTERFACE |

FIG. 17

PACKET COMMUNICATION METHOD WITH INCREASED TRAFFIC ENGINEERING EFFICIENCY

The present patent application is a non-provisional application of International Application No. PCT/JP2004/012375, filed Aug. 27, 2004.

TECHNICAL FIELD

The present invention relates to a traffic engineering technique to assign a route in accordance with traffic demand.

BACKGROUND ART

Generally, in a packet transfer network system, the transfer frequency of frames transferred between a transmission source packet transfer apparatus and a destination packet transfer apparatus is counted, and a route is assigned in accordance with the transfer frequency. With this traffic engineering technique, the traffic carrying efficiency is increased. In the conventional traffic engineering technique, to reduce the transfer load and path management load on the packet transfer apparatus and increase the transfer quality of the network, the frame transfer frequency is counted by a frame transfer apparatus which connects all packet transfer apparatuses and the route between the packet transfer apparatuses is reassigned in accordance with the traffic load of the frame transfer apparatus. With this method, the packet transfer apparatus can distribute the traffic load without monitoring the frame transfer frequency. The frame transfer apparatus has a table in which the addresses between all packet transfer apparatuses are recorded to count the frame transfer frequency between all the packet transfer apparatuses. The entry of this table is provisionally set by the operator (e.g., references 1, 2, 3, 4, and 5 to be described later).

Conventionally, a technique is known, which builds a logical connectionless packet transfer network in which a router exchanges packets by using IP on a connection network such as a photonic network including a wavelength path multiple link and wavelength path switching node. To transfer traffic in the network formed by this technique, routing of connection of the connection network and flow assignment of the connectionless packet transfer network to the connection need to be done.

The first prior art to execute such routing and flow assignment is GMPLS (Generalized Multi Protocol Label Switching) (e.g., references 6 and 7). For routing and flow assignment in GMPLS, first, connection routing of the connection network is permanently determined. After that, flow assignment of the connectionless packet transfer network for the determined connection is calculated.

The second prior art to execute such routing and flow assignment is a terabit-class super-network (e.g., references 1 and 2). For currently proposed routing and flow assignment in the terabit-class super-network, connection routing of the connection network and flow assignment of the connectionless packet transfer network for the connection are calculated simultaneously (e.g., references 4, 5, and 8 to be described later).

Conventionally, a technique is known, which builds a logical connectionless packet transfer network in which a router exchanges packets by using IP on a connection network such as a photonic network including a wavelength path multiple link and wavelength path switching node. To transfer traffic in the network formed by this technique, a wavelength path serving as connection of the connection network must be set.

A prior art for this is a terabit-class super-network. The terabit-class super-network includes a PE (Provider Edge) router which connects the terabit-class super-network and an external network outside it, an electric P (Provider) router which connects PEs by an IPv6 (Internet Protocol Version6) layer, and an optical P (Provider) router which connects the PE router and electric P router by a wavelength layer. Currently proposed connection setting in the terabit-class super-network is done by setting a wavelength path passing through the optical P router between the PE router, electric P router, and PE router and causing each router to transfer an IPv6 packet flowing on the wavelength path (references 1 and 2). In addition, a wavelength path which does not pass through the electric P router is also set between PE routers with a number of traffic requests (reference 8). FIG. 30 is a block diagram showing the arrangement of a conventional terabit-class super-network. Referring to FIG. 30, reference numeral 701 denotes a PE router; 702, an electric P router; 703, an optical P router; and 704, an external network connected to the PE router 701.

The above-described references will be described below.

[Reference 1] Junichi Murayama, Takeshi Yagi, Takahiro Tsujimoto, Toshiyuki Sakurai, Kenichi Matsui, Junichi Sumimoto, Masaki Kaneda, Kazuhiro Matsuda, and Hiroshi Ishii, "Development of Tera-bit Super Network (TSN) Technoloajes", IEICE General Conference, 2003, B-7-81, March 2003.

[Reference 2] Junichi Murayama, Takahiro Tsujimoto, Kenichi Matsui, Kazuhiro Matsuda, and Hiroshi Ishii, "Traffic-Driven Optical IP Networking Architecture", IEICE Transactions on Communications, Vol. E86-B, NO. 8, p. 2294-2301, August 2003.

[Reference 3] Takahiro Tsujimoto, Takeshi Yagi, Junichi Murayama, Kazuhiro Matsuda, and Hiroshi Ishii, "Evaluation of Optical Cut-Through Schemes in TSN", IEICE General Conference, 2003, B-7-82, March 2003.

[Reference 4] Kenichi Matsui, Toshiyuki Sakurai, Masaki Kaneda, Junichi Murayama, and Hiroshi Ishii, A Study of Multi-Layer Traffic Enaineering for Tera-bit Super Network", IEICE Technical Report, NS2002-316, IN2002-289, p. 297-302, March 2003.

[Reference 5] Matsui, Sakurai, Kaneda, Murayama, and Ishii, "A Multi-Layered Traffic Engineering Architecture for the Electronic/Optical Hybrid Network", Communications, Computers and Signal Processing, 2003. PACRIM. 2003 IEEE Pacific Rim Conference on Publication, Vol. 1, p. 293-296, August 2003.

[Reference 6] E. Rosen et al, "Multiprotocol Label Switching Architecture", RFC3031, Internet Engineering Task Force: IETF, January 2001.

[Reference 7] E. Mannie, "Generalized Multi-Protocol Label Switching (GMPLS) Architecture", Internet Engineering Task Force: IETF, Internet Draft, draft-irft-ccamp-gmpls-architecture-07.txt, May 2003.

[Reference 8] Kenichi Matsui, Toshiyuki Sakurai, Masaki Kaneda, Junichi Murayama, and Hiroshi Ishii, Design of a cut-through optical path allocation scheme for TSN", IEICE General Conference, 2003, B-7-84, March 2003.

DISCLOSURE OF INVENTION

Problem to be Solved by the Invention

However, in the conventional packet transfer network system, count is executed between all the packet transfer apparatuses. To do this, the entries of addresses of all packet transfer apparatuses must be added to the table of the frame transfer apparatus. The number of entries must be twice the number of packet transfer apparatuses to be measured. When the network scale increases, the number of entries of the table of the frame transfer apparatus also increases, resulting in an increase in route management load of the frame transfer apparatus. When the route management load of the frame transfer apparatus increases, the processing speed in traffic engineering decreases, and the transfer load of the frame transfer apparatus is overloaded. As a consequence, the transfer performance of the frame transfer apparatus decreases.

In the first technique of executing routing and flow assignment, routing of the connection network is determined permanently, and then, the combination of flows of the connectionless packet transfer network is calculated. Even when the combination of flows of an effective connectionless packet transfer network with, e.g., a wide band and high priority is calculated, the connection cannot be set if the connection between connectionless packet communication terminals necessary for transmitting the flow combination is not present in the already permanently determined routing of the connection network. Hence, the network cannot efficiently be used.

In connection routing and flow assignment method currently proposed for the second technique of executing routing and flow assignment, to implement connection routing and efficient resource assignment of a connection network in accordance with the band required by the connectionless packet transfer network, routing to the connection network and flow combination of the connectionless packet transfer network are calculated simultaneously. Hence, the network resource can efficiently be used. However, if the connection routing and flow combination are simultaneously calculated, the number of combinations of routing and flow tremendously increases as the network scale becomes large. Hence, since the calculation time also explosively increases, routing in the network scale to practically be used cannot be calculated in a practical time.

In the terabit-class super-network, the PE router and electric P router are connected by a uppermost connection. When IPv6 packets from the PE router to all PE routers in the network concentrates to the electric P router, or IPv6 packets passing through electric P routers concentrates to a certain electric P router, congestion may occur in the electric P router, and the communication quality may degrade. In the conventional method, hence, PE routers with many traffic requests are connected directly by an optical path by cut-through without intervening the electric P router. Such an optical path will be referred to as a cut-through optical path. However, when the network scale becomes large, the number of connection interfaces held by one PE router is much smaller than the number of PE routers arranged in the network. Hence, PE routers with many traffic requests cannot always be connected by a cut-through optical path.

The present invention has been made to solve the above-described problems, and has as its object to provide a packet communication method capable of increasing the efficiency of traffic engineering.

It is another object of the present invention to provide a packet communication method which can calculate and set routing of a connection network and optimum flow combination of a connectionless packet transfer network simultaneously in a practical short time on the basis of the traffic band and priority of the connectionless packet transfer network in order to execute connection routing of the connection network and efficiently resource assignment in an actual network in accordance with the band required by the connectionless packet transfer network.

It is still another object of the present invention to provide a packet communication method which increases the number of cut-through optical paths settable in a network.

Means of Solution to the Problems

According to the present invention, there is provided a packet communication method using a plurality of packet transfer apparatuses which are connected to a network and transfer a lower layer frame containing an encapsulated upper layer packet, at least one frame transfer apparatus which mediates transfer of the lower layer frame between the packet transfer apparatuses through the network, and a network control server which is connected to the packet transfer apparatuses and the frame transfer apparatus and controls a communication route of the lower layer frame in the network by giving an instruction to the packet transfer apparatuses and the frame transfer apparatus, wherein the packet transfer apparatus comprises an extraction procedure which extracts, from the received lower layer frame, a lower layer address pair including a transmission source address and destination address of a lower layer, a first registration procedure which registers a sending destination of the received lower layer frame in a first table for each corresponding destination address, a first counter procedure which counts, for each type of lower layer address pair, a quantity of the lower layer address pair extracted by the extraction procedure, and a first transmission procedure which transmits, to the frame transfer apparatus, first information representing the lower layer address pair counted by the first counter procedure beyond a predetermined threshold value within a predetermined time, the frame transfer apparatus comprises a second registration procedure which registers a transfer destination of the received lower layer frame in a second table for each destination address contained in the lower layer frame, a second counter procedure which counts a quantity of the transferred lower layer frame for each type of lower layer address pair contained in the first information received from the packet transfer apparatus, and a second transmission procedure which transmits, to the network control server, second information about the lower layer address pair counted by the second counter procedure beyond a predetermined threshold value within a predetermined time, and the network control server comprises a calculation procedure which, upon receiving the second information, extracts the transmission source address and destination address from the second information and executes calculation to optimize the communication route in the network between the transmission source address and the destination address, and a change procedure which changes registration of the sending destination of the lower layer frame registered in the first table and second table on the basis of the calculation result.

In the packet communication method of the present invention, the packet transfer apparatus comprises an extraction procedure which extracts, from the received lower layer frame, a lower layer address pair including a transmission source address and destination address of a lower layer, a counter procedure which counts, for each type of lower layer address pair, a quantity of the lower layer address pair extracted by the extraction procedure, and a transmission procedure which transmits, to the frame transfer apparatus, first information representing the lower layer address pair counted by the counter procedure beyond a predetermined threshold value within a predetermined time.

In the packet communication method of the present invention, in transmitting the first information to the frame transfer apparatus, the transmission procedure transmits information about the destination address contained in the frame information and a destination address of an upper layer corresponding to the destination address to the transmission source address of the lower layer address pair contained in the first information.

In the packet communication method of the present invention, the frame transfer apparatus comprises a counter procedure which counts a quantity of the transferred lower layer frame for each type of lower layer address pair which is instructed by the packet transfer apparatus to count, and a transmission procedure which transmits, to the network control server, second information representing the lower layer address pair counted by the counter procedure beyond a predetermined threshold value within a predetermined time.

In the packet communication method of the present invention, the frame transfer apparatus further comprises a count processing procedure which deletes, from the count, an entry of an arbitrary lower layer address pair whose count value does not increase in a predetermined time.

In the packet communication method of the present invention, the network control server comprises a calculation procedure which, upon receiving second information representing an arbitrary transmission source address and destination address from the frame transfer apparatus, executes calculation to optimize the communication route in the network between the transmission source address and the destination address, and a change procedure which issues an instruction to change a sending destination of the lower layer frame to the packet transfer apparatus and frame transfer apparatus included between the transmission source address and the destination address on the basis of the calculation result.

According to the present invention, there is also provided a packet communication method comprising, in a connectionless packet transfer network which is logically build on a connection network comprising a transmission link having a connection multiplex transmission function and a connection switch node having a connection switching function by adding, as a terminal function unit, a connectionless packet transfer node serving as the frame transfer apparatus and a connectionless packet communication terminal serving as the packet transfer apparatus to the connection network, when connection arrangement is to be executed in accordance with a traffic band and traffic priority of the connectionless packet transfer network, a notification procedure which records statistical information containing a band and priority for each flow defined by a pair of the transmission source address and destination address for the packet transmitted/received in the connectionless packet communication terminal and notifies a traffic control apparatus serving as the network control server of the recorded statistical information, and a flow list creation procedure which causes the traffic control apparatus to create a flow list in which information containing the transmission source address, destination address, priority, and band is registered for each flow, on the basis of the statistical information sent from the connectionless packet communication terminal.

The packet communication method of the present invention further comprises a flow list sorting procedure which sorts the flow list in descending order of priority and sorts flows with the same priority in descending order of band, and a connection candidate list creation procedure which, assuming that a connection is set between a transmission source connectionless packet communication terminal and a destination connectionless packet communication terminal of each flow registered in the sorted flow list, creates a connection candidate list by assigning a connection candidate for all flows sequentially from an uppermost flow in the flow list.

In the packet communication method of the present invention, the connection candidate list creation procedure creates the connection candidate list by assigning not less than one flow having the same transmission source connectionless packet communication terminal, the same destination connectionless packet communication terminal, and the same priority to the same connection candidate without making a sum of bands exceed a capacity of the connection candidate and determining the priority and band of the connection candidate on the basis of the priority and the sum of the bands of the assigned flows.

The packet communication method of the present invention further comprises a connection candidate list sorting procedure which sorts the connection candidate list in descending order of priority and sorts connection candidates with the same priority in descending order of band, and a reservation procedure which reserves a connection interface of the connectionless packet communication terminal for all connection candidates contained in the sorted connection candidate list sequentially from an uppermost connection candidate in the sorted connection candidate list.

The packet communication method of the present invention further comprises a selection procedure which selects, on the basis of the connection candidate list sorted by the connection candidate list sorting procedure, a connection requiring no setting from a connection solution list in which connections to be set are registered, a comparison procedure which sets, as a connection candidate as a processing target, a connection candidate for which reservation is possible in the sorted connection candidate list and compares the priority and band of the connection candidate as the processing target with those of the selected connection, a connection solution list creation/update procedure which, when the priority and band of the connection candidate as the processing target are more than those of the selected connection, excludes the connection candidate as the processing target from the connection candidate list and adds the connection candidate as the processing target to the connection solution list, and excludes the selected connection from the connection solution list and adds the selected connection to the connection candidate list, and a taboo connection list registration procedure which, when the priority and band of the connection candidate as the processing target are not more than those of the selected connection, registers the connection candidate as the processing target in a taboo connection list, wherein the comparison procedure sets, of the connection candidates for which reservation is possible, an uppermost connection candidate which is not registered in the taboo connection list as the connection candidate as the processing target.

The packet communication method of the present invention further comprises a selection procedure which selects, on the basis of the connection candidate list sorted by the connection candidate list sorting procedure, a connection requiring no setting from a connection solution list in which connections to be set are registered, a comparison procedure which sets, as a connection candidate as a processing target, a connection candidate for which reservation is possible in the sorted connection candidate list and compares the priority and band of the connection candidate as the processing target with those of the selected connection, a connection solution list creation/update procedure which, when the priority and band of the connection candidate as the processing target are more than those of the selected connection, excludes the connection candidate as the processing target from the connection candidate list and adds the connection candidate as the processing target to the connection solution list, and excludes the selected connection from the connection solution list and adds the selected connection to the connection candidate list, a taboo connection list registration procedure which records the connection candidate as the processing target in a taboo connection list together with the current number of times of execution of the comparison procedure, and a taboo connection list delete procedure which deletes, from the taboo connection list, a connection candidate recorded together with the number of times of execution which is smaller than the current number of times of execution of the comparison procedure by not less than a predetermined number, wherein the comparison procedure sets, of the connection candidates for which reservation is possible, an uppermost connection candidate which is not registered in the taboo connection list as the connection candidate as the processing target.

The packet communication method of the present invention further comprises a route calculation procedure which calculates a route when the uppermost connection in the connection solution list between the transmission source connectionless packet communication terminal and the destination connectionless packet communication terminal, a connection setting procedure which, when a transmission resource necessary for transmitting the uppermost connection can be ensured in a transmission link on the calculated route, controls the switching function of the connection switch node to set the uppermost connection, controls the transmission function of the transmission source connectionless packet communication terminal of the flow to transmit the flow assigned to the uppermost connection by using the connection, and excludes the uppermost connection from the connection solution list, and a connection solution list delete procedure which, when the transmission resource cannot be ensured, excludes the uppermost connection from the connection solution list and adds the uppermost connection to the connection candidate list.

In the packet communication method of the present invention, when the connection solution list is empty, when the connection interface cannot be reserved for any of the connection candidates registered in the connection candidate list, or when the transmission resource cannot be ensured for any of the connections registered in the connection solution list, one of a series of procedures including the flow list sorting procedure, the connection candidate list creation procedure, the connection candidate list sorting procedure, the reservation procedure, the selection procedure, the comparison procedure, the connection solution list creation/update procedure, the taboo connection list registration procedure, the route calculation procedure, the connection setting procedure, and the connection solution list delete procedure and a series of procedures including the flow list sorting procedure, the connection candidate list creation procedure, the connection candidate list sorting procedure, the reservation procedure, the selection procedure, the comparison procedure, the connection solution list creation/update procedure, the taboo connection list registration procedure, the taboo connection list delete procedure, the route calculation procedure, the connection setting procedure, and the connection solution list delete procedure is ended.

The packet communication method of the present invention further comprises a notification interval setting procedure which causes the traffic control apparatus to set a notification interval of the statistical information for the connectionless packet communication terminal, wherein the notification procedure records the statistical information for each flow for the received packet at the set notification interval and notifies the traffic control apparatus of the statistical information, and the flow list creation procedure updates the flow list on the basis of the statistical information sent from the connectionless packet communication terminal.

The packet communication method of the present invention further comprises a threshold value setting procedure which causes the traffic control apparatus to set a threshold value of the band for each flow for the connectionless packet communication terminal, wherein the notification procedure records the statistical information for each flow for the received packet, and when the band of the recorded flow exceeds the set threshold value, notifies the traffic control apparatus of the statistical information of the flow whose band exceeds the threshold value, and the flow list creation procedure updates the flow list on the basis of the statistical information sent from the connectionless packet communication terminal.

The packet communication method of the present invention further comprises, in a connectionless packet transfer network which is logically build on a connection network comprising a transmission link having a connection multiplex transmission function and a connection switch node having a connection switching function by adding, as a terminal function unit, a connectionless packet transfer node serving as the frame transfer apparatus and a connectionless packet communication terminal serving as the packet transfer apparatus to the connection network, when communication is to be executed between the connectionless packet communication terminals, a transfer node selection procedure which selects, as a connection setting target, a connectionless packet transfer node for which the number of connection switch nodes arranged between the connectionless packet transfer node and a destination connectionless packet communication terminal to receive a packet is minimum, a first connection setting procedure which causes a control apparatus serving as the network control server to control the connection switch node to set a first connection between a transmission source connectionless packet communication terminal to transmit the packet and the connectionless packet transfer node as the setting target, and a second connection setting procedure which causes the control apparatus to control the connection switch node to set a second connection between the connectionless packet transfer node as the setting target and the destination connectionless packet communication terminal.

The packet communication method of the present invention further comprises a transmission setting procedure which causes the control apparatus to control the transmission source connectionless packet communication terminal to transmit the packet from the transmission source connectionless packet communication terminal to the destination connectionless packet communication terminal by using the first connection, and a transfer setting procedure which causes the control apparatus to control the connectionless packet transfer node as the setting target to transfer, to the second connection, the packet from the transmission source connectionless packet communication terminal to the destination connectionless packet communication terminal.

The packet communication method of the present invention further comprises a first transfer node selection procedure which selects, as a first connection setting target, a connectionless packet transfer node for which the number of connection switch nodes arranged between the connectionless packet transfer node and a transmission source connectionless packet communication terminal to transmit a packet is minimum, a second transfer node selection procedure which selects, as a second connection setting target, a connectionless packet transfer node for which the number of connection switch nodes arranged between the connectionless packet transfer node and a destination connectionless packet communication terminal to receive the packet is minimum, a first connection setting procedure which causes a control apparatus serving as the network control server to control the connection switch node to set a first connection between the connectionless packet transfer node as the first setting target and the connectionless packet transfer node as the second setting target, a second connection setting procedure which causes the control apparatus to control the connection switch node to set a second connection between the transmission source connectionless packet communication terminal and the connectionless packet transfer node as the first setting target, and a third connection setting procedure which causes the control apparatus to control the connection switch node to set a third connection between the connectionless packet transfer node as the second setting target and the destination connectionless packet communication terminal.

The packet communication method of the present invention further comprises a transmission setting procedure which causes the control apparatus to control the transmission source connectionless packet communication terminal to transmit the packet from the transmission source connectionless packet communication terminal to the destination connectionless packet communication terminal by using the second connection, a first transfer setting procedure which causes the control apparatus to control the connectionless packet transfer node as the first setting target to transfer, to the first connection, the packet from the transmission source connectionless packet communication terminal to the destination connectionless packet communication terminal, and a second transfer setting procedure which causes the control apparatus to control the connectionless packet transfer node as the second setting target to transfer, to the third connection, the packet from the transmission source connectionless packet communication terminal to the destination connectionless packet communication terminal.

The packet communication method of the present invention further comprises a first transfer node selection procedure which selects, as a first connection setting target, a connectionless packet transfer node in a first area to which a transmission source connectionless packet communication terminal to transmit a packet belongs, a second transfer node selection procedure which selects, as a second connection setting target, a connectionless packet transfer node in a second area to which a destination connectionless packet communication terminal to receive the packet belongs, a third transfer node selection procedure which selects, as a third connection setting target, a connectionless packet transfer node for which the number of connection switch nodes arranged between the connectionless packet transfer node and the transmission source connectionless packet communication terminal is minimum, a fourth transfer node selection procedure which selects, as a fourth connection setting target, a connectionless packet transfer node for which the number of connection switch nodes arranged between the connectionless packet transfer node and the destination connectionless packet communication terminal is minimum, a first connection setting procedure which causes a control apparatus serving as the network control server to control the connection switch node to set a first connection between the connectionless packet transfer node as the first setting target and the connectionless packet transfer node as the second setting target, a second connection setting procedure which causes the control apparatus to control the connection switch node to set a second connection between the transmission source connectionless packet communication terminal and the connectionless packet transfer node as the third setting target, a third connection setting procedure which causes the control apparatus to control the connection switch node to set a third connection between the connectionless packet transfer node as the third setting target and the connectionless packet transfer node as the first setting target, a fourth connection setting procedure which causes the control apparatus to control the connection switch node to set a fourth connection between the connectionless packet transfer node as the fourth setting target and the destination connectionless packet communication terminal, and a fifth connection setting procedure which causes the control apparatus to control the connection switch node to set a fifth connection between the connectionless packet transfer node as the second setting target and the connectionless packet transfer node as the fourth setting target.

The packet communication method of the present invention further comprises a transmission setting procedure which causes the control apparatus to control the transmission source connectionless packet communication terminal to transmit the packet from the transmission source connectionless packet communication terminal to the destination connectionless packet communication terminal by using the second connection, a first transfer setting procedure which causes the control apparatus to control the connectionless packet transfer node as the third setting target to transfer, to the third connection, the packet from the transmission source connectionless packet communication terminal to the destination connectionless packet communication terminal, a second transfer setting procedure which causes the control apparatus to control the connectionless packet transfer node as the first setting target to transfer, to the first connection, the packet from the transmission source connectionless packet communication terminal to the destination connectionless packet communication terminal, a third transfer setting procedure which causes the control apparatus to control the connectionless packet transfer node as the second setting target to transfer, to the fifth connection, the packet from the transmission source connectionless packet communication terminal to the destination connectionless packet communication terminal, and a fourth transfer setting procedure which causes the control apparatus to control the connectionless packet transfer node as the fourth setting target to transfer, to the fourth connection, the packet from the transmission source connectionless packet communication terminal to the destination connectionless packet communication terminal.

In the packet communication method of the present invention, the connectionless packet transfer node as the third setting target and the connectionless packet transfer node as the first setting target, which are present in the first area, are connected through a plurality of connectionless packet transfer nodes and connections present in the first area, and the connectionless packet transfer node as the fourth setting target and the connectionless packet transfer node as the second setting target, which are present in the second area, are connected through a plurality of connectionless packet transfer nodes and connections present in the second area.

The packet communication method of the present invention further comprises a notification procedure which records, as statistical information, a band of each flow defined by a pair of the transmission source address and destination address for the packet transmitted/received in the connectionless packet transfer node and notifies the control apparatus of the recorded statistical information, and a flow list creation procedure which causes the control apparatus to create a flow list in which information containing the transmission source address, destination address, and band is registered for each flow, on the basis of the statistical information sent from the connectionless packet transfer node, wherein when a connectionless packet transfer node for which a sum of bands of pass flows exceeds a predetermined threshold value is detected by the flow list in setting the connection, a connection which does not pass through the connectionless packet transfer node is set.

EFFECT OF THE INVENTION

According to the present invention, for a lower layer frame having a lower layer address pair counted a predetermined number of times or more in the packet transfer apparatus, the transfer frequency is counted in the frame transfer apparatus. Hence, the quantity of lower layer address pair to be monitored can be suppressed to minimum and necessary. As a result, the traffic engineering efficiency can be increased.

According to the present invention, each connectionless packet communication terminal in the connectionless packet transfer network records the statistical information of flow and notifies the traffic control apparatus of it. The traffic control apparatus notifies and integrates the sent information to create a flow list. With this arrangement, the state of flow in the entire connectionless packet transfer network can efficiently be grasped. As a result, such traffic engineering is possible that calculation and setting of efficient connection routing in a connection network can be done in a practical short time to efficiently store the band required by the connectionless packet transfer network when a logical connectionless packet transfer network is build on the connection network. Hence, the transfer capacity of the connectionless packet transfer network in the real scale can economically be increased.

The flow list is sorted in order of priority. Next, sorting is executed for each priority in order of band. A connection candidate is assigned sequentially from the uppermost band of the list, thereby creating the connection candidate list. Hence, flow assignment to connection can be executed while maximizing the two values, i.e., priority and band.

One or more flows having the same transmission source connectionless packet communication terminal, the same destination connectionless packet communication terminal, and the same priority are assigned to the same connection candidate without making the sum of bands exceed the capacity of connection candidate. Hence, routing of the connection network and the number of combinations of connectionless packet transfer networks can be reduced.

The connection candidate list is sorted first in descending order of priority, and the connection candidates are sorted for each priority in descending order of band. Reservation of the connection interface of the connectionless packet communication terminal is executed for all connection candidates in the connection candidate list sequentially from the uppermost connection candidate. The uppermost connection candidate for which reservation was possible can be regarded as a connection solution to be set. Hence, the connection solution can be determined while maximizing the two values, i.e., priority and band.

A connection requiring no setting is selected from the connection solution list in which connections to be set are registered, a connection candidate for which reservation is possible is set as a connection candidate as a processing target, and the priority and band of the connection candidate as the processing target are compared with those of the selected connection. When the priority and band of the connection candidate as the processing target are more than those of the selected connection, the connection candidate as the processing target is excluded from the connection candidate list and added to the connection solution list, and the selected connection is excluded from the connection solution list and added to the connection candidate list. Hence, the most effective connection solution can be found by repeatedly evaluating while changing the combination of a number of connection solutions. In evaluation, connection routing is not evaluated simultaneously. As compared to the second prior art, routing of the connection network and the number of combinations of flows of the connectionless packet transfer networks can be decreased, and the calculation amount can be decreased. When a taboo connection list is used, a connection candidate which has been evaluated once can be prevented from being evaluated again. Hence, evaluation of a connection candidate whose priority and band do not improve can be avoided. The probability of obtaining an optimum connection solution by a small calculation amount can be increased, and the calculation amount can be reduced. That is, both calculation of an optimum combination of connections and reduction of calculation amount can be implemented.

The connection candidate as the processing target is registered in a taboo connection list together with the current number of times of execution of the comparison procedure. A connection candidate recorded together with the number of times of execution which is smaller than the current number of times of execution of the comparison procedure by a predetermined number or more is deleted from the taboo connection list. With this arrangement, a connection candidate for which a time has elapsed after it is recorded in the taboo connection list can be deleted from the taboo connection list and set as the connection candidate as the processing target again. In addition, since the connection candidate which is recorded together with the number of times of execution of the comparison procedure smaller than the current number of times of execution of comparison processing by a predetermined number or more is deleted from the taboo connection list, the increase in capacity of the taboo connection list can be suppressed.

The method further comprises a route calculation procedure which calculates a route when the uppermost connection in the connection solution list between the transmission source connectionless packet communication terminal and the destination connectionless packet communication terminal, a connection setting procedure which, when a transmission resource necessary for transmitting the uppermost connection can be ensured in a transmission link on the calculated route, controls the switching function of the connection switch node to set the uppermost connection, controls the transmission function of the transmission source connectionless packet communication terminal of the flow to transmit the flow assigned to the uppermost connection by using the connection, and excludes the uppermost connection from the connection solution list, and a connection solution list delete procedure which, when the transmission resource cannot be ensured, excludes the uppermost connection from the connection solution list and adds the uppermost connection to the connection candidate list. Routing is calculated to set for only a connection to which priority should be given of the optimum connection combinations. For the remaining connections, no solution is determined, and routing is determined partially to calculate an optimum combination again. For this reason, the problem of the first prior art that the network cannot efficiency be used because all routings are determined at once, and no connection capable of transmitting optimum flow assignment can be set can be avoided.

The traffic control apparatus sets the notification interval of statistical information for the connectionless packet communication terminal, thereby appropriately controlling the notification interval. With this arrangement, an optimum network utilization efficiency can be maintained by following the moderate variation in traffic band while suppressing the load on the traffic control apparatus and connectionless packet communication terminal.

The traffic control apparatus sets the threshold value of the band for each flow for the connectionless packet communication terminal. When the traffic abruptly varies, the statistical information is sent immediately regardless of the notification interval. Hence, an optimum network utilization efficiency can be maintained by following the abrupt variation in traffic band.

According to the present invention, a connectionless packet transfer node (connectionless packet transfer node closest to the destination connectionless packet communication terminal) for which the number of connection switch nodes arranged between the connectionless packet transfer node and a destination connectionless packet communication terminal is minimum is selected as a connection setting target. With this arrangement, the number of connection interfaces which can be used by cut-through paths can be increased. As a result, the number of cut-through paths can be increased. Hence, congestion of a connectionless packet transfer node through which a packet would have passed unless the cut-through path is set can be avoided. In the present invention, even when the number of connectionless packet communication terminals of the connectionless packet transfer network increases, and the number of connection interfaces mounted in the connectionless packet communication terminal is small, the number of cut-through optical paths to be set to prevent congestion of the connectionless packet transfer nodes can be increased, and congestion of the connectionless packet transfer nodes can be avoided. Hence, the communication quality of the large-scale connectionless packet transfer network can be increased economically, and the transfer capacity can be increased economically.

A connectionless packet transfer node for which the number of connection switch nodes arranged between the connectionless packet transfer node and a transmission source connectionless packet communication terminal is minimum is selected as a first connection setting target. A connectionless packet transfer node for which the number of connection switch nodes arranged between the connectionless packet transfer node and a destination connectionless packet communication terminal is minimum is selected as a second connection setting target. The present invention can be applied to a network whose scale becomes large as the number of connectionless packet communication terminals increases though the number of connection interfaces of each connectionless packet communication terminal does not increase. Since the connectionless packet transfer node closest to the transmission source connectionless packet communication terminal and the connectionless packet transfer node closest to the destination connectionless packet communication terminal are used as the two ends of the cut-through path which is set without passing through any other connectionless packet transfer node, the number of connection interfaces which can be used by cut-through paths can be increased. As a result, the number of cut-through paths can be increased. Hence, congestion of a connectionless packet transfer node through which a packet would have passed unless the cut-through path is set can be avoided.

A connectionless packet transfer node in a first area to which a transmission source connectionless packet communication terminal belongs is selected as a first connection setting target. A connectionless packet transfer node in a second area to which a destination connectionless packet communication terminal belongs is selected as a second connection setting target. A connectionless packet transfer node for which the number of connection switch nodes arranged between the connectionless packet transfer node and the transmission source connectionless packet communication terminal is minimum is selected as a third connection setting target. A connectionless packet transfer node for which the number of connection switch nodes arranged between the connectionless packet transfer node and the destination connectionless packet communication terminal is minimum is selected as a fourth connection setting target. The present invention can be applied to a network whose scale becomes large as the number of connectionless packet communication terminals increases though the number of connection interfaces of each connectionless packet communication terminal does not increase. That is, the network is logically divided into areas containing a connectionless packet communication terminal and connectionless packet transfer nodes. After routing is done in each area, a cut-through path is set between the connectionless packet transfer nodes in each area. Hence, a plurality of cut-through paths can be set between the areas, and the number of connection interfaces which can be used by cut-through paths can be increased. As a result, the number of settable cut-through paths can be increased, congestion of a connectionless packet transfer node through which a packet would have passed unless the cut-through optical path is set can be avoided.

The band of each flow defined by a pair of the transmission source address and destination address for the packet transmitted/received in the connectionless packet transfer node is recorded as statistical information. The control apparatus is notified of the recorded statistical information. The control apparatus creates a flow list in which information containing the transmission source address, destination address, and band is registered for each flow, on the basis of the statistical information sent from the connectionless packet transfer node. When a connectionless packet transfer node for which the sum of bands of pass flows exceeds a predetermined threshold value is detected by the flow list in setting the connection, a connection which does not pass through the connectionless packet transfer node is set. With this arrangement, connections can be set such that congestion is actively avoided in accordance with the traffic state. As a result, the effect of avoiding congestion of the connectionless packet transfer node can further be increased.

BRIEF DESCRIPTION OF DRAWINGS

FIG. 6 is a view showing a detailed example of a forwarding table 23a according to the first embodiment of the present invention;

FIG. 7 is a view showing a detailed example of a table provided in a pass packet count processing unit 28a according to the first embodiment of the present invention;

FIG. 8 is a view showing a detailed example of a monitoring table 34a according to the first embodiment of the present invention;

FIG. 13 is a table showing an example of an IPv6 flow statistical information list according to the second embodiment of the present invention;

FIG. 14 is a table for explaining sorting of the IPv6 flow statistical information list according to the second embodiment of the present invention;

FIG. 15 is a table for explaining assignment of the IPv6 flow to wavelength paths according to the second embodiment of the present invention;

FIG. 16 is a table for explaining sorting of a wavelength path candidate list according to the second embodiment of the present invention;

FIG. 17 is a table for explaining a wavelength path setting state according to the second embodiment of the present invention;

BEST MODE FOR CARRYING OUT THE INVENTION

First Embodiment

Figure 1:
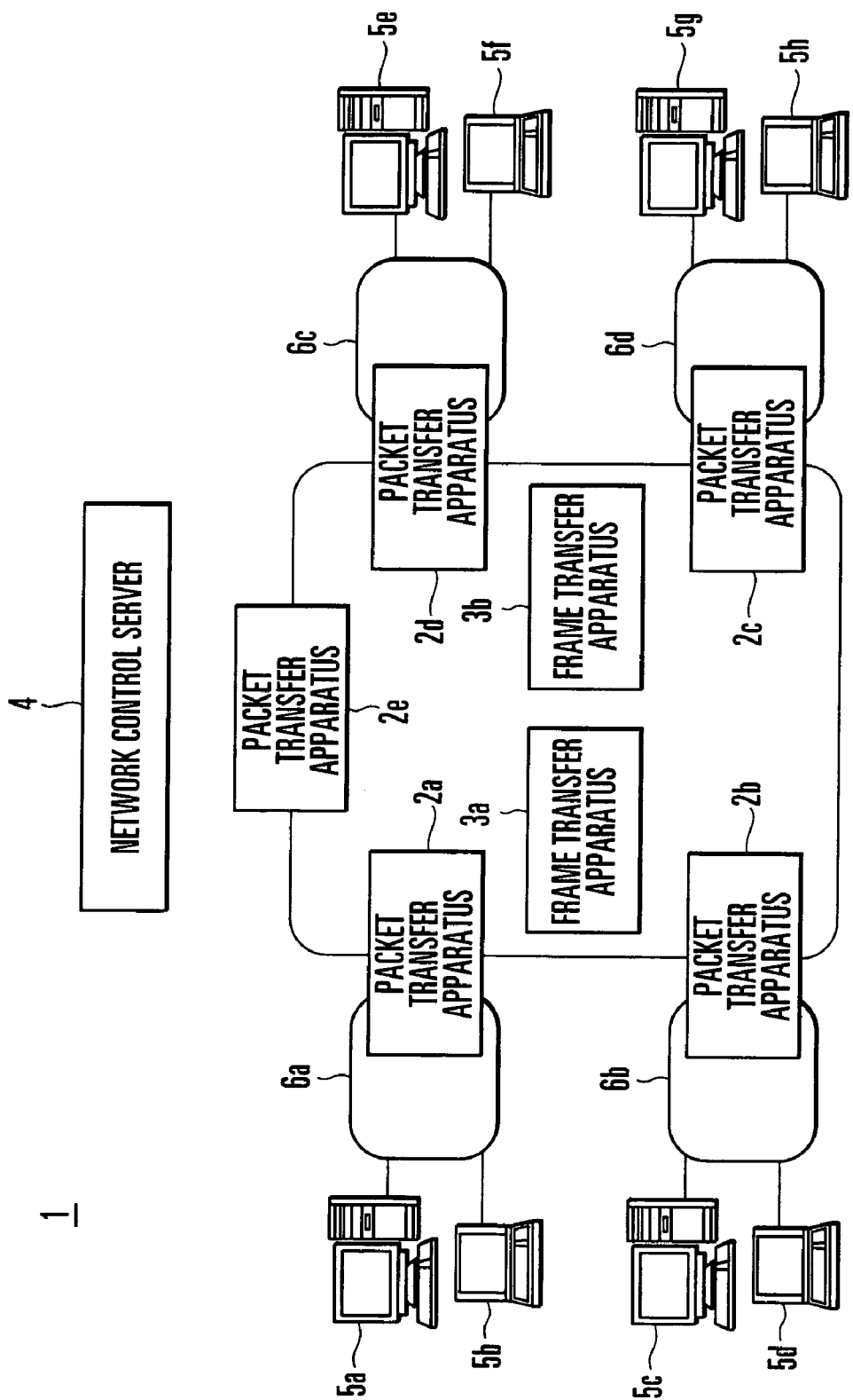
FIG. 1 is a view showing the arrangement of a packet communication network system according to the first embodiment of the present invention.

An embodiment of the present invention will be described below in detail with reference to the accompanying drawings. FIG. 1 is a view showing the arrangement of a packet communication network system according to the first embodiment of the present invention.

A packet transfer network system 1 includes packet transfer apparatuses 2a to 2e which transfer an upper layer packet encapsulated in a lower layer frame, frame transfer apparatuses 3a and 3b which mediate lower layer frame transfer between the packet transfer apparatuses 2, and a network control server 4 which controls the packet transfer apparatuses 2 and frame transfer apparatuses 3. Terminals 5a to 5h serving as user interfaces are accommodated in the packet transfer apparatuses 2a to 2e through user networks 6a to 6d. The packet transfer apparatuses 2a to 2e are connected through the packet transfer apparatus 2e or through the frame transfer apparatuses 3a and 3b.

Figure 2:
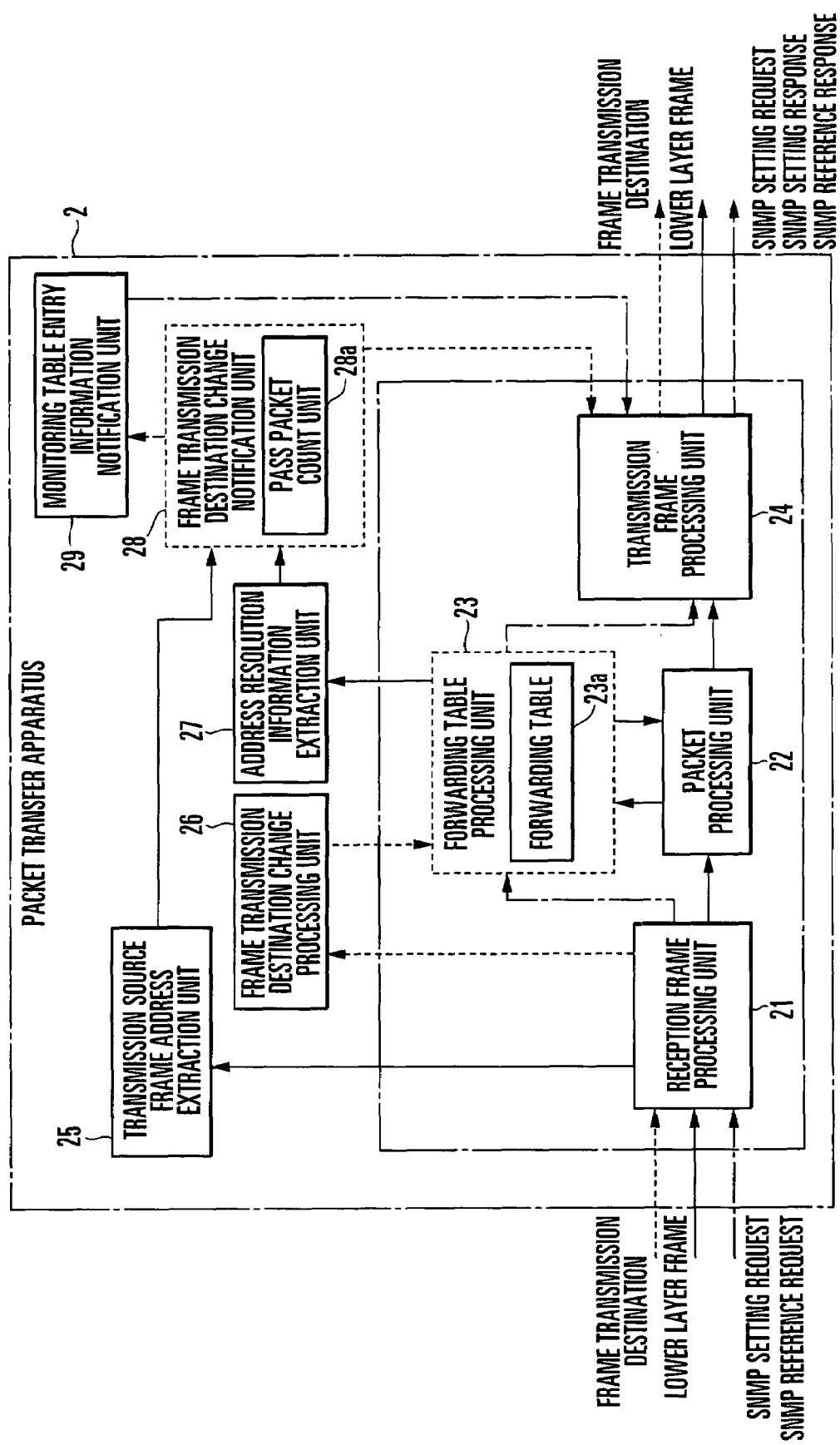
FIG. 2 is a block diagram showing the arrangement of a packet transfer apparatus according to the first embodiment of the present invention.

FIG. 2 is a block diagram showing the arrangement of the packet transfer apparatus according to this embodiment.

The packet transfer apparatus 2 comprises a reception frame processing unit 21, packet processing unit 22, forwarding table processing unit 23, transmission frame processing unit 24, transmission source frame address extraction unit 25, frame transmission destination change processing unit 26, address resolution information extraction unit 27, frame transmission destination change notification unit 28, and monitoring table entry information notification unit 29.

The reception frame processing unit 21 extracts an upper layer packet from a received lower layer frame and sends the upper layer packet to the packet processing unit 22. When the received lower layer frame is an SNMP (Simple Network Management Protocol) setting request or SNMP reference request, the reception frame processing unit 21 sends the lower layer frame to the forwarding table processing unit 23.

The packet processing unit 22 extracts a destination address from the upper layer packet extracted by the reception frame processing unit 21 and sends the destination address to the forwarding table processing unit 23.

The packet processing unit 22 also sends the upper layer packet extracted by the reception frame processing unit 21 to the transmission frame processing unit 24.

The forwarding table processing unit 23 has a forwarding table 23a as shown in FIG. 6. The upper layer destination addresses of upper layer packets and the lower layer destination addresses and output links corresponding to the upper layer destination addresses are registered in the forwarding table 23a.

The forwarding table processing unit 23 detects the lower layer destination address and output link corresponding to the upper layer destination address extracted by the packet processing unit 22 by looking up the above-described forwarding table 23a.

When the reception frame processing unit 21 receives an SNMP reference request from the network control server 4, the forwarding table processing unit 23 generates an SNMP reference response which describes the information of the forwarding table 23*a* for the network control server 4 as the SNMP reference request transmission source and sends the SNMP reference response to the transmission frame processing unit 24.

Upon receiving an SNMP setting request, the forwarding table processing unit 23 rewrites the forwarding table 23*a* in accordance with the information of the SNMP setting request and sends to, the transmission frame processing unit 24, an SNMP setting response which is generated for the network control server 4 as the SNMP setting request transmission source.

The transmission frame processing unit 24 re-encapsulates the upper layer packet extracted by the reception frame processing unit 21 in a lower layer frame for which the transmission source address of the lower layer frame received by the reception frame processing unit 21 is set as the transmission source address, and the lower layer destination address detected by the forwarding table processing unit 23 is set as the destination address, and outputs the lower layer frame to the link corresponding to the lower layer destination address.

The transmission frame processing unit 24 also sends the SNMP reference request and SNMP setting request generated by the forwarding table processing unit 23 to the network control server 4 as the destination.

The transmission source frame address extraction unit 25 extracts the lower layer transmission source address of the lower layer frame received by the reception frame processing unit 21 and sends the lower layer transmission source address to the frame transmission destination change notification unit 28.

If the extracted lower layer transmission source address is the address of the user network 6, the transmission source frame address extraction unit 25 discards information about the header of the frame and does not send the extracted lower layer transmission source address to the frame transmission destination change notification unit 28.

Upon receiving a change notification (to be described later) from the frame transmission destination change notification unit 28 of another packet transfer apparatus 2, the frame transmission destination change processing unit 26 changes the lower layer destination address corresponding to the upper layer destination address indicated by the notification, which is already registered in the forwarding table 23*a*, to the lower layer destination address indicated by the notification.

The address resolution information extraction unit 27 sends, to the frame transmission destination change notification unit 28, the lower layer destination address detected by the forwarding table processing unit 23.

If the detected lower layer destination address is the address of the user network 6, the address resolution information extraction unit 27 does not send the lower layer destination address to the frame transmission destination change notification unit 28.

The frame transmission destination change notification unit 28 comprises a pass packet count processing unit 28*a* having a table as shown in FIG. 7.

The pass packet count processing unit 28*a* counts the number of times of reception of a pair (lower layer address pair) of a lower layer transmission source address received from the transmission source frame address extraction unit 25 and a lower layer destination address received from the address resolution information extraction unit 27. The lower layer transmission source address and lower layer destination address which are paired indicate the lower layer transmission source address and lower layer destination address which are extracted from a single lower layer frame received by the reception frame processing unit 21.

As shown in FIG. 7 in detail, the table provided in the pass packet count processing unit 28*a* has a pass packet counter and timer corresponding to the lower layer address pair. Every time transfer of a lower layer frame having an appropriate lower layer address pair is confirmed, the counter is incremented by one. When the timer with an initial value of, e.g., 60 sec becomes 0, the counter is reset to 0. When the counter is reset, the timer is reset to the initial value.

The frame transmission destination change notification unit 28 having the pass packet count processing unit 28*a* notifies the monitoring table entry information notification unit 29 of lower layer address pairs whose count is equal to or more than the threshold value preset in the pass packet count processing unit 28*a*. The frame transmission destination change notification unit 28 transmits the upper layer destination address and lower layer destination address corresponding to the lower layer address pair from the transmission frame processing unit 24 to the lower layer transmission source address of the lower layer address pair (frame transmission destination change notification frame).

When only one of the lower layer transmission source address from the transmission source frame address extraction unit 25 and the lower layer destination address from the address resolution information extraction unit 27 is received, the transmission source frame address extraction unit 25 discards the received lower layer transmission source address or lower layer destination address.

The threshold value and timer measuring time of the pass packet count processing unit 28*a* can appropriately freely be set. In this embodiment, the timer is set to 60 sec, and the count is set to 1,000.

The monitoring table entry information notification unit 29 sends, to the preset specific frame transfer apparatus 3, an SNMP setting request to instruct addition of a monitoring entry to count the number of times of passage of a lower layer frame having the lower layer address pair received from the frame transmission destination change notification unit 28.

With this operation, the packet transfer apparatus 2 can specify the lower layer address pair whose packet transfer frequency is equal to or more than the threshold value, and notifies the frame transfer apparatus 3 of it.

In addition, a packet can directly be transferred between the frame transfer apparatus 3 corresponding to the lower layer transmission source address and the frame transfer apparatus 3 corresponding to the received lower layer destination address.

Figure 3:
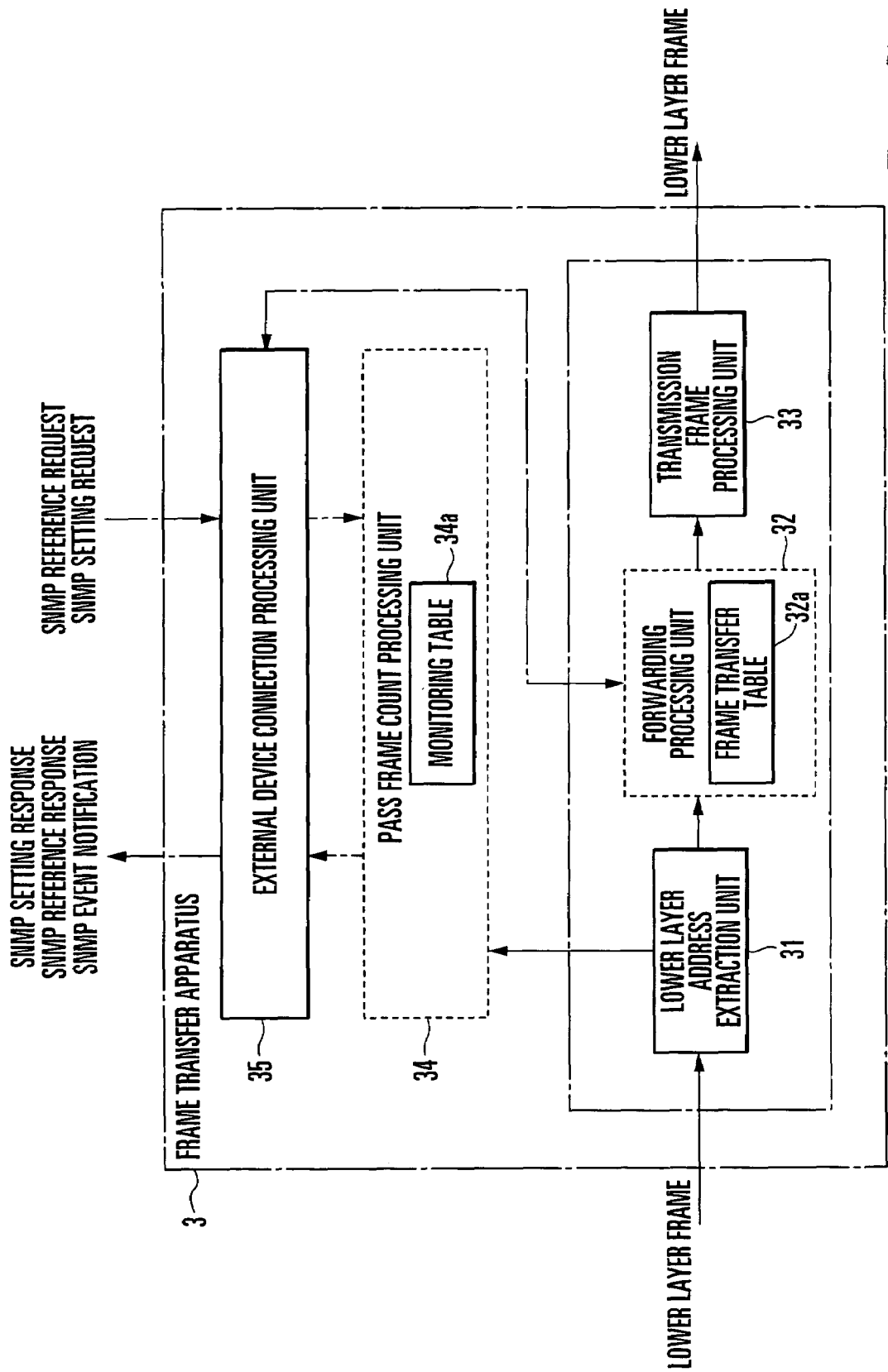
FIG. 3 is a block diagram showing the arrangement of a frame transfer apparatus according to the first embodiment of the present invention.

FIG. 3 is a block diagram showing the arrangement of the frame transfer apparatus 3 according to this embodiment. The frame transfer apparatus 3 according to this embodiment comprises a lower layer address extraction unit 31, forwarding processing unit 32, transmission frame processing unit 33, pass frame count processing unit 34, and external device connection processing unit 35.

The lower layer address extraction unit 31 extracts the lower layer address pair, i.e., the lower layer transmission source address and lower layer destination address from the received lower layer frame.

The forwarding processing unit 32 has a frame transfer table 32*a* in which the correspondence between the lower layer destination address and the output link is recorded. The forwarding processing unit 32 detects the output link corresponding to the lower layer destination address of the received lower layer frame by looking up the frame transfer table 32*a*.

The transmission frame processing unit 33 sends the received lower layer frame to the output link detected by the forwarding processing unit 32.

The pass frame count processing unit 34 has a monitoring table 34a as shown in FIG. 8, in which monitoring entries each including a counter to count the number of lower layer frames having a predetermined lower layer address pair and a timer to set the count time are registered.

When the lower layer address extraction unit 31 extracts the lower layer address pair, the pass frame count processing unit 34 increments the count value of the monitoring entry corresponding to the lower layer address pair by one.

The pass frame count processing unit 34 also deletes, from the monitoring table 34a, a monitoring entry for which no counting is done in a predetermined time measured by the timer, i.e., the count value in a predetermined time is 0. When the count value of the monitoring entry reaches a predetermined value, the pass frame count processing unit 34 instructs the external device connection processing unit 35 to transmit the lower layer address pair corresponding to the monitoring entry to the network control server 4.

When the timer with an initial value of, e.g., 600 sec becomes 0, the counter is reset to 0. When the counter is reset, the timer is reset to the initial value.

The initial value of the counter and the threshold value of the counter can appropriately freely be set.

Upon receiving an instruction about addition or deletion of a monitoring entry from the packet transfer apparatus 2 or network control server 4, the external device connection processing unit 35 adds or deletes the monitoring entry of the monitoring table 34a of the pass frame count processing unit 34 on the basis of the instruction. Upon receiving an instruction about addition or deletion of an entry of the frame transfer table 32a from the network control server 4, the external device connection processing unit 35 adds or deletes the entry of the frame transfer table 32a. Upon receiving information about the lower layer address pair from the pass frame count processing unit 34, the external device connection processing unit 35 sends this information to the network control server 4.

In this embodiment, the external device connection processing unit 35 has SNMP. Upon receiving an SNMP reference request or SNMP setting request from the packet transfer apparatus 2 or network control server 4, the external device connection processing unit 35 acquires information about addition or deletion of a monitoring entry from the request. Upon receiving an SNMP event, the external device connection processing unit 35 sends, to the network control server 4, information about the lower layer address pair received from the pass frame count processing unit 34 in accordance with the SNMP event notification.

The frame transfer apparatus 3 counts a lower layer frame having a lower layer address pair whose transfer frequency is received from the packet transfer apparatus 2 is equal to or more than the threshold value. When the transfer frequency of the lower layer frame having the lower layer address pair exceeds a predetermined value, the frame transfer apparatus 3 can notify the network control server 4 of it.

In addition, in the monitoring table to count the transfer frequency of the frame having the lower layer address pair, a monitoring entry corresponding to the lower layer address pair whose communication is not confirmed in a predetermined time can be deleted.

Figure 4:
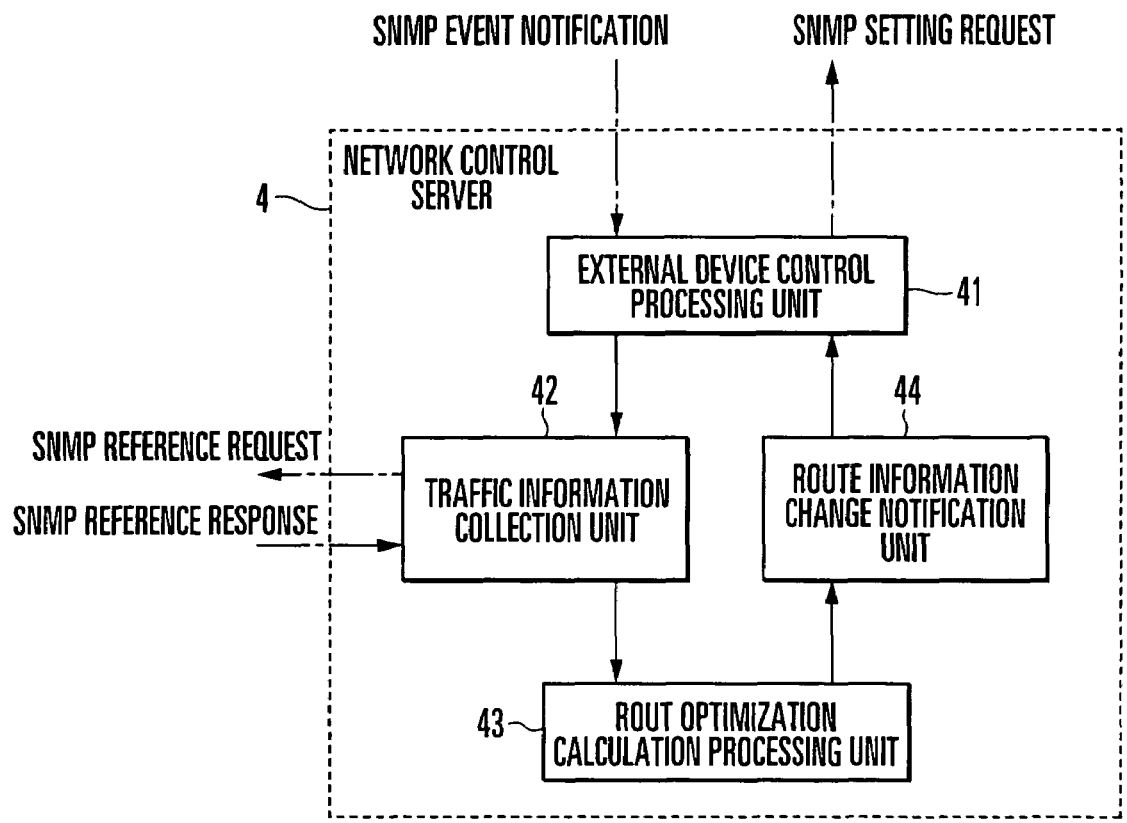
FIG. 4 is a block diagram showing the arrangement of a network control server according to the first embodiment of the present invention.

FIG. 4 is a block diagram showing the arrangement of the network control server according to this embodiment. The network control server 4 comprises an external device control processing unit 41, traffic information collection unit 42, route optimization calculation processing unit 43, and route information change notification unit 44.

The external device control processing unit 41 sends, to the traffic information collection unit 42, information about a lower layer address pair with a large number of pass frames, which is received from the frame transfer apparatus 3. The external device control processing unit 41 also sends an instruction about addition or deletion of an entry of the forwarding table 23a of the packet transfer apparatus 2 or the frame transfer table 32a of the frame transfer apparatus 3, or an instruction about addition or deletion of a monitoring entry of the frame transfer apparatus 3 to a corresponding apparatus.

In this embodiment, the external device control processing unit 35 has SNMP. By transmitting an SNMP reference request or SNMP setting request to the packet transfer apparatus 2 or frame transfer apparatus 3, an entry of the forwarding table 23a of the packet transfer apparatus 2, the frame transfer table 32a or monitoring table 34a of the frame transfer apparatus 3 can be looked up, added, or deleted.

The traffic information collection unit 42 stores information about the lower layer address pair with a large number of pass frames, which is received from the frame transfer apparatus 3. The traffic information collection unit 42 also transmits an SNMP reference request to each packet transfer apparatus 2 and each frame transfer apparatus 3 and stores information about the forwarding table 23a of each packet transfer apparatus 2 or the frame transfer table 32a or monitoring table 34a of each frame transfer apparatus 3, which is obtained by the SNMP reference response returned from the packet transfer apparatus 2 or frame transfer apparatus 3.

The route optimization calculation processing unit 43 executes route calculation to determine the route to be assigned to the lower layer address pair with the large number of pass frames on the basis of the information stored in the traffic information collection unit 42.

The route information change notification unit 44 stores the route calculated by the route optimization calculation processing unit 43. The route information change notification unit 44 also generates an instruction to delete the monitoring entry of the lower layer address pair of the delete path for the pass frame count processing unit 34 of the frame transfer apparatus 3 located on the route to be changed and sends the instruction to the external device control processing unit 41. The route information change notification unit 44 also adds an entry about the lower layer destination address and output link of the added path to the frame transfer table 32a of the forwarding processing unit 32 of the frame transfer apparatus 3 on the route calculated by the route optimization calculation processing unit 43. The route information change notification unit 44 also generates an instruction to add a monitoring entry to the lower layer address pair of the route for the pass frame count processing unit 34 of the frame transfer apparatus 3 and sends the instruction to the external device control processing unit 41. The route information change notification unit 44 also generates an instruction to rewrite the output link corresponding to the lower layer destination address of the added route on the basis of the calculation result for the forwarding table processing unit 23 of the packet transfer apparatus 2 on the route calculated by the route optimization calculation processing unit 43 and sends the instruction to the external device control processing unit 41.

Hence, the network control server 4 can add or delete an entry of the monitoring table 34a of the frame transfer apparatus 3.

The operation of the packet transfer apparatus 2 according to this embodiment will be described next with reference to FIG. 2.

The operation of the packet transfer apparatus 2 can roughly be classified into a frame transfer operation, frame transmission destination address change operation, and forwarding table update operation. Each operation will be described below.

The frame transfer operation will be described.

The reception frame processing unit 21 of the packet transfer apparatus 2 receives a lower layer frame transferred from an arbitrary packet transfer apparatus 2 of the preceding hop and sends the header of the lower layer frame to the transmission source frame address extraction unit 25 and the payload of the lower layer frame to the packet processing unit 22.

Upon receiving the payload of the lower layer frame from the reception frame processing unit 21 as the upper layer packet, the packet processing unit 22 extracts the destination address of the upper layer packet and sends it to the forwarding table processing unit 23.

Upon receiving the destination address of the upper layer packet from the packet processing unit 22, the forwarding table processing unit 23 searches the forwarding table 23a to detect the lower layer destination address of the packet transfer apparatus 2 of the next hop to which the upper layer packet should be transferred. The detection result and upper layer destination address (address resolution information) are sent to the packet processing unit 22 and also to the address resolution information extraction unit 23.

Upon receiving the address resolution information from the forwarding table processing unit 23, the packet processing unit 22 sends the upper layer packet to the transmission frame processing unit 24 together with the address resolution information.

The transmission frame processing unit 24 sets, as the payload, the upper layer packet received from the packet processing unit 22, creates a lower layer frame header from the lower layer destination address contained in the address resolution information sent together with the upper layer packet, and sends a lower layer frame including the payload and lower layer frame header to the packet transfer apparatus 2 of the next hop.

The frame transmission destination change operation will be described next.

The transmission source frame address extraction unit 25 receives the lower layer frame header from the reception frame processing unit 21 and extracts the transmission source address of the lower layer frame, i.e., the lower layer transmission source address from the header. If the extracted lower layer transmission source address is not an address passing through the user network 6, the transmission source frame address extraction unit 25 sends the lower layer transmission source address to the frame transmission destination change notification unit 28.

The address resolution information extraction unit 27 receives the address resolution information from the forwarding table processing unit 23. If the lower layer destination address contained in the address resolution information is not an address passing through the user network 6, the address resolution information is sent to the frame transmission destination change notification unit 28.

The frame transmission destination change notification unit 28 receives the lower layer transmission source address from the transmission source frame address extraction unit 25 and the lower layer destination address contained in the address resolution information from the address resolution information extraction unit 27. The pass packet count unit 28a counts the number of times of reception of the lower layer frame having a pair (lower layer address pair) of the lower layer transmission source address and the lower layer destination address. When an arbitrary lower layer address pair is counted a predetermined number of times in a predetermined time and, for example, 1,000 times or more within 60 sec, the frame transmission destination change notification unit 28 notifies the monitoring table entry information notification unit 29 of the arbitrary lower layer address pair. In addition, the frame transmission destination change notification unit 28 generates the payload of a frame transmission destination change notification frame from the address resolution information serving as the base of the lower layer destination address of the arbitrary lower layer address pair and also generates the header of the frame transmission destination change notification frame from the lower layer transmission source address of the arbitrary lower layer address pair. The generated frame transmission destination change notification frame is sent to the transmission frame processing unit 24.

The monitoring table entry information notification unit 29 receives the lower layer address pair for the frame transmission destination change notification unit 28 and generates, for the pass frame count processing unit 34 of a preset specific frame transfer apparatus 3, an SNMP setting request to instruct addition of a monitoring entry to count the number of times of passage of the lower layer frame having the lower layer address pair. The generated SNMP setting request is sent to the transmission frame processing unit 24.

The transmission frame processing unit 24 receives the frame transmission destination change notification frame from the frame transmission destination change notification unit 28 and sends this frame to the packet transfer apparatus 2 of the preceding hop. The transmission frame processing unit 24 receives the SNMP setting request from the monitoring table entry information notification unit 29 and sends the SNMP setting request to the specific frame transfer apparatus 3.

The packet transfer apparatus 2 can notify the predetermined frame transfer apparatus 3 of the lower layer address pair whose count value exceeds the predetermined threshold value. Hence, the lower layer address pairs to be counted by the frame transfer apparatus 3 can be suppressed to minimum and necessary.

The packet transfer apparatus 2 can also execute forwarding processing of the received upper layer packet and send the address resolution information of the packet transfer apparatus of the next hop to the packet transfer apparatus of the preceding hop.

The forwarding table update operation will be described next.

The reception frame processing unit 21 receives the frame transmission destination change notification frame and sends the payload of this frame to the frame transmission destination change processing unit 26.

Upon receiving the payload of the frame transmission destination change notification frame from the reception frame processing unit 21, the frame transmission destination change processing unit 26 extracts the address resolution information from the payload and sends it to the forwarding table processing unit 23.

Upon receiving the address resolution information from the frame transmission destination change processing unit 26, the forwarding table processing unit 23 registers it in the forwarding table 23a.

The packet transfer apparatus 2 according to this embodiment is notified of the address resolution information and registers it in the forwarding table 23a. Hence, subsequent upper layer packets to the same destination can be transmitted through a more appropriate route with a higher transfer quality.

The operation of the frame transfer apparatus 3 according to this embodiment will be described next.

The operation of the frame transfer apparatus 3 can roughly be classified into a monitoring table update operation, frame transfer operation, and pass frame count operation. Each operation will be described below.

The monitoring table update operation will be described.

The external device connection processing unit 35 receives an SNMP setting request to instruct addition of a monitoring entry to count the number of times of passage of a lower layer frame having an arbitrary lower layer address pair from the packet transfer apparatus 2 and adds and registers the monitoring table entry of the lower layer address pair in the monitoring table 34a of the pass frame count processing unit 34.

The frame transfer operation will be described next.

The lower layer address extraction unit 31 receives a lower layer frame from the frame transfer apparatus 2 of the preceding hop, extracts the lower layer transmission source address and lower layer destination address from the header of the frame, notifies the pass frame count processing unit 32 of the extracted lower layer address pair, and sends the lower layer frame to the forwarding processing unit 29.

The forwarding processing unit 32 extracts the lower layer destination address from the lower layer frame received from the lower layer address extraction unit 28 and detects, by looking up the frame transfer table 32a, the address of the frame transfer apparatus 2 of the next hop to which the lower layer frame corresponding to the lower layer destination address is to be transferred. The detection result is sent to the transmission frame processing unit 33 together with the lower layer frame.

The transmission frame processing unit 33 sends the lower layer frame received from the forwarding processing unit 32 to the address of the frame transfer apparatus 2 of the next hop, which is received simultaneously.

The pass frame count operation will be described next.

The pass frame count processing unit 34 receives the lower layer address pair from the lower layer address extraction unit 31, searches the monitoring table 34a for a monitoring entry corresponding to the address pair, and increments the counter of the monitoring entry of the monitoring table 34a, which corresponds to the lower layer address pair, by one.

For a monitoring entry whose counter value exceeds, e.g., 40,000,000 in the monitoring table 34a, a notification representing that the frame passage count of the address pair corresponding to the monitoring entry exceeds the threshold value is sent to the external device connection processing unit 35.

Upon receiving the notification, the external device connection processing unit 34 generates an SNMP event notification to notify the network control server 4 of the lower layer address pair whose frame passage count exceeds the threshold value and sends the notification to the network control server 4.

When the timer which counts a predetermined time becomes 0 in the monitoring table 34a, the pass frame count processing unit 34 resets the counters of all entries to 0. At this time, the entries of lower layer address pairs for which the counter value immediately before the reset is 0 are deleted from the monitoring table 34a.

With the above-described operation, the frame transfer apparatus 3 can be caused by the packet transfer apparatus 2 to add or delete an entry of the monitoring table 34a.

The monitoring entry of a lower layer address pair whose communication is not confirmed for a predetermined time can be deleted from the monitoring table 34a. Hence, the frame transfer apparatus 3 can hold only minimum and necessary monitoring entries.

In addition, a lower layer address pair for which the transfer frequency of the lower layer frame is equal to or more than the threshold value can be sent to the network control server.

The operation of the network control server 4 according to this embodiment will be described next.

When the SNMP event notification is received from the frame transfer apparatus 3, the external device control processing unit 41 extracts, from the SNMP event notification, a lower layer address pair whose transfer frequency is equal to or more than the predetermined threshold value in the frame transfer apparatus 3 and sends the lower layer address pair to the traffic information collection unit 42.

The traffic information collection unit 42 stores the lower layer address pair whose transfer frequency in the frame transfer apparatus 3 is equal to or more than the threshold value. The traffic information collection unit 42 sends an SNMP reference request to each packet transfer apparatus 2 and each frame transfer apparatus 3 and collects information about the forwarding table 23a of each packet transfer apparatus 2 and the frame transfer table 32a and monitoring table 34a of each frame transfer apparatus 3 from SNMP reference responses returned from the packet transfer apparatuses 2 and frame transfer apparatuses 3. The traffic information collection unit 42 stores these pieces of information (traffic information) and sends them to the route optimization calculation processing unit 43.

Upon receiving the traffic information from the traffic information collection unit 42, the route optimization calculation processing unit 43 executes calculation to optimize the transfer route on the basis of the traffic information. The route obtained by the calculation is sent to the route information change notification unit 44.

Upon receiving the information about the route to optimize the transfer route from the route optimization calculation processing unit 43, the route information change notification unit 44 generates a notification to delete an entry corresponding to the route before change, which is registered in the forwarding table 23a, for the packet transfer apparatus 2 present on the route before change, and a notification to delete an entry corresponding to the route before change, which is registered in the monitoring table 34a of the pass frame count processing unit 34, for the frame transfer apparatus 3 present on the route before change. The route information change notification unit 44 sends the notifications to the external device control processing unit 41.

In addition, the route information change notification unit 44 generates, for a specific packet transfer apparatus 2 and frame transfer apparatus 3 present on the route calculated by the route optimization calculation processing unit 43, a notification of an entry of a route which optimizes the transfer route and a notification to rewrite the output link corresponding to an arbitrary lower layer destination address to an output link which optimizes the transfer route in the forwarding table 23a and frame transfer table 32a. The notifications are sent to the external device control processing unit 41.

The route information change notification unit 44 also generates, for the specific frame transfer apparatus 3 present on the route calculated by the route optimization calculation processing unit 43, a notification to add a monitoring entry corresponding to the lower layer address pair corresponding to the calculation result to the monitoring table 34a and sends the notification to the external device control processing unit 41.

The external device control processing unit 41 converts each notification received from the route information change notification unit 44 into an SNMP setting request and sends it to each packet transfer apparatus 2 and each frame transfer apparatus 3.

With the above-described operation, the network control server 4 according to this embodiment can optimize the SNMP event notification of the lower layer frame.

Figure 5:
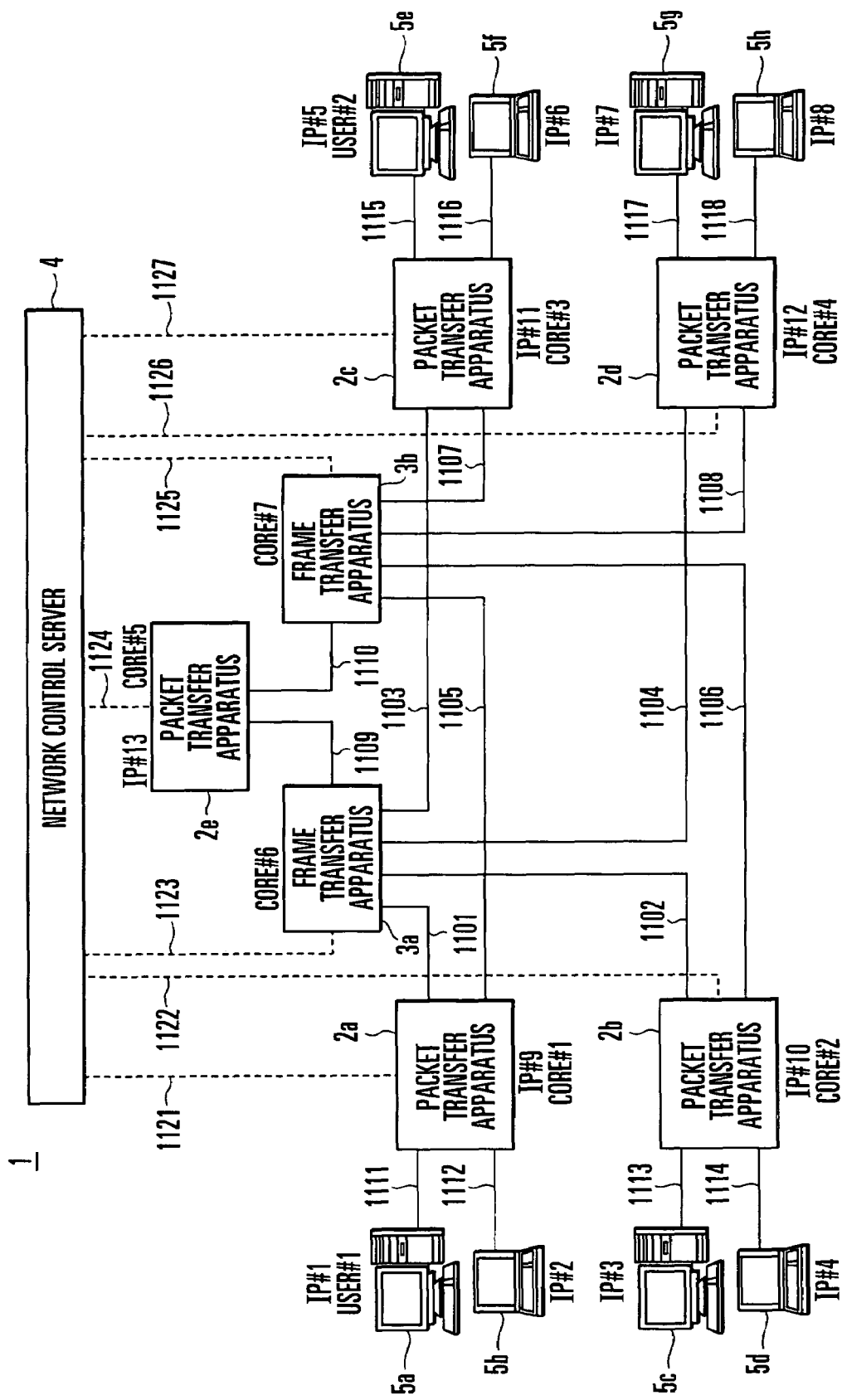
FIG. 5 is a view showing a detailed example of the packet communication network system according to the first embodiment of the present invention.

A detailed example of the operation of the packet communication network system according to this embodiment will be described next with reference to FIG. 5. FIG. 5 is a view showing a detailed example of the operation of the packet communication network system 1 according to this embodiment.

The packet transfer apparatuses 2a to 2e have specific upper layer address IP #9 to #13 and lower layer address CORE #1 to #5, respectively, and are connected to the frame transfer apparatuses 3a and 3b having specific lower layer address CORE #6 and #7 through links 1101 to 1110. The packet transfer apparatuses 2a to 2e are connected to the specific terminal apparatuses 5a to 5h having specific upper layer address IP #1 to #8 through links 1111 to 1118. The packet transfer apparatuses 2a to 2e and frame transfer apparatuses 3a and 3b are connected to the network control server 4 through links 1121 to 1127.

The links 1111 to 1118 correspond to the user networks 6a to 6d shown in FIG. 1.

In the above-described packet communication network system 1, when the terminal 5a having upper layer address IP #1 and the terminal 5e having upper layer address IP #5 start communicating, a lower layer frame is transferred from the terminal 5a to the terminal 5e through the packet transfer apparatus 2a, frame transfer apparatus 3a, packet transfer apparatus 2e, and packet transfer apparatus 2c. This case will be described as an example.

When a lower layer frame having, as a payload, an upper layer destination address IP #5 and upper layer transmission source address IP #1 is received from the terminal 5a, the packet transfer apparatus 2a detects, from the upper layer destination address IP #5 and the forwarding table 23a of the forwarding table processing unit 23, the lower layer destination address and output link of the packet transfer apparatus 2 to which the upper layer destination address IP #5 is to be transferred. The lower layer destination address of the packet transfer apparatus 2 as the transfer target is detected as CORE #5, and the output link is detected as the link 1101. The packet transfer apparatus 2 sets the lower layer transmission source address to lower layer address CORE #1 of the packet transfer apparatus 2a and sends, to the link 1101, a lower layer frame obtained by causing the transmission frame processing unit 24 to re-encapsulate the received lower layer frame.

At this time, since the transmission source address of the relieved lower layer frame is an address passing through the user network, the packet transfer apparatus 2a causes the transmission source frame address extraction unit 25 to discard information about the header of the lower layer frame. Hence, the packet transfer apparatus 2a does not count the number of pass frames for the lower layer frame.

The frame transfer apparatus 3a receives the lower layer frame from the packet transfer apparatus 2a though the link 1101 and searches for the link to which the received lower layer frame is to be sent, on the basis of lower layer destination address CORE #5 of the lower layer frame and the frame transfer table 32a of the forwarding processing unit 32. As a result of search, the link 1109 is detected. The frame transfer apparatus 3a sends the lower layer frame received from the packet transfer apparatus 2a to the link 1109. At this time, the frame transfer apparatus 3a does not execute monitoring for the lower layer frame.

The packet transfer apparatus 2e receives the lower layer frame from the frame transfer apparatus 3a and sends the payload of the lower layer frame received by the reception frame processing unit 21 to the packet processing unit 22 and the header of the received lower layer frame to the transmission source frame address extraction unit 25.

The packet processing unit 22 of the packet transfer apparatus 2a extracts upper layer destination address IP #5 from the payload of the lower layer frame, i.e., the upper layer packet and searches for the lower layer destination address of the packet transfer apparatus to which upper layer destination address IP #5 should be transferred by looking up upper layer destination address IP #5 and the forwarding table 23a of the forwarding table processing unit 23. As a result of search, the lower layer destination address of the packet transfer apparatus as the transfer target is detected as CORE #3, and the link as the output target is detected as the link 1103. The packet transfer apparatus 2e sets the lower layer transmission source address to lower layer address CORE #5 of the packet transfer apparatus 2e, and sends a lower layer frame obtained by re-encapsulation by the transmission frame processing unit 24 to the link 1103 through the link 1109 and frame transfer apparatus 3a.

At this time, the transmission source frame address extraction unit 25 of the packet transfer apparatus 2e receives the header of the lower layer frame, extracts lower layer transmission source address CORE #1 from the header, and sends it to the frame transmission destination change notification unit 28. The address resolution information extraction unit 27 receives lower layer destination address CORE #3 from the forwarding table processing unit 23 as resolution information and sends the received information to the frame transmission destination change notification unit 28.

The frame transmission destination change notification unit 28 receives lower layer transmission source address CORE #1 from the transmission source frame address extraction unit 25 and the lower layer destination address CORE #3 from the address resolution information extraction unit 27. The pass packet count unit 28a increments the pass count of the packet corresponding to the address pair including lower layer transmission source address CORE #1 and lower layer destination address CORE #3 by one.

The packet transfer apparatus 2c receives the lower layer frame for the packet transfer apparatus 2e. The payload of the received lower layer frame is sent to the packet processing unit 22. The header of the received lower layer frame is sent to the transmission source frame address extraction unit 25.

The packet processing unit 22 extracts upper layer destination address IP #5 from the payload of the lower layer frame, i.e., the upper layer packet and searches for the lower layer destination address of the terminal to which upper layer destination address IP #5 is to be transferred by looking up upper layer destination address IP #5 and the forwarding table 23a of the forwarding table processing unit 23. As a result of search, the lower layer destination address of the transfer target terminal is detected as USER #2, and the output target link is detected as the link 1115. The packet transfer apparatus 2c sets the lower layer transmission source address to lower layer address CORE #3 of the packet transfer apparatus 2c and sends, to the link 1115, a lower layer frame re-encapsulated by the transmission frame processing unit 24.

At this time, since the lower layer destination address of the lower layer frame to be sent, i.e., the lower layer destination address detected by the forwarding table processing unit 23 is an address passing through the user network, the address resolution information extraction unit 27 does not notify the frame transmission destination change notification unit 28 of the lower layer destination address. Hence, the packet transfer apparatus 2c does not count the number of pass frames for the lower layer frame.

In accordance with these procedures, the lower layer frame sent from the terminal 5a having upper layer address IP #1 is transferred to the terminal 5e having upper layer address IP #5.

The operation of the packet communication network system when communication between the terminal 5a having upper layer address IP #1 and the terminal 5e having upper layer address IP #5 is repeated in number of times equal to or more than a predetermined threshold value within a predetermined time in the above-described case will be described next.

When the count value of the pass packet count unit 28a of the frame transmission destination change notification unit 28 of the packet transfer apparatus 2e exceeds 1,000 before the timer of the entry corresponding to CORE #1 and CORE #3 as a lower layer address pair becomes 0, the frame transmission destination change notification unit 28 notifies the monitoring table entry information notification unit 29 of the lower layer address pair of CORE #1 and CORE #3.

The frame transmission destination change notification unit 28 generates a frame transmission destination notification frame including a payload containing address resolution information containing upper layer destination address IP #5 and lower layer destination address CORE #3 corresponding upper layer destination address IP #5 and a header having lower layer transmission source address CORE #1 as the lower layer destination address and sends the frame transmission destination notification frame to the transmission frame processing unit 24.

The transmission frame processing unit 24 sends the received frame transmission destination notification frame to the packet transfer apparatus 2a having lower layer address CORE #1.

The monitoring table entry information notification unit 29 receives the lower layer address pair of CORE #1 and CORE #5. The monitoring table entry information notification unit 29 generates an SNMP setting request to instruct addition of a monitoring entry having a counter which counts the number of times of passage of the lower layer frame having the lower layer address pair and a timer which resets the count value every predetermined time and, for example, 600 sec to the monitoring table 34a of the pass frame count processing unit 34 of the preset frame transfer apparatus (3a) and sends the SNMP setting request to the transmission frame processing unit 24.

The transmission frame processing unit 24 receives the SNMP setting request from the monitoring table entry information notification unit 29 and outputs it to the link 1109 serving as a link to connect the e packet transfer apparatus 2e and frame transfer apparatus 3a.

When the external device connection processing unit 35 of the frame transfer apparatus 3a receives the SNMP setting request, the frame transfer apparatus 3a additionally registers the monitoring entry corresponding to the lower layer address pair of CORE #1 and CORE #3 to the monitoring table 34a of the pass frame count processing unit 34 on the basis of the SNMP setting request.

On the other hand, the reception frame processing unit 21 of the packet transfer apparatus 2a receives the frame transmission destination change notification frame from the packet transfer apparatus 2c and sends the payload of the frame to the frame transmission destination change processing unit 26.

The frame transmission destination change processing unit 26 receives the payload of the frame transmission destination change notification frame, extracts the address resolution information, i.e., upper layer destination address IP #5 and lower layer destination address CORE #3 corresponding to upper layer destination address IP #5 from the payload, and sends the addresses to the forwarding table processing unit 23.

The forwarding table processing unit 23 receives upper layer destination address IP #5 and lower layer destination address CORE #3 and rewrites the forwarding table 23a on the basis of the addresses. More specifically, CORE #5 has been registered in the forwarding table 23a as the lower layer destination address corresponding to upper layer destination address IP #5. In accordance with the frame transmission destination change notification frame, the lower layer destination address corresponding to upper layer destination address IP #5 in the forwarding table 23a is rewritten to CORE #3.

From this processing, the packet transfer apparatus 2a sends the lower layer frame whose upper layer destination address corresponds to IP #5 directly to the e packet transfer apparatus 2c without intervening the packet transfer apparatus 2e.

From this processing, the frame transfer apparatus 3a which relays the packet transfer apparatus 2a and packet transfer apparatus 2c starts counting the number of times of passage of the lower layer frame having the lower layer address pair containing CORE #1 and CORE #3.

Assume that in the monitoring table 34a of the pass frame count processing unit 34 of the frame transfer apparatus 3a, when the timer of an arbitrary entry becomes 0, the counter is 0. In this case, the pass frame count processing unit 34a deletes the arbitrary entry from the monitoring table 34a. Assume that when the timer of an arbitrary entry becomes 0, the counter is equal to or less than 40,000,000. In this case, the frame count processing unit 34 resets the counter of the arbitrary entry to 0 and counts the number of pass frames again.

Assume that, for example, the counter of the entry corresponding to the lower layer address pair of CORE #1 and CORE #3 exceeds 40,000,000 before the timer becomes 0. In this case, the pass frame count processing unit 34 of the frame transfer apparatus 3 sends, to the external device connection processing unit 35, a notification representing that the number of times 25, of passage of the lower layer frame having the lower layer address pair of CORE #1 and CORE #3 exceeds the threshold value.

Upon receiving the notification, the external device connection processing unit 35 generates an SNMP event notification representing that the number of times of passage of the lower layer frame having the lower layer address pair of CORE #1 and CORE #3 exceeds the threshold value and sends the notification to the network control server 4.

The network control server 4 receives the SNMP event notification from the frame transfer apparatus 3, extracts the lower layer address pair of CORE #1 and CORE #3 from the SNMP event notification, and stores these pieces of information. In addition, the network control server 4 transmits an SNMP reference request to each frame transfer apparatus 3, collects the information of the forwarding table 23a and pass frame count processing unit 34 of each frame transfer apparatus 3 from the SNMP reference response returned from each frame transfer apparatus 3, and executes calculation to optimize the transfer route and traffic capacity of the entire packet communication network system 1. For example, when a calculation result which changes the route between CORE #1 and CORE #3 from the route passing through the frame transfer apparatus 3a to the route passing through the frame transfer apparatus 3b is obtained, an SNMP setting request to rewrite the output link corresponding to lower layer destination address CORE #3 in the forwarding table 23a of the forwarding table processing unit 23 of the packet transfer apparatus 2a from the link 1101 to the link 1105 is transmitted to the packet transfer apparatus 2a through the link 1121.

In addition, an SNMP setting request to delete the entry corresponding to the lower layer address pair of CORE #1 and CORE #3 registered in the monitoring table 34a of the pass frame count processing unit 34 of the frame transfer apparatus 3a is transmitted to the frame transfer apparatus 3a through the link 1123.

Furthermore, an SNMP setting request to add a monitoring entry including a counter which counts the number of times of passage of the lower layer frame having the lower layer address pair of CORE #1 and CORE #3 and a timer which resets the count value every 600 sec to the monitoring table 34a of the pass frame count processing unit 34 of the frame transfer apparatus 3b and an SNMP setting request to add an entry in which the output link of the lower layer frame corresponding to lower layer destination address CORE #3 is set to the link 1107 to the frame transfer table 32a of the forwarding processing unit 32 are generated and sent to the frame transfer apparatus 3b through the link 1125.

The packet transfer apparatus 2a receives the SNMP setting request from the network control server 4, rewrites the output link corresponding to lower layer destination address CORE #3 registered in the forwarding table 23a of the forwarding table processing unit 23 from the link 1101 to the link 1105, and sends an SNMP setting response to the network control server 4.

The frame transfer apparatus 3a receives the SNMP setting request from the network control server 4, deletes the entry corresponding to the lower layer address pair of CORE #1 and CORE #3 registered in the monitoring table 34a of the pass frame count processing unit 34, and sends an SNMP setting response to the network control server 4.

The frame transfer apparatus 3b receives the SNMP setting request from the network control server 4, additionally registers a monitoring entry including a counter which counts the number of times of passage of the lower layer frame having the lower layer address pair of CORE #1 and CORE #3 and a timer which resets the count value every 600 sec in the monitoring table 34a of the pass frame count processing unit 34, and transmits an SNMP setting response to the network control server 4.

The frame transfer apparatus 3b also additionally registers an entry in which the output link of the lower layer frame corresponding to lower layer destination address CORE #3 is set to the link 1107 in the frame transfer table 32a of the forwarding processing unit 32 and transmits an SNMP setting response to the network control server 4.

With this processing, the route between CORE #1 and CORE #3 is changed from the route passing through the frame transfer apparatus 3a to the route passing through the frame transfer apparatus 3b.

With the above-described operation, in the packet communication network system according to this embodiment, the packet transfer apparatus 2 specifies the lower layer address pair whose upper layer transfer frequency is equal to or more than the threshold value and notifies the frame transfer apparatus of it. In addition, a packet can directly be transferred between a packet transfer apparatus corresponding to the lower layer transmission source address and a packet transfer apparatus corresponding to the lower layer destination address sent to the packet transfer apparatus. The frame transfer apparatus 3 has only minimum and necessary monitoring entries and can notify the network control server of a lower layer address pair whose lower layer frame transfer frequency is equal to or more than the threshold value. The network control server 4 can add or delete an entry of the table to count the transfer frequency of the lower layer frame corresponding to the lower layer address pair and also switch the transfer route in accordance with the transfer frequency of the lower layer frame between the packet transfer apparatuses 2. As a result, the efficiency of traffic engineering can be increased.

Each of the above-described packet transfer apparatuses 2, frame transfer apparatuses 3, network control server 4, and terminals 5 can be implemented by computers. The computer includes a CPU, a ROM (Read Only Memory), a RAM (Random Access Memory), an auxiliary storage device such as a flexible disk device, a large-capacity external storage device such as a hard disk device, and an interface device to a link.

The program to make the computer function as the packet transfer apparatus 2, frame transfer apparatus 3, or network control server 4 is provided as a program stored in a storage medium such as a flexible disk, CD-ROM, or memory card. When the storage medium is inserted in the auxiliary storage device of the computer, the program stored in the medium is read out. The CPU writes the readout program in the RAM or external storage device and executes the processing described in the above embodiment in accordance with the program so that the various kinds of functions are executed.

As the lines which connect the packet transfer apparatuses 2, frame transfer apparatuses 3, network control server 4, and terminals 5, i.e., the user networks 6, links 1101 to 1118, and links 1121 to 1127, not only high-speed lines such as optical cables but also various kinds of lines can be used.

Second Embodiment

The second embodiment of the present invention will be described by using an example in which an IPv6 (Internet Protocol Version6) connectionless transfer network is built on a photonic network, and a VPN (Virtual Private Network) service providing network to store user networks including a plurality of IPv4 (Internet Protocol Version4) connectionless transfer networks is built.

Figure 9:
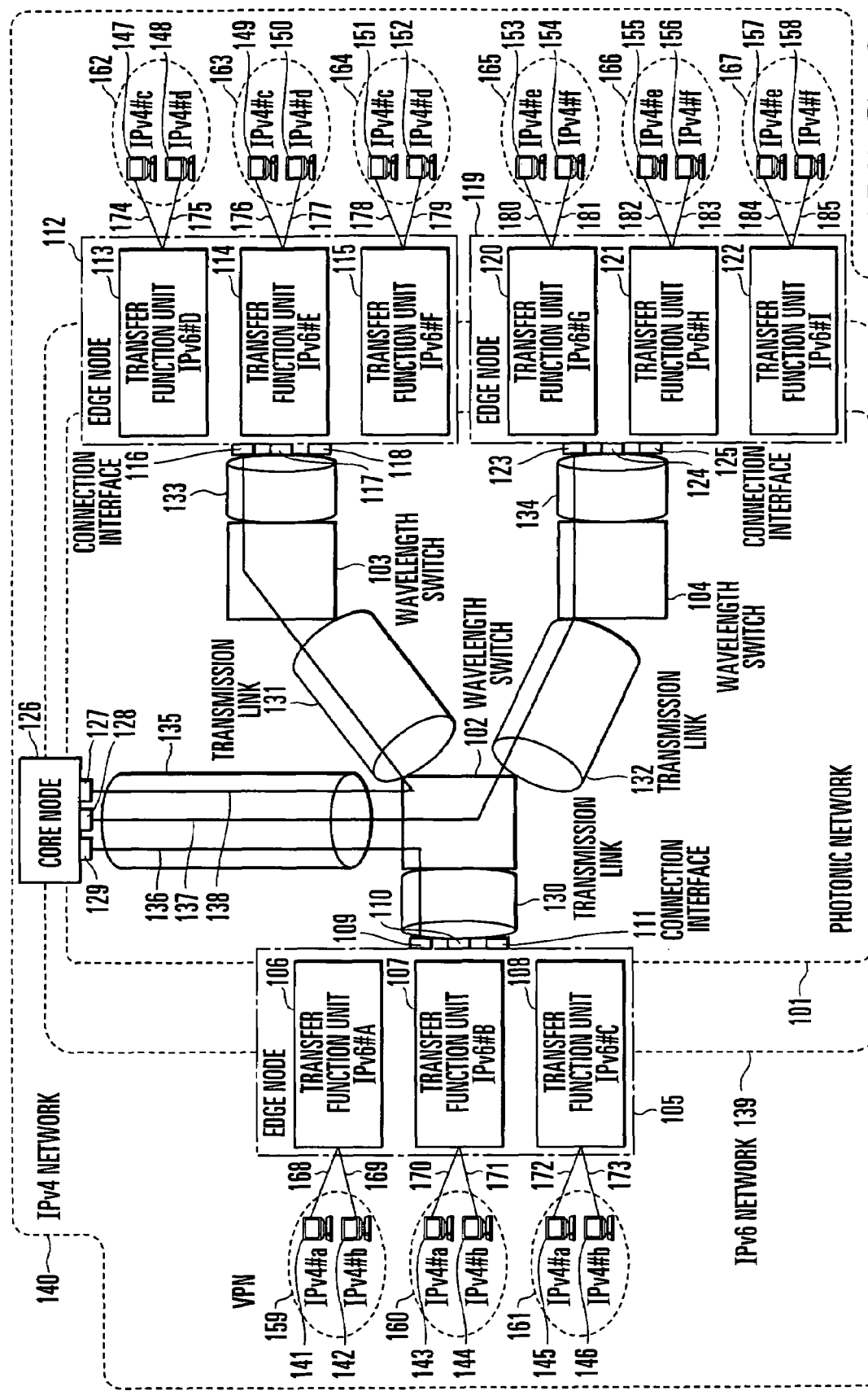
FIG. 9 is a block diagram showing the arrangement of the packet transfer path of a network model according to the second embodiment of the present invention.

FIG. 9 is a block diagram showing an example of a network model according to the second embodiment of the present invention. FIG. 9 shows the arrangement of the network model of this embodiment viewed from the viewpoint of packet transfer path. The network model viewed from the viewpoint of packet transfer path will be referred to as a transfer plane hereinafter.

A photonic network 101 serving as a connection network includes wavelength switches 102, 103, and 104 serving as connection switching nodes and the terminal function unit of the connection network. The terminal function unit of the connection network includes a core node 126 serving as a connectionless packet transfer node (corresponding to the frame transfer apparatus of the first embodiment) and edge nodes 105, 112, and 119 serving as connectionless packet communication terminals (corresponding to the packet transfer apparatuses of the first embodiment).

The edge node 105 has connection interfaces 109, 110, and 111. The edge node 112 has connection interfaces 116, 117, and 118. The edge node 119 has connection interfaces 123, 124, and 125.

The core node 126 has connection interfaces 127, 128, and 129.

A transmission link 130 serving as the transmission link of the connection network is arranged between the edge node 105 and the wavelength switch 102. A transmission link 131 is arranged between the wavelength switches 102 and 103. A transmission link 132 is arranged between the wavelength switches 102 and 104. A transmission link 135 is arranged between the wavelength switch 102 and the core node 126. Wavelength paths are set as connections.

In this embodiment, as shown in FIG. 9, a wavelength path 136 is set between the edge node 105 and the core node 126 as a default wavelength path. A wavelength path 137 is set between the core node 126 and the edge node 119. A wavelength path 138 is set between the core node 126 and the edge node 112.

The wavelength path 136 uses the connection interface 109 of the edge node 105 and the connection interface 129 of the core node 126. The wavelength path 137 uses the connection interface 128 of the core node 126 and the connection interface 123 of the edge node 119. The wavelength path 138 uses the connection interface 127 of the core node 126 and the connection interface 116 of the edge node 112.

An IPv6 network 139 serving as a connectionless packet transfer network includes the core node 126 serving as an IPv6 packet transfer node and the edge nodes 105, 112, and 119 serving as IPv6 packet communication terminals.

An IPv4 network 140 serving as a user network includes the edge nodes 105, 112, and 119 serving as IPv4 relay nodes and user terminals 141 to 158 serving as IPv4 user terminals.

The user terminals 141 and 142 belong to a VPN 159. The user terminals 143 and 144 belong to a VPN 160. The user terminals 145 and 146 belong to a VPN 161. The user terminals 147 and 148 belong to a VPN 162. The user terminals 149 and 150 belong to a VPN 163. The user terminals 151 and 152 belong to a VPN 164. The user terminals 153 and 154 belong to a VPN 165. The user terminals 155 and 156 belong to a VPN 166. The user terminals 157 and 158 belong to a VPN 167.

The edge node 105 and user terminals 141, 142, 143, 144, 145, and 146 are connected by access links 168, 169, 170, 171, 172, and 173. The edge node 112 and user terminals 147, 148, 149, 150, 151, and 152 are connected by access links 174, 175, 176, 177, 178, and 179. The edge node 119 and user terminals 153, 154, 155, 156, 157, and 158 are connected by access links 180, 181, 182, 183, 184, and 185.

In this network model, the edge nodes 105, 112, and 119 have transfer function units 106 to 108, 113 to 115, and 120 to 122, respectively. These transfer function units store the VPNs of users. For example, the user terminals 141 and 142 belonging to the VPN 159 under the edge node 105 communicate with user terminals belonging to a VPN under another edge node through the transfer function unit 106.

An IPv4 packet from a user terminal is transmitted to an edge node through an access link. The edge node sends the IPv4 packet transmitted from the user terminal to a transfer function unit corresponding to the VPN to which the user terminal belongs. The transfer function unit encapsulates the IPv4 packet into an IPv6 packet. The generated IPv6 packet is transferred to the core node or an edge node on the receiving side through a wavelength path.

The core node 126 sends an IPv6 packet received from a wavelength path to another wavelength path, thereby transferring the IPv6 packet to an edge node on the receiving side.

The edge node on the receiving side extracts the IPv4 packet from the received IPv6 packet and transfers the extracted IPv4 packet to the user terminal at the destination through an access link.

It is an object of this embodiment to, in such a network model (transfer plane), calculate and set optimum routing of the wavelength path of the photonic network and IPv6 packet assignment to the optimum wavelength path simultaneously within a practically short time on the basis of the traffic band and priority of the IPv6 packet.

Figure 10:
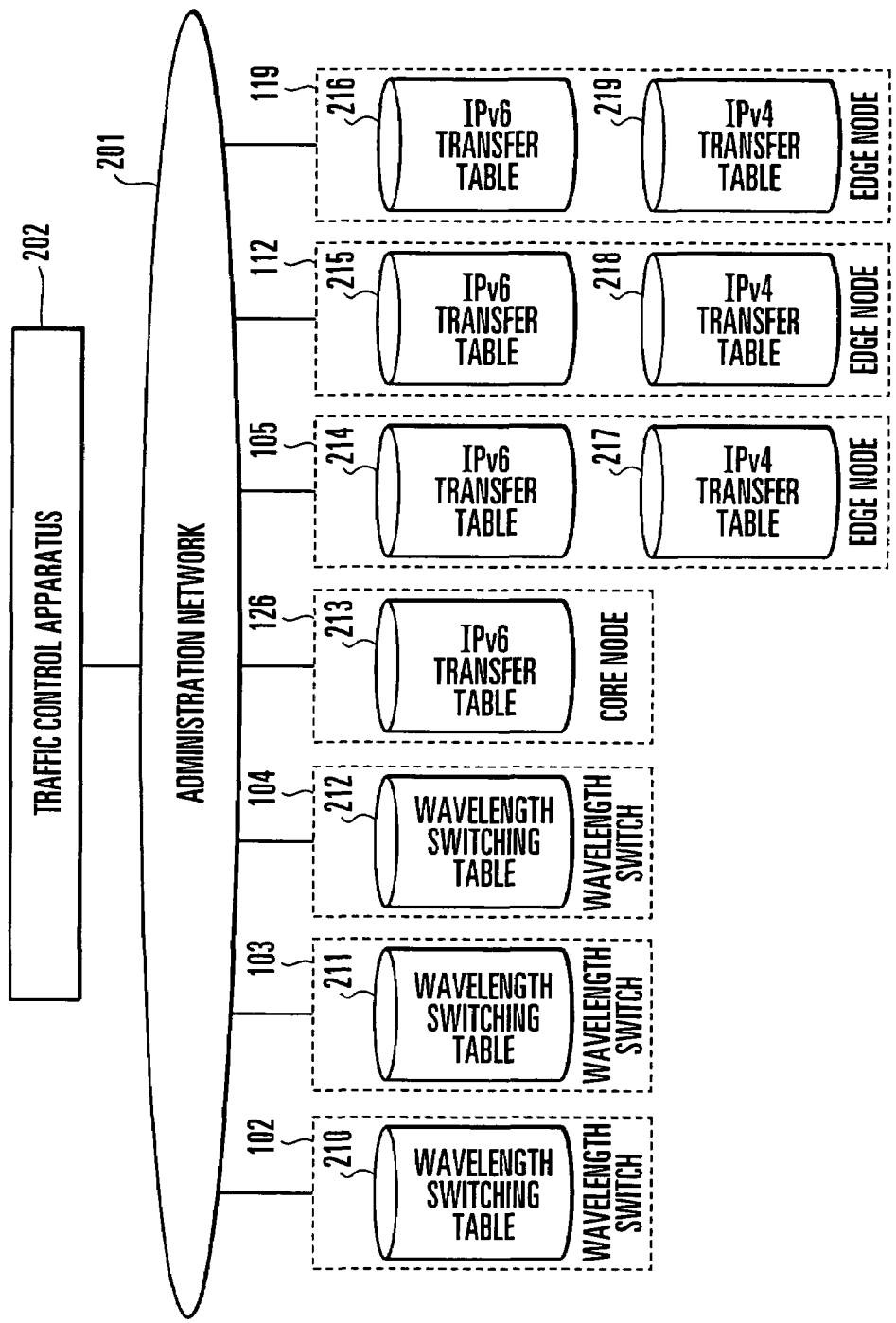
FIG. 10 is a block diagram showing the arrangement of traffic control of the network model according to the second embodiment of the present invention.

To make such setting possible, in this embodiment, the network model shown in FIG. 10 is applied to the network model (transfer plane) shown in FIG. 9. FIG. 10 shows the arrangement of the network model of this embodiment viewed from the viewpoint of traffic control. The network model viewed from the viewpoint of traffic control will be referred to as a control plane hereinafter.

In this network model (control plane), a traffic control apparatus 202 (corresponding to the network control server of the first embodiment) is connected to the wavelength switches 102 to 104, core node 126, and edge nodes 105, 112, and 119 through an administration network 201.

The wavelength switches 102 to 104 incorporate wavelength switching tables 210 to 212, respectively. The core node 126 incorporates an IPv6 transfer table 213. The edge nodes 105, 112, and 119 incorporate IPv6 transfer tables 214 to 216 and IPv4 transfer tables 217 to 219, respectively.

The wavelength switching tables 210 to 212 make the input interface numbers, input wavelengths, output interface numbers, and output wavelengths of the wavelength switches 102 to 104 correspond to each other. The IPv6 transfer table 213 of the core node 126 makes the destination IP addresses of input IPv6 packets correspond to output interface numbers. The IPv6 transfer tables 214 to 216 of the edge nodes 105, 112, and 119 make the destination IP addresses of input IPv4 packets, IPv6 addresses, and output interface numbers correspond to each other. The IPv4 transfer tables 217 to 219 make the destination IP addresses of input IPv4 packets correspond to output interface numbers. The traffic control apparatus 202 can rewrite the tables through the administration network 201.

Figure 11:
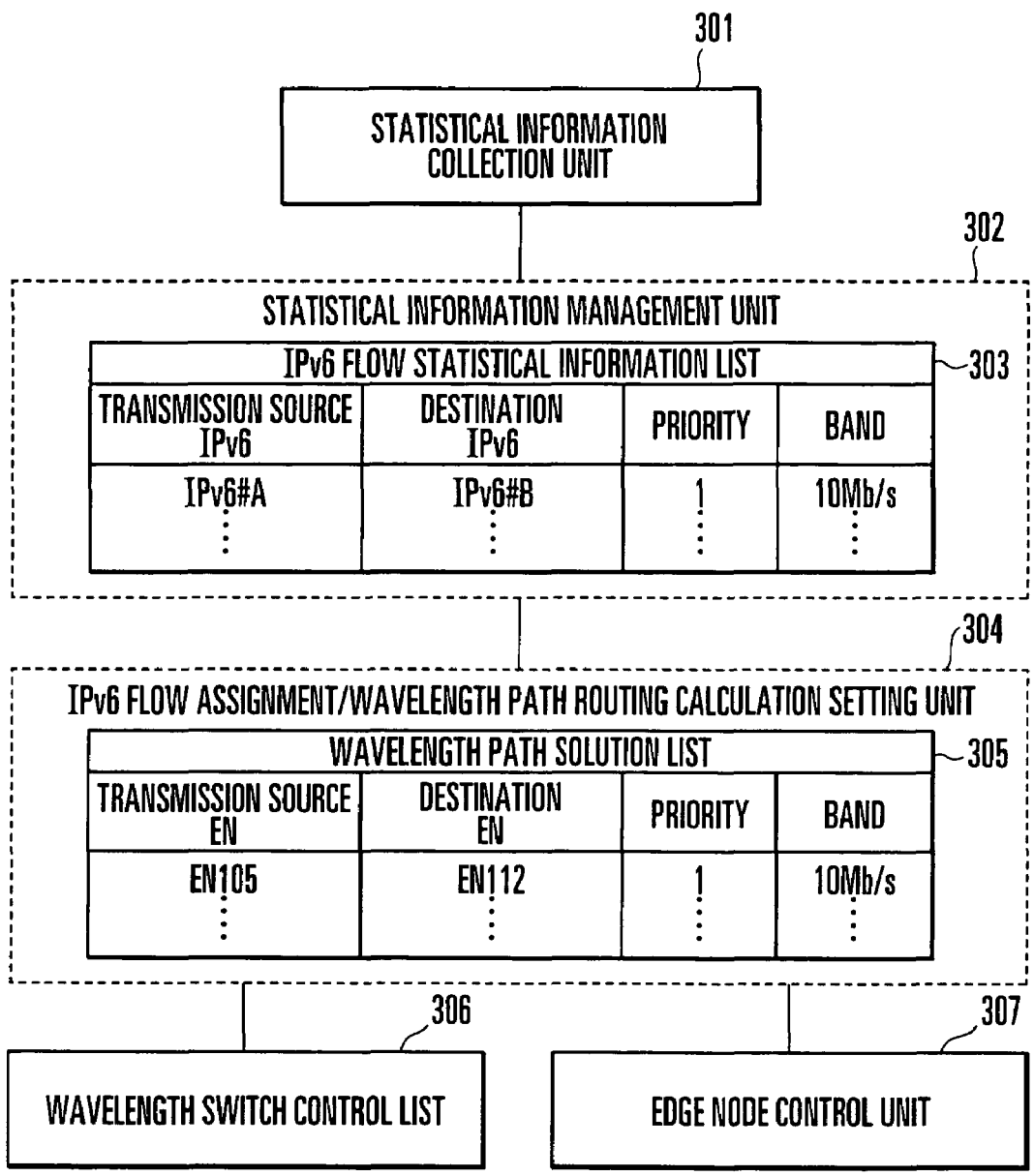
FIG. 11 is a block diagram showing the arrangement of a traffic control apparatus according to the second embodiment of the present invention.

The rewrite of the tables is implemented by the arrangement of the traffic control apparatus 202 shown in FIG. 11. As shown in FIG. 11, the traffic control apparatus 202 includes a statistical information collection unit 301, statistical information management unit 302, IPv6 flow assignment/wavelength path routing calculation setting unit 304, wavelength switch control unit 306, and edge node control unit 307.

Each of the edge nodes 105, 112, and 119 has a means for recording statistical information containing a band and priority for each flow defined by a pair of a transmission source IPv6 address and destination IPv6 address for each transmitted/received IPv6 packet, and a means for notifying the traffic control apparatus 202 of the recorded statistical information.

The statistical information collection unit 301 of the traffic control apparatus 202 collects statistical information from the edge nodes 105, 112, and 119 and transmits the collected statistical information to the statistical information management unit 302. The statistical information management unit 302 analyzes the information collected from the edge nodes 105, 112, and 119 and creates an IPv6 flow statistical information list (flow list) 303. Each entry of the IPv6 flow statistical information list 303 includes a transmission source IPv6 address, destination IPv6 address, IPv6 flow priority, and IPv6 flow band. The IPv6 flow statistical information list 303 is sent to the IPv6 flow assignment/wavelength path routing calculation setting unit 304.

The IPv6 flow assignment/wavelength path routing calculation setting unit 304 executes assignment calculation of the IPv6 flow to the wavelength path and wavelength path routing on the basis of the IPv6 flow statistical information list 303 and creates a wavelength path solution list 305 to control the traffic. The traffic control method according to this embodiment will be described below with reference to FIG. 12. For a detailed description, the list shown in FIG. 13 is used as an example of the IPv6 flow statistical information list 303.

The IPv6 flow assignment/wavelength path routing calculation setting unit 304 receives the IPv6 flow statistical information list 303 shown in FIG. 13 from the statistical information management unit 302 and sorts the IPv6 flows (entries) of the IPv6 flow statistical information list 303 in descending order of priority, as shown in FIG. 14. Flows with the same priority are sorted in descending order of band for each priority (step S1 in FIG. 12).

The IPv6 flow assignment/wavelength path routing calculation setting unit 304 assigns a wavelength path candidate for each flow registered in the IPv6 flow statistical information list 303 sorted as shown in FIG. 14 assuming that a wavelength path (connection) is set between the transmission source edge node and the destination edge node of the flow. This operation is executed for all flows sequentially from the uppermost flow in the IPv6 flow statistical information list 303, thereby creating a wavelength path candidate list (connection candidate list) 308 as shown in FIG. 15 (step S2). Referring to FIG. 15, "EN" indicates an edge node. The wavelength path candidate list makes the transmission source edge node, destination edge node, flow priority, and flow band of each flow correspond to each other. The uppermost flow in the IPv6 flow statistical information list 303 has the highest priority, and the widest band if the priority is the same.

At this time, the IPv6 flow assignment/wavelength path routing calculation setting unit 304 assigns one or more flows having the same transmission source edge node, same destination edge node, and same priority to the same wavelength path candidate such that the sum of bands does not exceed the capacity of the wavelength path candidate. Hence, the priority of each wavelength path candidate registered in the wavelength path candidate list 308 is the priority of the flow assigned to this wavelength path candidate. The band of each wavelength path candidate equals the sum of bands of one or more flows assigned to this wavelength path candidate.

For example, in the IPv6 flow statistical information list 303 shown in FIG. 15, the uppermost flow having a transmission source IPv6 address of "IPv6#A" and a destination IPv6 address of "IPv6#D" is assigned to the wavelength path candidate having "105" as the transmission source edge node and "112" as the destination edge node. The second flow (the transmission source IPv6 address is "IPv6#B" and the destination IPv6 address is "IPv6#D") is assigned to the same wavelength path candidate. At this time, the band of this wavelength path candidate equals the sum of the bands of the uppermost and second flows, i.e., "10". When the second flow is assigned, the wavelength path candidate has no remaining capacity. Hence, another wavelength path candidate having "105" as the transmission source edge node and "112" as the destination edge node is set, and the third and fourth flows are assigned to this wavelength path candidate. Such wavelength path candidate assignment is done for all flows in the IPv6 flow statistical information list 303.

The IPv6 addresses of the transfer function units 106, 107, and 108 of the edge node 105 are "IPv6#A", "IPv6#B", and "IPv6#C", as shown in FIG. 9. The IPv6 addresses of the transfer function units 113, 114, and 115 of the edge node 112 are "IPv6#D", "IPv6#E", and "IPv6#F". The IPv6 addresses of the transfer function units 120, 121, and 122 of the edge node 119 are "IPv6#G", "IPv6#H", and "IPv6#I".

Next, the IPv6 flow assignment/wavelength path routing calculation setting unit 304 sorts the wavelength path candidate list 308 shown in FIG. 15 in descending order of priority as shown in FIG. 16. Wavelength path candidates with the same priority are sorted in descending order of band for each priority (step S3 in FIG. 12).

The IPv6 flow assignment/wavelength path routing calculation setting unit 304 extracts a wavelength path candidate from the wavelength path candidate list 308 sorted as shown in FIG. 16 and reserves the connection interface of an edge node for the wavelength path candidate. Such connection interface reservation is done for all wavelength path candidates sequentially from the uppermost wavelength path candidate in the wavelength path candidate list 308 (step S4 in FIG. 12). In the example shown in FIG. 17, connection interfaces can be reserved for the first, second, and fifth wavelength path candidates of the wavelength path candidate list 308, and no reservation can be done for the remaining wavelength path candidates.

Figure 12:
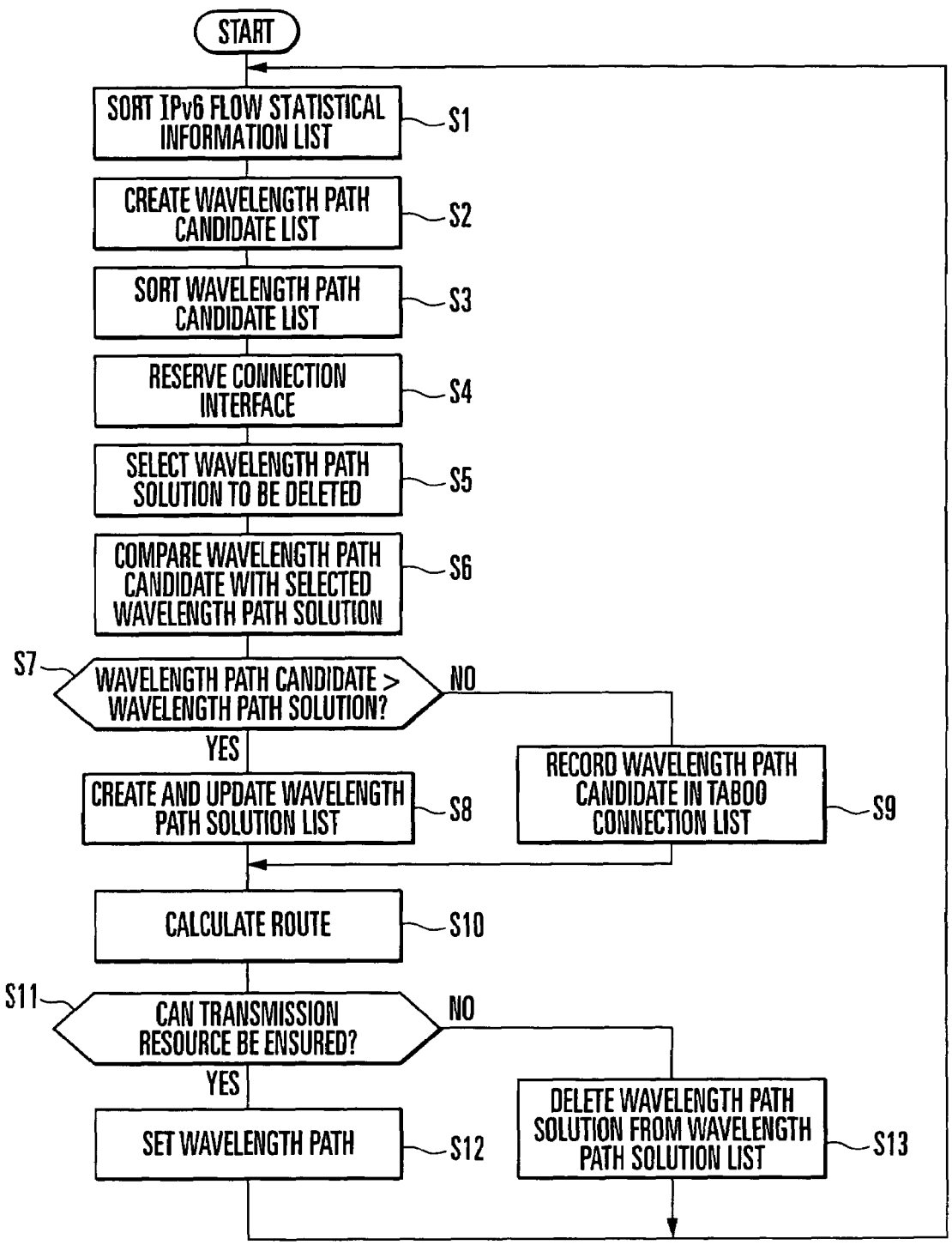
FIG. 12 is a flowchart showing a traffic control method according to the second embodiment of the present invention.

The IPv6 flow assignment/wavelength path routing calculation setting unit 304 selects a wavelength path solution which requires no setting from the wavelength path solution list (connection solution list) in which the wavelength paths (wavelength path solutions) to be set are registered (step S5 in FIG. 12). The wavelength path solution which requires no setting is a wavelength path solution which is present in the wavelength path solution list but not in the current wavelength path candidate list 308.

The IPv6 flow assignment/wavelength path routing calculation setting unit 304 sets, of the wavelength path candidates which can be reserved in the wavelength path candidate list 308, the uppermost wavelength path candidate which is not registered in the taboo connection list (to be described later) as the wavelength path candidate as the processing target and compares the priority and band of the wavelength path candidate as the processing target with those of the wavelength path solution selected from the wavelength path solution list (step S6 in FIG. 12). In this comparison, the priorities are compared first. If the priority is the same, the bands are compared.

If YES in step S7, i.e., if the wavelength path candidate as the processing target has a priority and band more than those of the wavelength path solution selected from the wavelength path solution list (when the wavelength path candidate as the processing target has a higher priority, or a wider band if the priority is the same), the IPv6 flow assignment/wavelength path routing calculation setting unit 304 excludes the wavelength path candidate as the processing target from the wavelength path candidate list 308 and adds it to the wavelength path solution list and excludes the selected wavelength path solution from the wavelength path solution list and adds it to the wavelength path candidate list 308, thereby changing the connection interface reservation state (step S8). In this way, the wavelength path solution list can be created and updated such that the priority and band of the wavelength path solution can be improved.

When the wavelength path candidate as the processing target has a priority and band equal to or less than those of the selected wavelength path solution, the IPv6 flow assignment/wavelength path routing calculation setting unit 304 records the wavelength path candidate as the processing target in the taboo connection list (step S9 in FIG. 12).

When the taboo connection list is used, the wavelength path candidate which is evaluated once can be prevented from being evaluated continuously. Evaluation of the wavelength path candidate whose priority and band do not improve can be prevented. Since the probability for obtaining the optimum wavelength path candidate with a small calculation amount can be increased, the calculation amount can be reduced.

The IPv6 flow assignment/wavelength path routing calculation setting unit 304 calculates a route in the photonic network 101 when the uppermost wavelength path of the wavelength path solution list is set between the transmission source edge node and the destination edge node (step S10 in FIG. 12). The IPv6 flow assignment/wavelength path routing calculation setting unit 304 determines whether a transmission resource necessary for transmitting the uppermost wavelength path of the wavelength path solution list can be ensured in the transmission link on the calculated route (step S11 in FIG. 12).

If YES in step S11, the IPv6 flow assignment/wavelength path routing calculation setting unit 304 controls the switching functions of the wavelength switches 102 to 104 to set the uppermost wavelength path of the wavelength path solution list. In addition, the IPv6 flow assignment/wavelength path routing calculation setting unit 304 controls the transmission function of the transmission source edge node of the flow such that the flow assigned to the uppermost wavelength path of the wavelength path solution list in step S2 is transmitted by using the wavelength path and deletes the uppermost wavelength path from the wavelength path solution list (step S12 in FIG. 12).

Figure 18:
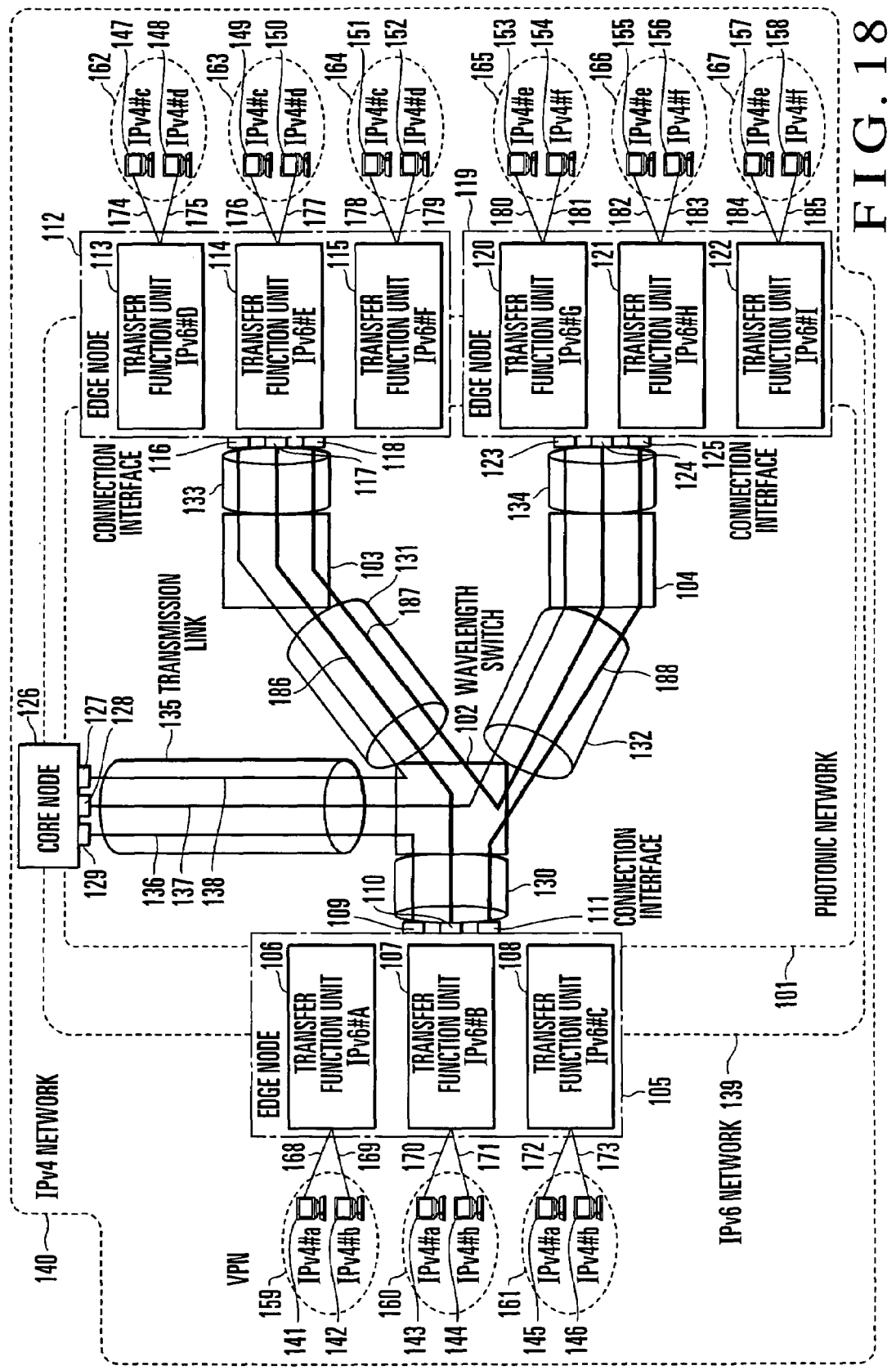
FIG. 18 is a view showing a state in which the wavelength paths are set in the network model by the traffic control method according to the second embodiment of the present invention.

For example, the IPv6 flow assignment/wavelength path routing calculation setting unit 304 rewrites the wavelength switching tables 210 to 212 of the wavelength switches 102 to 104 through the wavelength switch control unit 306 to set wavelength paths 186 to 188, as shown in FIG. 18. Simultaneously, the IPv6 flow assignment/wavelength path routing calculation setting unit 304 sets the IPv6 transfer tables 214 to 216 of the edge nodes 105, 112, and 119 through the edge node control unit 307 so that the set edge nodes 105, 112, and 119 supply IPv6 flows assigned as shown in FIG. 15 to the wavelength paths 186 to 188. At this time, the edge nodes 105, 112, and 119 send the packets to be sent to the destination edge node to the wavelength paths 186 to 188 in accordance with the IPv6 transfer tables 214 to 216.

The IPv6 flow assignment/wavelength path routing calculation setting unit 304 sets the IPv6 transfer tables 214 to 216 of the edge nodes 105, 112, and 119 such that the IPv6 flows, which are planned to flow through the wavelength paths for which no connection interfaces can be reserved in the wavelength path candidate list 308, can flow through the wavelength paths 136 to 138 via the core node 126.

If NO in step S11, the IPv6 flow assignment/wavelength path routing calculation setting unit 304 excludes the uppermost wavelength path from the wavelength path solution list and adds it to the wavelength path candidate list 308 (step S13).

The traffic control apparatus 202 repeatedly executes the above-described processing in steps S1 to S13 until the wavelength path solution list becomes empty. When the wavelength path solution list becomes empty, traffic control is ended.

The traffic control can also be ended when no connection interface can be reserved for any of the wavelength path candidates registered in the wavelength path candidate list 308 in step S4 or when no transmission resource can be ensured for any of the wavelength path solutions registered in the wavelength path solution list in step S11. Even in this case, the traffic control shown in FIG. 12 is ended.

With the above-described control, in this embodiment, optimum assignment of IPv6 flows on the IPv6 network 139 to the wavelength paths on the photonic network 101 is calculated, and optimum routing of the wavelength paths on the photonic network 101 is calculated and set in consideration of the priority and band. With this operation, the transfer capacity of the IPv6 network 139 is maximized, and the utilization efficiency of the transmission links and connection interfaces in the photonic network 101 can be maximized.

Third Embodiment

Figure 19:
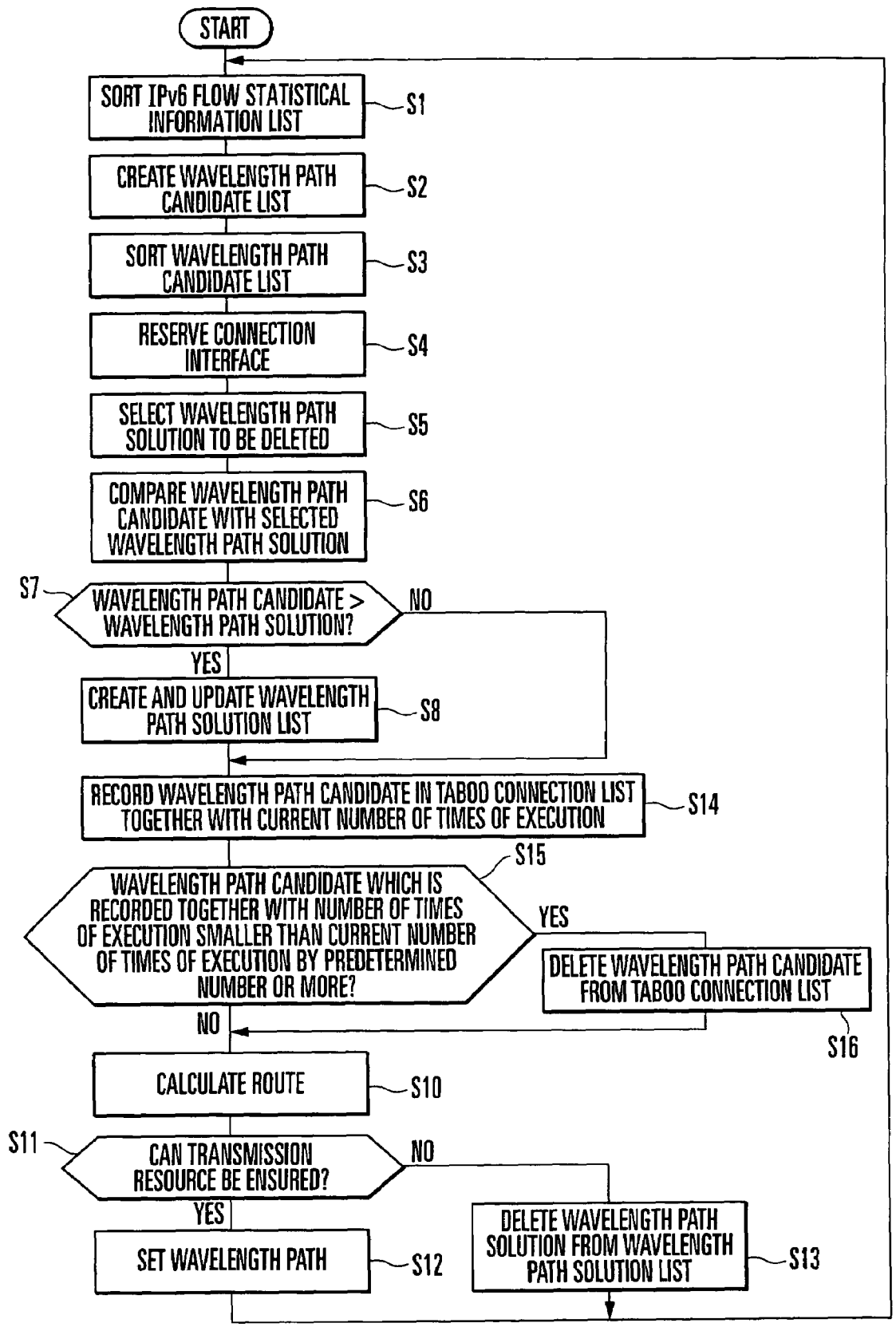
FIG. 19 is a flowchart showing a traffic control method according to the third embodiment of the present invention.

The third embodiment of the present invention will be described next. The arrangement of the network model of this embodiment is the same as that of the second embodiment and will be described by using the same reference numerals as in FIGS. 9 to 11. FIG. 19 is a flowchart showing a traffic control method according to this embodiment. The same step numbers as in FIG. 12 denote the same processing operations in FIG. 19.

Processing in steps S1 to S7 is the same as in the second embodiment. If YES in step S7, i.e., if the wavelength path candidate as the processing target has a priority and band more than those of the wavelength path solution selected from the wavelength path solution list, an IPv6 flow assignment/wavelength path routing calculation setting unit 304 of a traffic control apparatus 202 excludes the wavelength path candidate as the processing target from a wavelength path candidate list 308 and adds it to the wavelength path solution list and excludes the selected wavelength path solution from the wavelength path solution list and adds it to the wavelength path candidate list 308, thereby changing the connection interface reservation state (step S8).

When processing in step S8 is ended, or NO in step S7, the IPv6 flow assignment/wavelength path routing calculation setting unit 304 records, in the taboo connection list, the wavelength path candidate as the processing target together with the current number of times of execution of comparison processing in step S6 (step S14 in FIG. 19).

The IPv6 flow assignment/wavelength path routing calculation setting unit 304 determines whether a wavelength path candidate which is recorded together with the number of times of execution smaller than the current number of times of execution of comparison processing by a predetermined number or more is present in the taboo connection list (step S15). If YES in step S15, the wavelength path candidate is deleted from the taboo connection list (step S16). Processing in steps S10 to S13 is the same as in the second embodiment.

According to this embodiment, the same effect as in the second embodiment can be obtained. In addition, according to this embodiment, the wavelength path candidate as the processing target is recorded in the taboo connection list together with the current number of times of execution of comparison processing. A wavelength path candidate which is recorded together with the number of times of execution smaller than the current number of times of execution of comparison processing by a predetermined number or more is deleted from the taboo connection list. Hence, the wavelength path candidate for which a time has elapsed after it is recorded in the taboo connection list can be deleted from the taboo connection list and set as the wavelength path candidate as the processing target again. In addition, since the wavelength path candidate which is recorded together with the number of times of execution smaller than the current number of times of execution of comparison processing by a predetermined number or more is deleted from the taboo connection list, the increase in capacity of the taboo connection list can be suppressed as compared to the second embodiment.

Fourth Embodiment

In the second and third embodiments, the timing of sending statistical information from the edge nodes 105, 112, and 119 to the traffic control apparatus 202 and the timing of causing the traffic control apparatus 202 to create the IPv6 flow statistical information list 303 have not been described. In the second and third embodiments, the traffic control apparatus 202 may set the statistical information notification interval for the edge nodes 105, 112, and 119.

Edge nodes 105, 112, and 119 record statistical information for each flow, which is defined by the pair of the transmission source IPv6 address and destination IPv6 address of a received packet, at the set notification interval and notifies a traffic control apparatus 202 of the statistical information.

A statistical information management unit 302 of the traffic control apparatus 202 analyzes the information collected from the edge nodes 105, 112, and 119. If the information is different from information of an already created IPv6 flow statistical information list 303, the IPv6 flow statistical information list 303 is updated on the basis of the information collected from the edge nodes 105, 112, and 119.

In this embodiment, the statistical information notification interval is appropriately controlled. Hence, an optimum network utilization efficiency can be maintained by following the moderate variation in traffic band while suppressing the load on the traffic control apparatus 202 and edge nodes 105, 112, and 119.

Fifth Embodiment

In the second and third embodiments, the traffic control apparatus 202 may set, for the edge nodes 105, 112, and 119, the threshold value of the band for each flow defined by a pair of a transmission source IPv6 address and destination IPv6 address.

Edge nodes 105, 112, and 119 record statistical information for each flow for a received packet. When the band of the recorded flow exceeds a set threshold value, a traffic control apparatus 202 is notified of the statistical information of the flow which exceeds the threshold value.

A statistical information management unit 302 of the traffic control apparatus 202 analyzes the information collected from the edge nodes 105, 112, and 119 and updates an IPv6 flow statistical information list 303.

In this embodiment, when the traffic abruptly varies, the statistical information is sent immediately regardless of the notification interval. Hence, an optimum network utilization efficiency can be maintained by following the abrupt variation in traffic band.

Sixth Embodiment

This embodiment will be described below by using an example in which an IPv6 connectionless transfer network is built on a photonic network to store a user network including an IPv4 (Internet Protocol Version4) connectionless transfer network.

Figure 20:
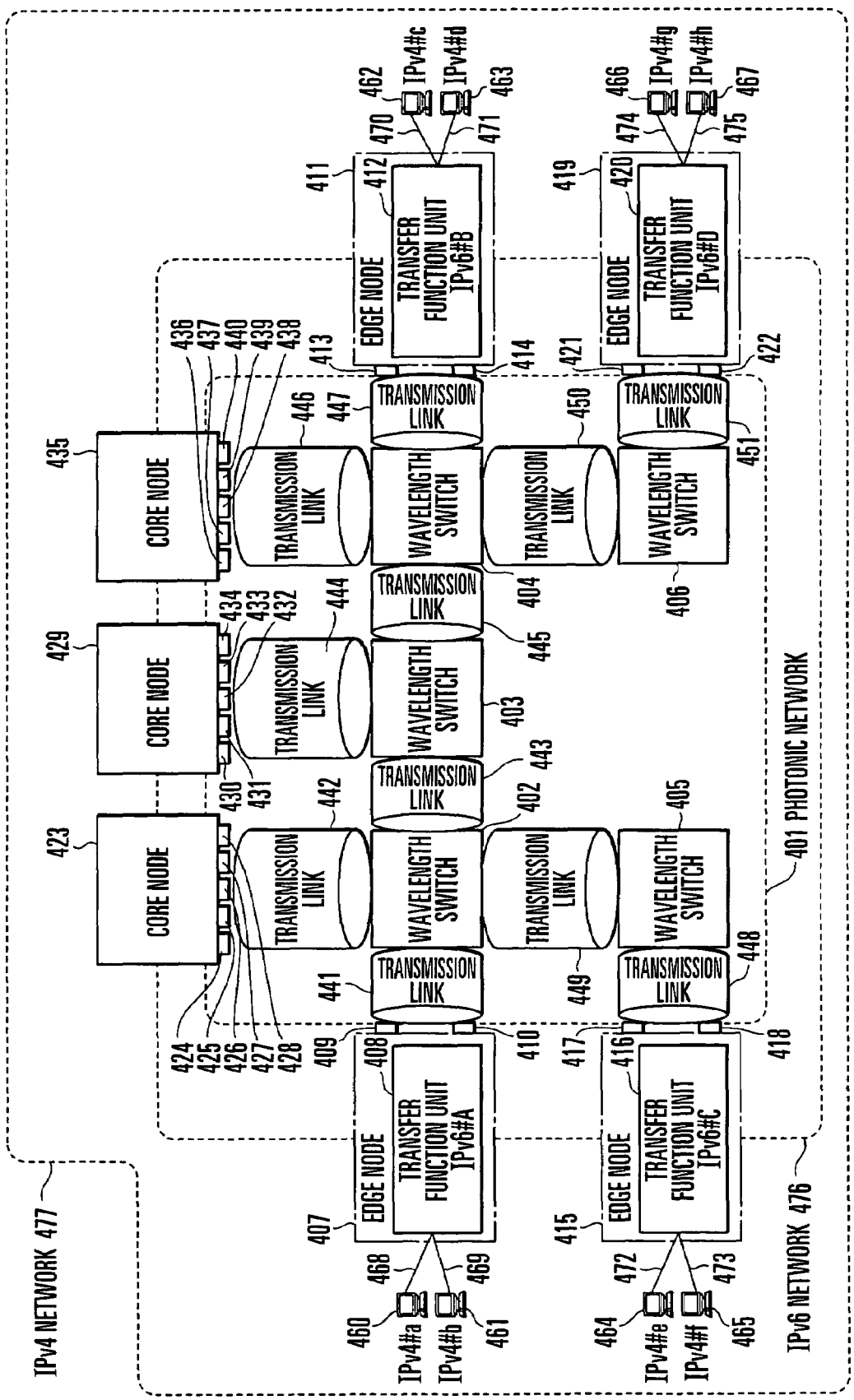
FIG. 20 is a block diagram showing the arrangement of the packet transfer path of a network model according to the sixth embodiment of the present invention.

FIG. 20 is a block diagram showing an example of a network model according to the sixth embodiment of the present invention. FIG. 20 shows the arrangement of the network model of this embodiment viewed from the viewpoint of packet transfer path. The network model viewed from the viewpoint of packet transfer path will be referred to as a transfer plane hereinafter.

Figure 30:
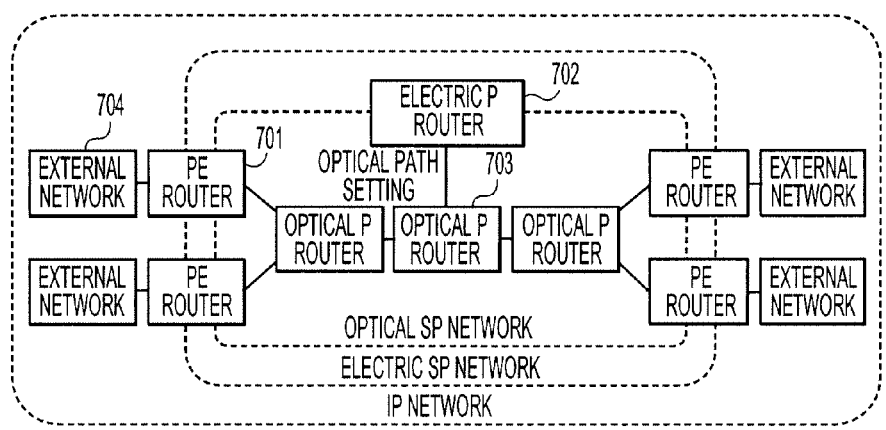
FIG. 30 is a block diagram showing the arrangement of a conventional terabit-class super-network.

A photonic network 401 serving as a connection network includes wavelength switches 402 to 406 serving as connection switching nodes and the terminal function unit of the connection network. The terminal function unit of the connection network includes core nodes 423, 429, and 435 serving as connectionless packet transfer nodes (corresponding to the frame transfer apparatus of the first embodiment) and edge nodes 407, 411, 415, and 419 serving as connectionless packet communication terminals (corresponding to the packet transfer apparatuses of the first embodiment). Each of the edge nodes 407, 411, 415, and 419 corresponds to the PE router 501 in FIG. 30. Each of the core nodes 423, 429, and 435 corresponds to the electric P router 502. Each of the wavelength switches 402 to 406 corresponds to the optical P router 503.

The edge node 407 has connection interfaces 409 and 410. The edge node 411 has connection interfaces 413 and 414. The edge node 415 has connection interfaces 417 and 418. The edge node 419 has connection interfaces 421 and 422.

The core node 423 has connection interfaces 424 to 428. The core node 429 has connection interfaces 430 to 434. The core node 435 has connection interfaces 436 to 440.

A transmission link 441 serving as the transmission link of the connection network is arranged between the edge node 407 and the wavelength switch 402. A transmission link 442 is arranged between the core node 423 and the wavelength switch 402. A transmission link 443 is arranged between the wavelength switches 402 and 403. A transmission link 444 is arranged between the core node 429 and the wavelength switch 403. A transmission link 445 is arranged between the wavelength switches 403 and 404. A transmission link 446 is arranged between the core node 435 and the wavelength switch 404. A transmission link 447 is arranged between the edge node 411 and the wavelength switch 404. A transmission link 448 is arranged between the edge node 415 and the wavelength switch 405. A transmission link 449 is arranged between the wavelength switches 402 and 405. A transmission link 450 is arranged between the wavelength switches 404 and 406. A transmission link 451 is arranged between the edge node 419 and the wavelength switch 406. Wavelength paths are set as connections.

Figure 21:
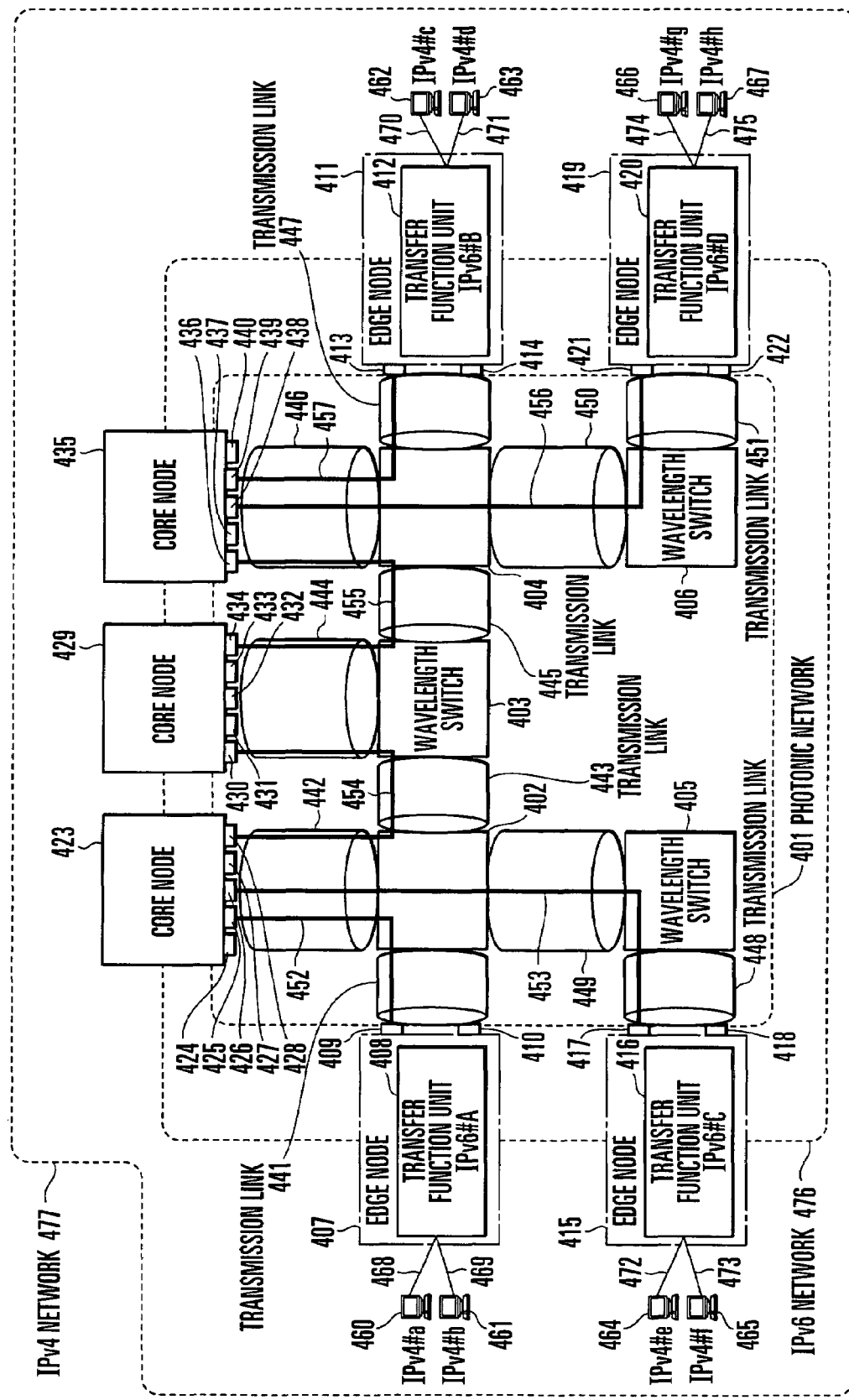
FIG. 21 is a view showing default wavelength paths to core nodes set in the network model shown in FIG. 20.

In this embodiment, as shown in FIG. 21, a wavelength path 452 is set between the edge node 407 and the core node 423 as a default wavelength path. A wavelength path 453 is set between the edge node 415 and the core node 423. A wavelength path 454 is set between the core nodes 423 and 429. A wavelength path 455 is set between the core nodes 429 and 435. A wavelength path 456 is set between the edge node 419 and the core node 435. A wavelength path 457 is set between the edge node 411 and the core node 435.

The wavelength path 452 uses the connection interface 409 of the edge node 407 and the connection interface 425 of the core node 423. The wavelength path 453 uses the connection interface 417 of the edge node 415 and the connection interface 426 of the core node 423. The wavelength path 454 uses the connection interface 428 of the core node 423 and the connection interface 430 of the core node 429. The wavelength path 455 uses the connection interface 434 of the core node 429 and the connection interface 436 of the core node 435. The wavelength path 456 uses the connection interface 421 of the edge node 419 and the connection interface 438 of the core node 435. The wavelength path 457 uses the connection interface 143 of the edge node 411 and the connection interface 439 of the core node 435.

An IPv6 network 476 serving as a connectionless packet transfer network includes the core nodes 423, 429, and 435 serving as IPv6 packet transfer nodes and the edge nodes 407, 411, 415, and 419 serving as IPv6 packet communication terminals.

An IPv4 network 477 serving as a user network includes the edge nodes 407, 411, 415, and 419 serving as IPv4 relay nodes and user terminals 460 to 467 serving as IPv4 user terminals.

The edge node 407 and user terminals 460 and 461 are connected by access links 468 and 469. The edge node 411 and user terminals 462 and 463 are connected by access links 470 and 471. The edge node 415 and user terminals 464 and 465 are connected by access links 472 and 473. The edge node 419 and user terminals 466 and 467 are connected by access links 474 and 475.

In this network model, the edge nodes 407, 411, 415, and 419 have transfer function units 408, 412, 416, and 420, respectively. The transfer function units 408, 412, 416, and 420 store the user terminals. For example, the user terminals 460 and 461 under the edge node 407 exchange an IPv4 packet with user terminals under another edge node through the transfer function unit 408.

An IPv4 packet from a user terminal is transmitted to an edge node through an access link. The edge node sends the IPv4 packet transmitted from the user terminal to the transfer function unit. The transfer function unit encapsulates the IPv4 packet into an IPv6 packet. The generated IPv6 packet is transferred to the core node or an edge node on the receiving side through a wavelength path.

The core node confirms the header of an IPv6 packet received from a wavelength path and sends the received IPv6 packet to another wavelength path in accordance with the IPv6 transfer table.

The edge node on the receiving side extracts the IPv4 packet from the received IPv6 packet, confirms the header of the IPv4 packet, and transfers it to the user terminal at the destination through an access link.

In this embodiment, a wavelength path which is set without passing through a core node which may have congestion will be referred to as a cut-through optical path. It is an object of this embodiment to execute setting without decreasing the number of cut-through optical paths even when the number of connection interfaces of the edge nodes is small as compared to the network scale and transfer an IPv6 packet passing through a core node which may have congestion by using a cut-through optical path.

Figure 22:
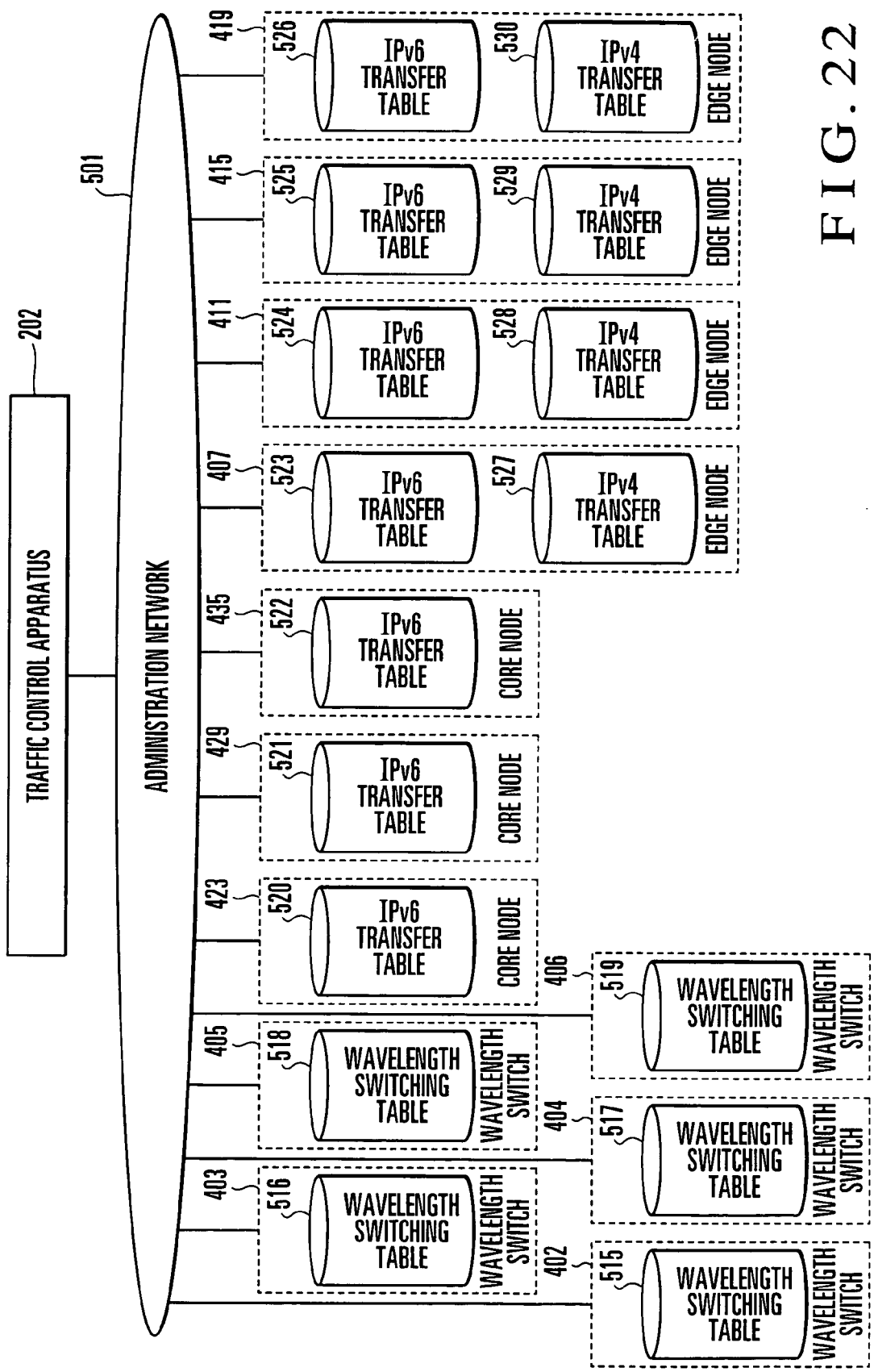
FIG. 22 is a block diagram showing the arrangement of connection setting of the network model according to the sixth embodiment of the present invention.

To make such setting possible, in this embodiment, the network model shown in FIG. 22 is applied to the network model (transfer plane) shown in FIG. 20. FIG. 22 shows the arrangement of the network model of this embodiment viewed from the viewpoint of connection setting. The network model viewed from the viewpoint of connection setting will be referred to as a control plane hereinafter.

In this network model (control plane), a traffic control apparatus 502 (corresponding to the network control server of the first embodiment) is connected to the wavelength switches 402 to 406, core nodes 423, 429, and 435, and edge nodes 407, 411, 415, and 419 through an administration network 501.

The wavelength switches 402 to 406 incorporate wavelength switching tables 515 to 519, respectively. The core nodes 423, 429, and 435 incorporate IPv6 transfer tables 520 to 522, respectively. The edge nodes 407, 411, 415, and 419 incorporate IPv6 transfer tables 523 to 526 and IPv4 transfer tables 527 to 530, respectively.

The wavelength switching tables 515 to 519 of the wavelength switches 402 to 406 make the input interface numbers, input wavelengths, output interface numbers, and output wavelengths of the wavelength switches 402 to 406 correspond to each other. The IPv6 transfer tables 520 to 522 of the core nodes 423, 429, and 435 make the destination IP addresses of input IPv6 packets correspond to output interface numbers. The IPv6 transfer tables 523 to 526 of the edge nodes 407, 411, 415, and 419 make the destination IP addresses of input IPv4 packets, IPv6 addresses, and output interface numbers correspond to each other. The IPv4 transfer tables 527 to 530 make the destination IP addresses of input IPv4 packets correspond to output interface numbers. The traffic control apparatus 502 can rewrite the tables through the administration network 501.

Figure 23:
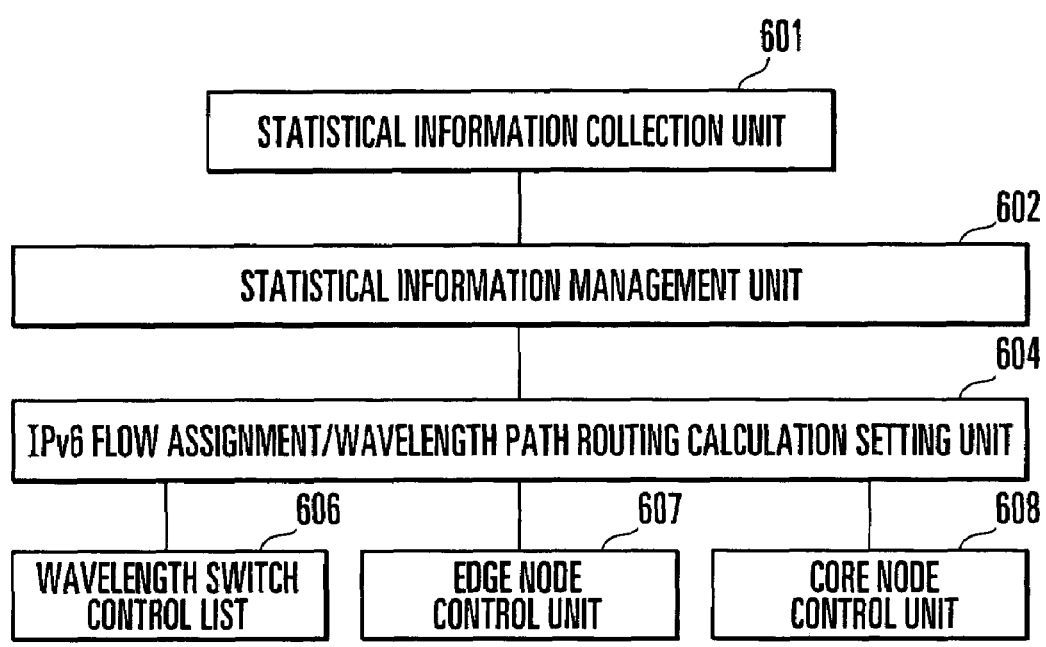
FIG. 23 is a block diagram showing the arrangement of a traffic control apparatus according to the sixth embodiment of the present invention.

The rewrite of the tables is implemented by the arrangement of the traffic control apparatus 502 shown in FIG. 23. As shown in FIG. 23, the traffic control apparatus 502 includes a statistical information collection unit 601, statistical information management unit 602, IPv6 flow assignment/wavelength path routing calculation setting unit 604, wavelength switch control unit 606, edge node control unit 607, and core node control unit 608.

Each of the edge nodes 407, 411, 415, and 419 has a means for recording statistical information containing a band and priority for each flow defined by a pair of a transmission source IPv6 address and destination IPv6 address for each transmitted/received IPv6 packet, and a means for notifying the traffic control apparatus 502 of the recorded statistical information. For example, each the edge nodes 407, 411, 415, and 419 receives notification interval setting from the traffic control apparatus 502 and executes recording and notification of statistical information at the notification interval.

The statistical information collection unit 601 of the traffic control apparatus 502 collects statistical information from the edge nodes 407, 411, 415, and 419 and transmits the collected statistical information to the statistical information management unit 602. The statistical information management unit 602 analyzes the information collected from the edge nodes 407, 411, 415, and 419 and creates/updates an IPv6 flow statistical information list. Each entry of the IPv6 flow statistical information list includes a transmission source IPv6 address, destination IPv6 address, IPv6 flow priority, and IPv6 flow band. The IPv6 flow statistical information list is sent to the IPv6 flow assignment/wavelength path routing calculation setting unit 604.

The IPv6 flow assignment/wavelength path routing calculation setting unit 604 sorts the IPv6 flow statistical information list in descending order of priority. Flows with the same priority are sorted in descending order of band. The IPv6 flow assignment/wavelength path routing calculation setting unit 604 assigns a wavelength path candidate for each flow registered in the sorted IPv6 flow statistical information list assuming that a wavelength path (connection) is set between the transmission source edge node and the destination edge node of the flow. This operation is executed for all flows sequentially from the uppermost flow in the IPv6 flow statistical information list, thereby creating a wavelength path candidate list (connection candidate list). The wavelength path candidate list makes the transmission source edge node, destination edge node, flow priority, and flow band of each flow correspond to each other.

For example, assume that the IPv6 address of the transfer function unit 408 of the edge node 407 is "IPv6#A", the IPv6 address of the transfer function unit 412 of the edge node 411 is "IPv6#B", the IPv6 address of the transfer function unit 416 of the edge node 415 is "IPv6#C", and the IPv6 address of the transfer function unit 420 of the edge node 419 is "IPv6#D". In the IPv6 flow statistical information list, the flow having a transmission source IPv6 address of "IPv6#A" and a destination IPv6 address of "IPv6#B" is assigned to the wavelength path having "407" as the transmission source edge node and "412" as the destination edge node.

Next, the IPv6 flow assignment/wavelength path routing calculation setting unit 604 sorts the wavelength path candidate list in descending order of priority. Wavelength path candidates with the same priority are sorted in descending order of band for each priority. The IPv6 flow assignment/wavelength path routing calculation setting unit 604 extracts a wavelength path candidate from the sorted wavelength path candidate list and reserves the connection interface of an edge node for the wavelength path candidate. Such reservation is done for all wavelength path candidates sequentially from the uppermost wavelength path candidate in the wavelength path candidate list. The IPv6 flow assignment/wavelength path routing calculation setting unit 604 regards each wavelength path candidate for which the reservation is possible in the wavelength path candidate list as a wavelength path to be set (wavelength path solution) and adds the wavelength path candidate to the wavelength path solution list.

The IPv6 flow assignment/wavelength path routing calculation setting unit 604 calculates a route in the photonic network 401 when the uppermost wavelength path of the wavelength path solution list is set between the transmission source edge node and the destination edge node. The IPv6 flow assignment/wavelength path routing calculation setting unit 604 determines whether a transmission resource necessary for transmitting the uppermost wavelength path of the wavelength path solution list can be ensured in the transmission link on the calculated route.

If it is determined that the transmission resource can be ensured, the IPv6 flow assignment/wavelength path routing calculation setting unit 604 controls the switching functions of the wavelength switches 402 to 406 to set the uppermost wavelength path of the wavelength path solution list. In addition, the IPv6 flow assignment/wavelength path routing calculation setting unit 604 controls the transmission function of the transmission source edge node of the flow such that the flow assigned to the uppermost wavelength path of the wavelength path solution list is transmitted by using the wavelength path. Furthermore, the IPv6 flow assignment/wavelength path routing calculation setting unit 604 controls the transfer function of the core node such that the flow assigned to the uppermost wavelength path of the wavelength path solution list is transferred to the destination edge node by using the wavelength path and deletes the uppermost wavelength path from the wavelength path solution list.

The IPv6 flow assignment/wavelength path routing calculation setting unit 604 repeatedly executes the above-described sorting of the IPv6 flow statistical information list to control of the core node until the wavelength path solution list becomes empty.

If it is determined that no transmission resource necessary for transmitting the wavelength path can be ensured in the transmission link on the calculated route, the IPv6 flow assignment/wavelength path routing calculation setting unit 604 excludes the uppermost wavelength path from the wavelength path solution list and adds it to the wavelength path candidate list.

With the above-described control, optimum assignment of IPv6 flows on the IPv6 network 476 to the wavelength paths on the photonic network 401 is calculated, and optimum routing of the wavelength paths on the photonic network 401 is calculated in consideration of the priority and band.

Figure 24:
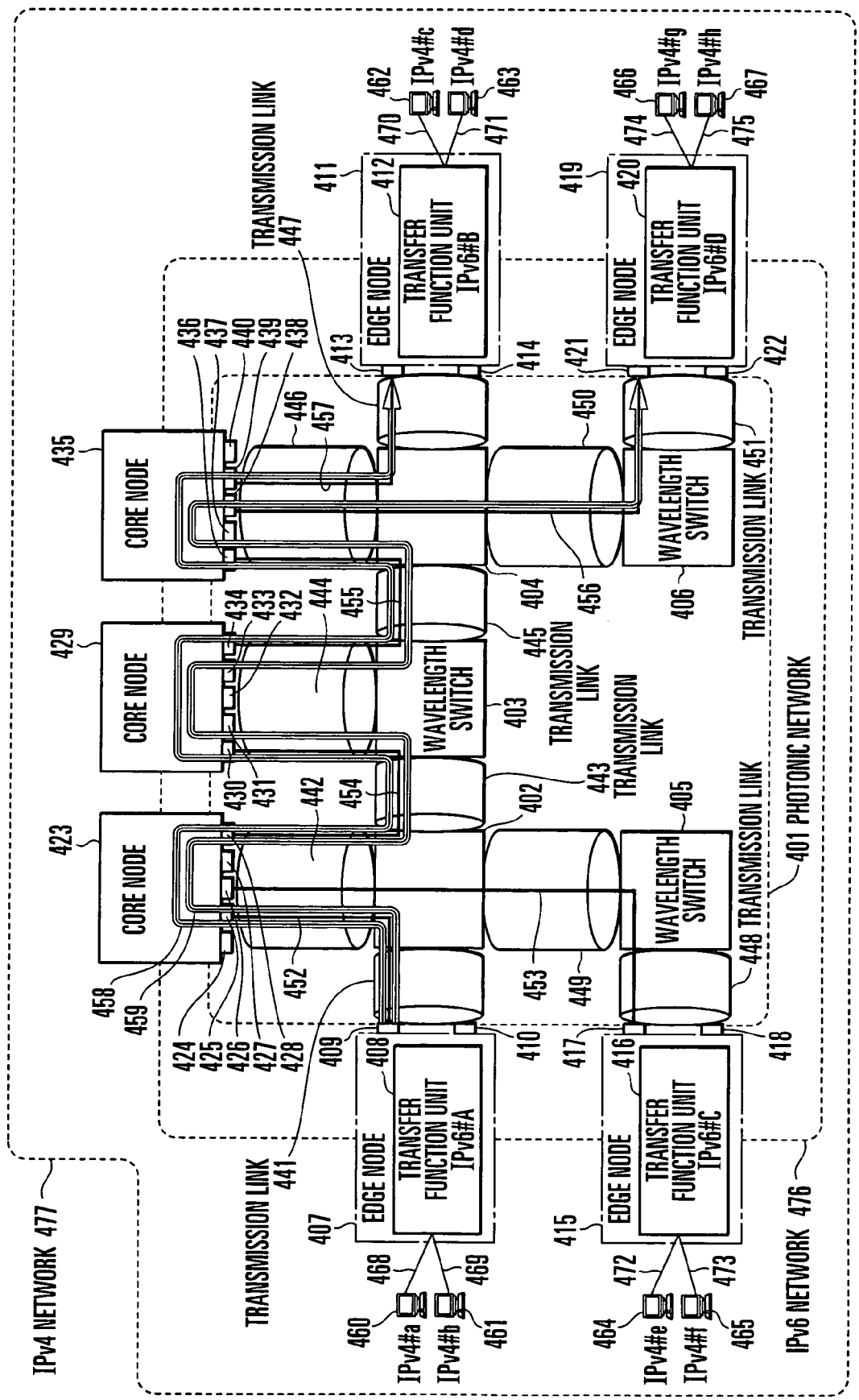
FIG. 24 is a view showing an example in which no cut-through optical path is set in the network model shown in FIG. 20.

An example in which no cut-through optical path is set will be described next. In the example shown in FIG. 24, since no cut-through optical path is set, all IPv6 routes between the edge nodes are transferred while hopping the closest core nodes. For example, an IPv6 route 458 from the edge node 407 to the edge node 411 is set to pass through the wavelength path 452, hop the core node 423, pass through the wavelength path 454, hop the core node 429, pass through the wavelength path 455, hop the core node 435, pass through the wavelength path 457, and reach the edge node 411. As described above, the wavelength path 452 uses the connection interface 409 of the edge node 407. The wavelength path 457 uses the connection interface 413 of the edge node 411.

An IPv6 route 459 from the edge node 407 to the edge node 419 is set to pass through the wavelength path 452, hop the core node 423, pass through the wavelength path 454, hop the core node 429, pass through the wavelength path 455, hop the core node 435, pass through the wavelength path 456, and reach the edge node 419. As described above, the wavelength path 456 uses the connection interface 421 of the edge node 419.

Figure 25:
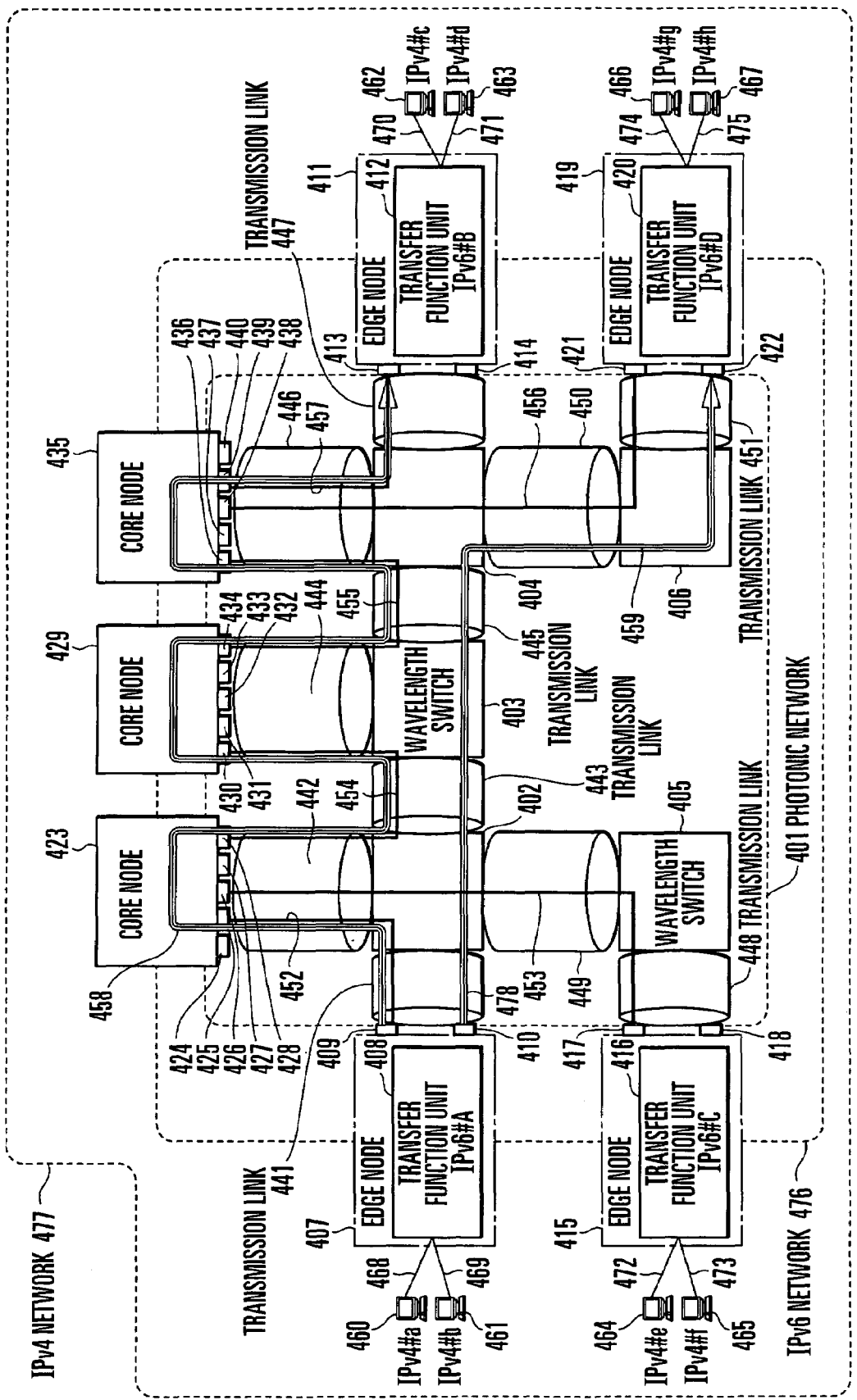
FIG. 25 is a view showing an example in which cut-through optical paths are set in the network model shown in FIG. 20 by a conventional technique.

Assume that the IPv6 route must bypass the core node 429 because it has congestion. FIG. 25 shows an example in which cut-through optical paths are set by a conventional technique on the basis of this assumption. In the conventional technique, a cut-through optical path is set between edge nodes. Referring to FIG. 25, first, to set the IPv6 route 459 through a cut-through optical path, the connection interface 410 of the edge node 407 and the connection interface 422 of the edge node 419 are connected by a wavelength path 478 by using the conventional technique. The IPv6 route 459 is set through the wavelength path 478.

Next, to set the IPv6 route 458 through a cut-through optical path, a cut-through optical path must be set between the edge node 407 and the edge node 411. However, since all connection interfaces of the edge node 407 are used, no cut-through optical path can be set, and the IPv6 route 458 is kept through the core node 429. For this reason, the congestion at the core node 429 cannot completely be avoided.

Figure 26:
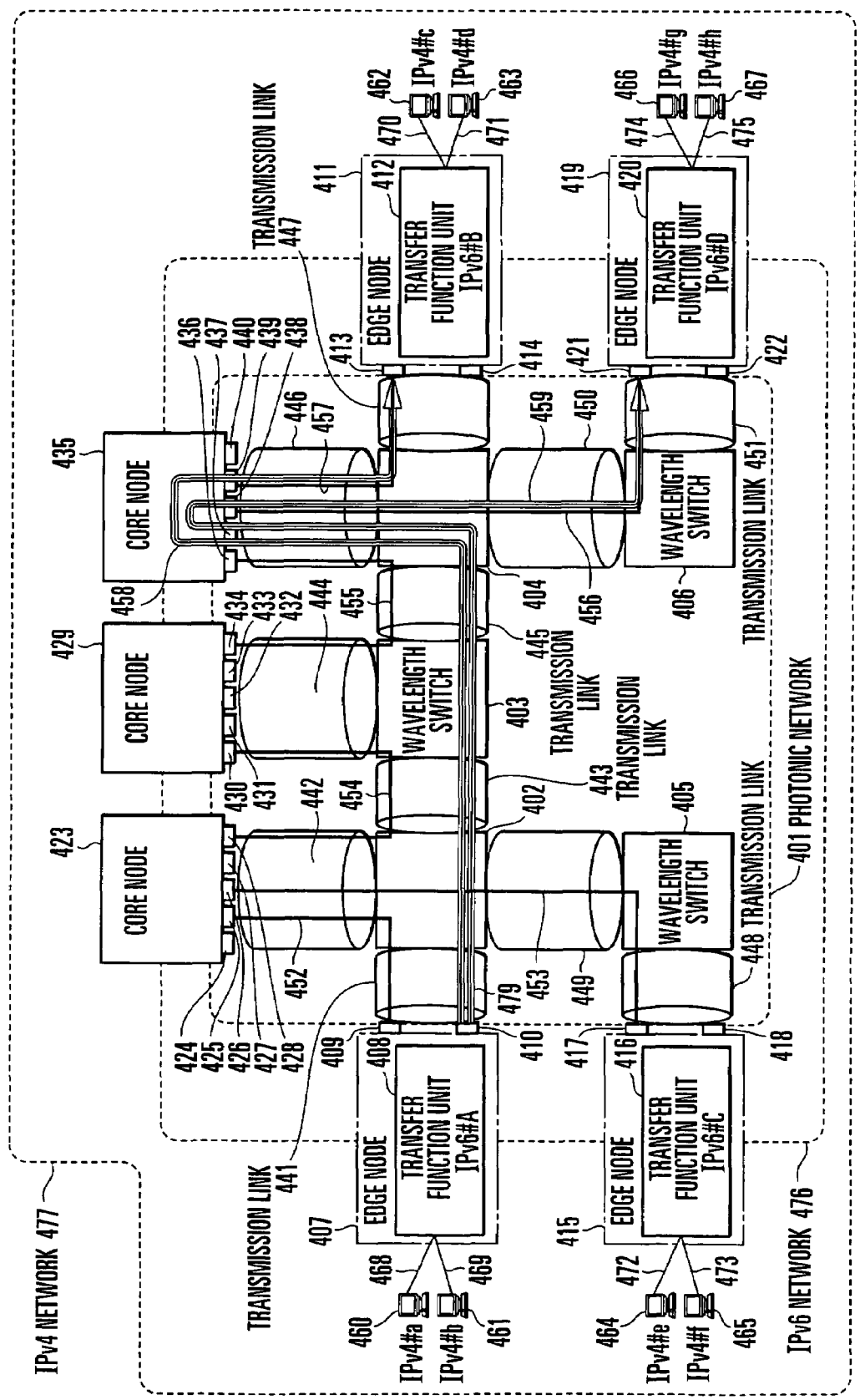
FIG. 26 is a view showing an example in which cut-through optical paths are set in the network model shown in FIG. 20 by the embodiment of the present invention.

FIG. 26 shows an example in which cut-through optical paths are set by the technique of this embodiment. In this embodiment, a cut-through optical path is set between an edge node and a core node.

In setting a wavelength path in the above-described way, the IPv6 flow assignment/wavelength path routing calculation setting unit 604 of the traffic control apparatus 502 selects, as the wavelength path setting target, a core node for which the number of wavelength switches arranged between the core node and the destination edge node of the flow assigned to the wavelength path is minimum (i.e., selects the core node closest to the destination edge node).

Subsequently, the IPv6 flow assignment/wavelength path routing calculation setting unit 604 sets the wavelength switching tables 515 to 519 of the wavelength switches 402 to 406 through the wavelength switch control unit 606 to set a wavelength path (first connection) between the transmission source edge node of the flow and the core node as the setting target. In addition, the IPv6 flow assignment/wavelength path routing calculation setting unit 604 sets a wavelength path (second connection) between the core node as the setting target and the destination edge node of the flow.

The IPv6 flow assignment/wavelength path routing calculation setting unit 604 sets the IPv6 transfer tables 523 to 526 of the edge nodes 407, 411, 415, and 419 through the edge node control unit 607 and controls the transmission function of the transmission source edge node such that the flow assigned to the wavelength path is transmitted by using the wavelength path set between the transmission source edge node and the core node as the setting target.

The IPv6 flow assignment/wavelength path routing calculation setting unit 604 sets the IPv6 transfer table of the core node as the setting target through the core node control unit 608 and controls the transfer function of the core node as the setting target such that the flow assigned to the wavelength path is transferred to the wavelength path set between the core node as the setting target and the destination edge node.

In the example shown in FIG. 26, first, to set the IPv6 route 459 through a cut-through optical path, the core node 435 closest to the destination edge node 419 is selected as the core node as the setting target. The traffic control apparatus 502 rewrites the wavelength switching tables 515 to 517 of the wavelength switches 402 to 404 to connect the connection interface 410 of the transmission source edge node 407 to the connection interface 437 of the core node 435 by the wavelength path 479. Since the wavelength path 456 is already set between the core node 435 and the destination edge node 419, no wavelength path need newly be set.

Next, the traffic control apparatus 502 rewrites the IPv6 transfer table 523 of the edge node 407, the IPv6 transfer table 522 of the core node 435, and the IPv6 transfer table 526 of the edge node 419 to set the IPv6 route 459 through the wavelength path 479, core node 435, and wavelength path 456. The transmission source edge node 407 transmits the packet addressed to the edge node 419 to the wavelength path 479 connected to the core node 435 in accordance with the IPv6 transfer table 523. The core node 435 checks the destination IPv6 address of the received packet and transfers it to the wavelength path 456 connected to the destination edge node 419 in accordance with the IPv6 transfer table 522. The destination edge node 419 receives the packet.

Assume that the IPv6 route 458 is set through a cut-through optical path. In this case, the core node 435 closest to the destination edge node 411 is selected as the core node as the setting target. The wavelength path 479 is already set between the transmission source edge node 407 and the core node 435. The wavelength path 457 is already set between the core node 435 and the destination edge node 411. Hence, no wavelength path need newly be set.

The traffic control apparatus 502 rewrites the IPv6 transfer table 522 of the core node 435 to set the IPv6 route 458 through the wavelength path 479, core node 435, and wavelength path 457. The transmission source edge node 407 transmits the packet addressed to the edge node 411 to the wavelength path 479 connected to the core node 435 in accordance with the IPv6 transfer table 523. The core node 435 checks the destination IPv6 address of the received packet and transfers it to the wavelength path 457 connected to the destination edge node 411 in accordance with the IPv6 transfer table 522. The destination edge node 411 receives the packet.

With the above-described control, the IPv6 routes 458 and 459 are set through the cut-through optical path which passes through the core node closest to the destination edge node. Even when the number of connection interfaces of the edge node is small, setting can be done while avoiding the core node 429 with congestion.

In this embodiment, by using the fact that the core node (electric P router) has connection interfaces more than the edge node (RE router), a cut-through optical path is set between the transmission source edge node ad the core node closest to the destination edge node. With this processing, the number of cut-through optical paths can be increased, and the number of core nodes with congestion can be minimized. With this technique, even when the number of edge nodes of the connectionless packet transfer network increases, and the number of connection interfaces of the edge node is small, the number of cut-through optical paths to be set to prevent congestion of the core nodes can be increased, and congestion of the core nodes can be avoided. Hence, the communication quality of the large-scale connectionless packet transfer network can be increased economically, and the transfer capacity can be increased economically.

The connection interface 414 of the edge node 411 and the connection interface 440 of the core node 435 are not used. Hence, the traffic control apparatus 502 can also rewrite the wavelength switching table 517 of the wavelength switch 404 to set a new wavelength path using the connection interfaces 414 and 440 between the core node 435 and the edge node 411 to reduce the load of the wavelength path 457.

Seventh Embodiment

The seventh embodiment of the present invention will be described next. The arrangement of the network model of this embodiment is the same as that of the sixth embodiment and will be described by using the same reference numerals as in FIGS. 20 to 23. In the sixth embodiment, only the core node closest to the destination edge node is selected as the wavelength path setting target. Even a core node closest to the transmission source edge node can also be selected as the wavelength path setting target.

Figure 27:
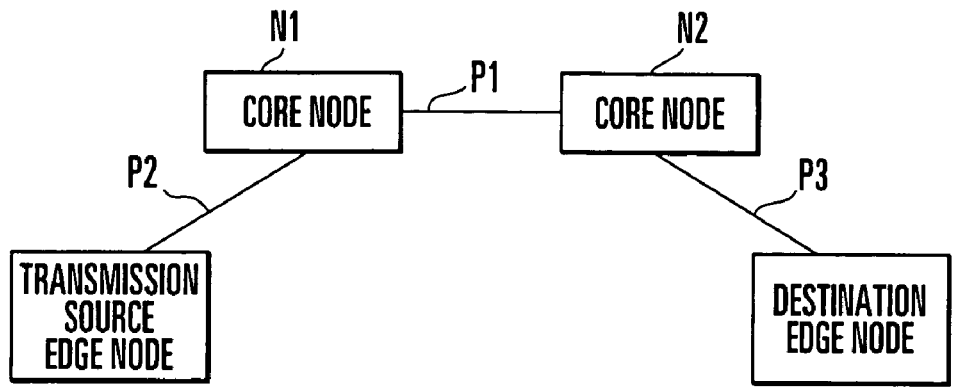
FIG. 27 is a block diagram showing connection setting according to the seventh embodiment of the present invention.

FIG. 27 shows connection setting according to this embodiment. FIG. 27 shows a simplified arrangement of the network shown in FIG. 20. In setting a wavelength path in the above-described way, an IPv6 flow assignment/wavelength path routing calculation setting unit 604 of a traffic control apparatus 502 selects, as a wavelength path setting target N1 (first setting target), a core node for which the number of wavelength switches arranged between the core node and the transmission source edge node of the flow assigned to the wavelength path is minimum. In addition, the IPv6 flow assignment/wavelength path routing calculation setting unit 604 selects the core node closest to the destination edge node as a wavelength path setting target N2 (second setting target), as in the sixth embodiment.

Subsequently, the IPv6 flow assignment/wavelength path routing calculation setting unit 604 sets wavelength switching tables 515 to 519 of wavelength switches 402 to 406 through a wavelength switch control unit 606 to set a wavelength path P1 (first connection) between the core node as the setting target N1 and the core node as the setting target N2. The IPv6 flow assignment/wavelength path routing calculation setting unit 604 sets a wavelength path P2 (second connection) between the transmission source edge node and the core node as the setting target N1 and a wavelength path P3 (third connection) between the core node as the setting target N2 and the destination edge node.

The IPv6 flow assignment/wavelength path routing calculation setting unit 604 sets IPv6 transfer tables 523 to 526 of edge nodes 407, 411, 415, and 419 through an edge node control unit 607 and controls the transmission function of the transmission source edge node such that the flow assigned to the wavelength path is transmitted by using the wavelength path P2 set between the transmission source edge node and the core node as the setting target N1.

The IPv6 flow assignment/wavelength path routing calculation setting unit 604 sets the IPv6 transfer table of the core node as the setting target N1 through a core node control unit 608 and controls the transfer function of the core node as the setting target N1 such that the flow assigned to the wavelength path is transferred to the wavelength path P1 set between the core node as the setting target N1 and the core node as the setting target N2.

The IPv6 flow assignment/wavelength path routing calculation setting unit 604 also sets the IPv6 transfer table of the core node as the setting target N2 through the core node control unit 608 and controls the transfer function of the core node as the setting target N2 such that the flow assigned to the wavelength path is transferred to the wavelength path P3 set between the core node as the setting target N2 and the destination edge node.

With the above-described wavelength path setting and control of the transmission source edge node and core nodes, the transmission source edge node transmits a packet to the wavelength path P2 connected to the core node as the setting target N1 in accordance with the IPv6 transfer table. The core node as the setting target N1 checks the destination IPv6 address of the received packet and transfers it to the wavelength path P1 connected to the core node as the setting target N2 in accordance with the IPv6 transfer table. The core node as the setting target N2 checks the destination IPv6 address of the received packet and transfers it to the wavelength path P3 connected to the destination edge node. The destination edge node receives the packet.

This embodiment is suitable for a network whose scale becomes large as the number of edge nodes increases as compared to the sixth embodiment though the number of connection interfaces of each edge node does not increase. As a detailed means, since the core node closest to the transmission source edge node and the core node closest to the packet processing unit are used as the two ends of the cut-through optical path P1, the number of connection interfaces which can be used by cut-through optical paths can be increased. As a result, the number of cut-through optical paths can be increased. Hence, congestion of a core node through which an IPv6 packet would have passed unless the cut-through optical path is set can be avoided.

Eighth Embodiment

The eighth embodiment of the present invention will be described next. The arrangement of the network model of this embodiment is the same as that of the sixth embodiment and will be described by using the same reference numerals as in FIGS. 20 to 23. In the seventh embodiment, the core node closest to the transmission source edge node and the core node closest to the destination edge node are connected directly by a connection. Another core node may be present between the core nodes.

Figure 28:
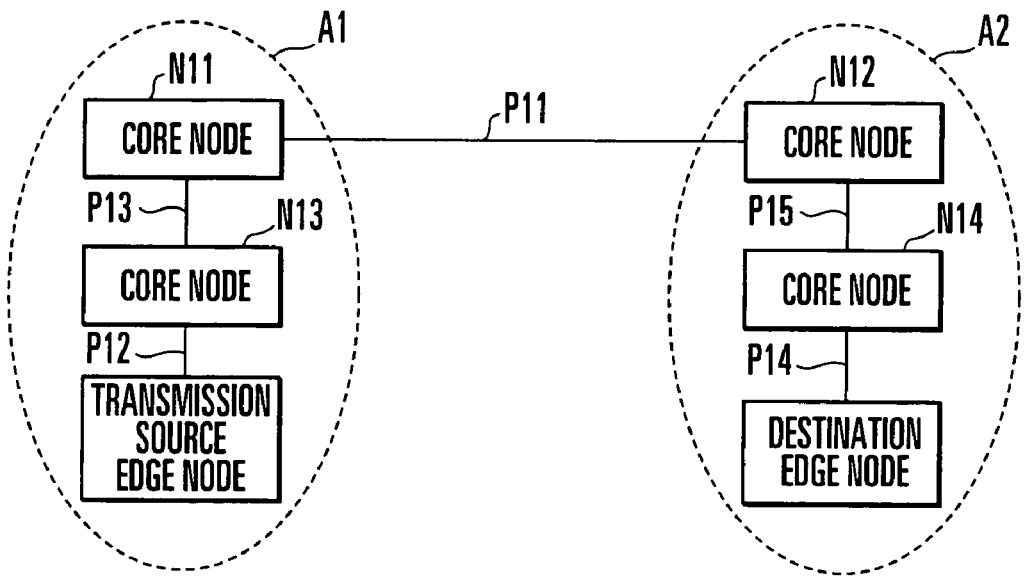
FIG. 28 is a block diagram showing connection setting according to the eighth embodiment of the present invention.

FIG. 28 shows connection setting according to this embodiment. FIG. 28 shows a simplified arrangement of the network shown in FIG. 20. In setting a wavelength path in the above-described way, an IPv6 flow assignment/wavelength path routing calculation setting unit 604 of a traffic control apparatus 502 selects, as a wavelength path setting target N1 (first setting target), a core node in an area A1 to which the transmission source edge node of the flow assigned to the wavelength path belongs. In addition, the IPv6 flow assignment/wavelength path routing calculation setting unit 604 selects, as a wavelength path setting target N12 (second setting target), a core node in an area A2 to which the destination edge node of the flow belongs.

The IPv6 flow assignment/wavelength path routing calculation setting unit 604 also selects the core node closest to the transmission source edge node as a wavelength path setting target N13 (third setting target) and the core node closest to the destination edge node as a wavelength path setting target N14 (fourth setting target), as in the seventh embodiment.

Subsequently, the IPv6 flow assignment/wavelength path routing calculation setting unit 604 sets wavelength switching tables 515 to 519 of wavelength switches 402 to 406 through a wavelength switch control unit 606 to set a wavelength path P11 (first connection) between the core node as the setting target N11 and the core node as the setting target N12, a wavelength path P12 (second connection) between the transmission source edge node and the core node as the setting target N13, a wavelength path P13 (third connection) between the core node as the setting target N13 and the core node as the setting target N11, a wavelength path P14 (fourth connection) between the core node as the setting target N14 and the destination edge node, and a wavelength path P14 (fifth connection) between the core node as the setting target N12 and the core node as the setting target N14.

The IPv6 flow assignment/wavelength path routing calculation setting unit 604 sets IPv6 transfer tables 523 to 526 of edge nodes 407, 411, 415, and 419 through an edge node control unit 607 and controls the transmission function of the transmission source edge node such that the flow assigned to the wavelength path is transmitted by using the wavelength path P12 set between the transmission source edge node and the core node as the setting target N13.

The IPv6 flow assignment/wavelength path routing calculation setting unit 604 sets the IPv6 transfer table of the core node as the setting target N13 through a core node control unit 608 and controls the transfer function of the core node as the setting target N13 such that the flow assigned to the wavelength path is transferred to the wavelength path P13 set between the core node as the setting target N13 and the core node as the setting target N11.

The IPv6 flow assignment/wavelength path routing calculation setting unit 604 also sets the IPv6 transfer table of the core node as the setting target N11 through the core node control unit 608 and controls the transfer function of the core node as the setting target N11 such that the flow assigned to the wavelength path is transferred to the wavelength path P11 set between the core node as the setting target N11 and the core node as the setting target N12.

The IPv6 flow assignment/wavelength path routing calculation setting unit 604 also sets the IPv6 transfer table of the core node as the setting target N12 through the core node control unit 608 and controls the transfer function of the core node as the setting target N12 such that the flow assigned to the wavelength path is transferred to the wavelength path P15 set between the core node as the setting target N12 and the core node as the setting target N14.

The IPv6 flow assignment/wavelength path routing calculation setting unit 604 also sets the IPv6 transfer table of the core node as the setting target N14 through the core node control unit 608 and controls the transfer function of the core node as the setting target N14 such that the flow assigned to the wavelength path is transferred to the wavelength path P14 set between the core node as the setting target N14 and the destination edge node.

With the above-described wavelength path setting and control of the transmission source edge node and core nodes, the transmission source edge node transmits a packet to the wavelength path P12 connected to the core node as the setting target N13 in accordance with the IPv6 transfer table. The core node as the setting target N13 checks the destination IPv6 address of the received packet and transfers it to the wavelength path P13 connected to the core node as the setting target N11 in accordance with the IPv6 transfer table. The core node as the setting target N11 checks the destination IPv6 address of the received packet and transfers it to the wavelength path P11 connected to the core node as the setting target N12 in accordance with the IPv6 transfer table.

The core node as the setting target N12 checks the destination IPv6 address of the received packet and transfers it to the wavelength path P15 connected to the core node as the setting target N14 in accordance with the IPv6 transfer table. The core node as the setting target N14 checks the destination IPv6 address of the received packet and transfers it to the wavelength path P14 connected to the destination edge node in accordance with the IPv6 transfer table. The destination edge node receives the packet.

This embodiment is suitable for a network whose scale becomes large as the number of edge nodes increases as compared to the seventh embodiment though the number of connection interfaces of each edge node does not increase. As a detailed means, the network is logically divided into areas containing an edge node and core nodes. After IPv6 routing is done in each area, a cut-through optical path is set between the core nodes in each area. Hence, a plurality of cut-through optical paths can be set between the areas, and the number of connection interfaces which can be used by cut-through optical paths can be increased. The number of settable cut-through optical paths equals the number of core nodes present in the area×the number of connection interfaces of the core node. As a result, the number of cut-through optical paths can be increased. Hence, congestion of a core node through which an IPv6 packet would have passed unless the cut-through optical path is set can be avoided.

Ninth Embodiment

In the eighth embodiment, as shown in FIG. 28, the core node as the setting target N13 and the core node as the setting target N11 are connected directly by a connection. Similarly, the core node as the setting target N14 and the core node as the setting target N12 are connected directly by a connection. Instead, core nodes belonging to the same area may be connected through at least one core node and connections.

Figure 29:
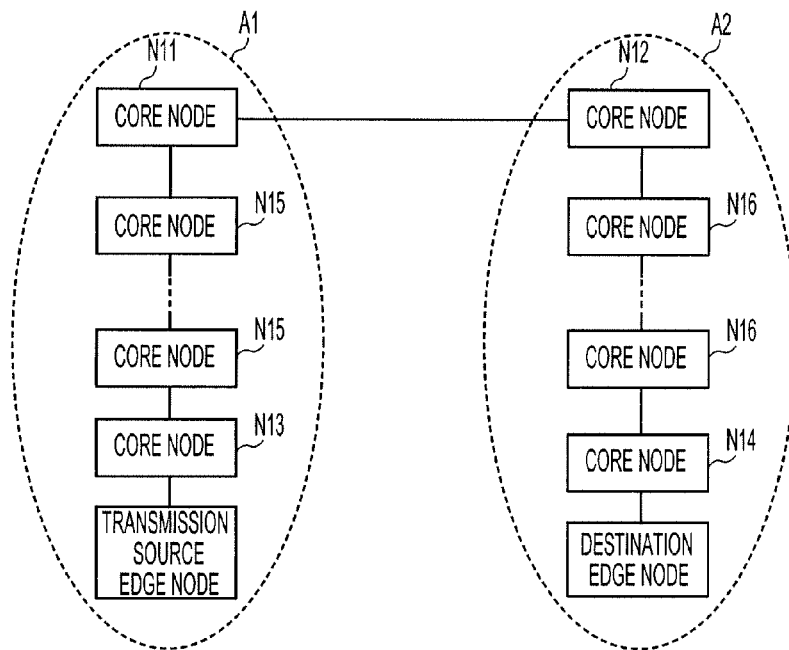
FIG. 29 is a block diagram showing connection setting according to the ninth embodiment of the present invention.

FIG. 29 is a block diagram showing connection setting according to this embodiment. The same reference numerals as in FIG. 28 denote the same components in FIG. 29. In the example shown in FIG. 29, a core node as a setting target N13 and a core node as a setting target N11, which belong to an area A1, are connected through a plurality of core nodes N15 and connections. In addition, a core node as a setting target N14 and a core node as a setting target N12, which belong to an area A2, are connected through a plurality of core nodes N16 and connections.

10th Embodiment

In the sixth to ninth embodiments, each core node may record the band of a flow as statistical information for each flow defined by a pair of a transmission source address and destination address for each transmitted/received packet and notify the traffic control apparatus 502 of the recorded statistical information. For example, a core node receives notification interval setting from the traffic control apparatus 502 and executes recording and notification of statistical information at the notification interval.

A statistical information collection unit 601 of a traffic control apparatus 502 collects statistical information from core nodes and transmits the collected information to a statistical information management unit 602. The statistical information management unit 602 analyzes the information collected from the core nodes and creates/updates a flow list. Each entry of the flow list includes a transmission source IPv6 address, destination IPv6 address, and IPv6 flow band. The flow list is sent to an IPv6 flow assignment/wavelength path routing calculation setting unit 604.

The IPv6 flow assignment/wavelength path routing calculation setting unit 604 determines a wavelength path to be set by the method described in the sixth embodiment. In setting the wavelength path, when a core node for which the sum of the bands of pass flows exceeds a predetermined threshold value is detected by the flow list, the wavelength path is set without passing through the core node.

In this embodiment, since the threshold value of the band is set, connections can be set such that congestion is actively avoided in accordance with the traffic state.

INDUSTRIAL APPLICABILITY

The present invention can be applied to a packet transfer network system.

The invention claimed is:

1. A packet communication method using a plurality of packet transfer apparatuses which are connected to a network and transfer a lower layer frame containing an encapsulated upper layer packet, at least one frame transfer apparatus which mediates transfer of the lower layer frame between the plurality of packet transfer apparatuses through the network, and a network control server which is connected to each of the plurality of packet transfer apparatuses and said at least one frame transfer apparatus and controls a communication route of the lower layer frame in the network by giving an instruction to the plurality of packet transfer apparatuses and said at least one frame transfer apparatus, wherein each of the plurality of packet transfer apparatuses comprises an extraction procedure which extracts, from a received lower layer frame, a lower layer address pair including a transmission source address and a destination address of a lower layer, a first registration procedure which registers a sending destination of the received lower layer frame in a first table for each corresponding destination address, a first counter procedure which counts, for each type of lower layer address pair, a quantity of the lower layer address pairs extracted by the extraction procedure, and a first transmission procedure which transmits, to said at least one frame transfer apparatus, first information representing each lower layer address pair counted by the first counter procedure beyond a predetermined threshold value within a predetermined time, the at least one frame transfer apparatus comprises a second registration procedure which registers the sending destination of the received lower layer frame in a second table for each destination address contained in the lower layer frame, a second counter procedure which counts a quantity of transferred lower layer frames for each type of lower layer address pair contained in the first information received from the packet transfer apparatus, and a second transmission procedure which transmits, to the network control server, second information about each lower layer address pair counted by the second counter procedure beyond a predetermined threshold value within a predetermined time, and the network control server comprises a calculation procedure which, upon receiving the second information, extracts the transmission source address and the destination address from the second information and executes calculation to optimize the communication route in the network between the transmission source address and the destination address, and a change procedure which changes registration of the sending destination of the received lower layer frame, registered in the first table and the second table, on the basis of the calculation result.

2. A packet communication method according to claim 1, wherein, when transmitting the first information to the frame transfer apparatus, said first transmission procedure transmits information about the destination address to a transmission source address of each lower layer address pair contained in the first information, the transmitted information about the destination address including information contained in the frame information of the received lower layer frame, and information about a destination address of an upper layer corresponding to the destination address from the frame information; and among said plurality of packet transfer apparatuses, one packet transfer apparatus, having the transmission source address, receives said lower layer destination address and said upper layer destination address, and rewrites said first table based on the received lower layer destination address and the received upper layer destination address.

3. A packet communication method according to claim 1, further comprising in a connectionless packet transfer network which is logically built on a connection network, a notification procedure executed by a connectionless packet communication terminal which records statistical information containing a band and priority for each flow defined by a transmission source address and destination address for a packet transmitted/received in the connectionless packet communication terminal and notifies a traffic control apparatus serving as a network control server of the recorded statistical information, and a flow list creation procedure executed by said traffic control apparatus which creates a flow list in which information containing the transmission source address, destination address, priority, and band is registered for each flow, on the basis of the statistical information sent from the connectionless packet communication terminal.

4. A packet communication method according to claim 3, further comprising a flow list sorting procedure which sorts the flow list in descending order of priority and sorts flows with the same priority in descending order of band, and a connection candidate list creation procedure which, assuming that a connection is set between a transmission source connectionless packet communication terminal and a destination connectionless packet communication terminal of each flow registered in the sorted flow list, creates a connection candidate list by assigning a connection candidate for all flows sequentially from an uppermost flow in the flow list.

5. A packet communication method according to claim 3, wherein a connection candidate list creation procedure creates a connection candidate list by assigning not less than one flow having the same transmission source connectionless packet communication terminal, the same destination connectionless packet communication terminal, and the same priority to the same connection candidate without making a sum of bands exceed a capacity of the connection candidate and determining the priority and band of the connection candidate on the basis of the priority and the sum of the bands of assigned flows.

6. A packet communication method according to claim 4, further comprising a connection candidate list sorting procedure which sorts the connection candidate list in descending order of priority and sorts connection candidates with the same priority in descending order of band, and a reservation procedure which reserves a connection interface of the connectionless packet communication terminal for all connection candidates contained in the sorted connection candidate list sequentially from an uppermost connection candidate in the sorted connection candidate list.

7. A packet communication method according to claim 6, further comprising a selection procedure which selects, on the basis of the connection candidate list sorted by the connection candidate list sorting procedure, a connection requiring no setting from a connection solution list in which connections to be set are registered, a comparison procedure which sets, as a connection candidate as a processing target, a connection candidate for which reservation is possible in the sorted connection candidate list and compares the priority and band of the connection candidate as the processing target with those of the selected connection, a connection solution list creation/update procedure which, when the priority and band of the connection candidate as the processing target are more than those of the selected connection, excludes the connection candidate as the processing target from the connection candidate list and adds the connection candidate as the processing target to the connection solution list, and excludes the selected connection from the connection solution list and adds the selected connection to the connection candidate list, and a taboo connection list registration procedure which, when the priority and band of the connection candidate as the processing target are not more than those of the selected connection, registers the connection candidate as the processing target in a taboo connection list, wherein the comparison procedure sets, of the connection candidates for which reservation is possible, an uppermost connection candidate which is not registered in the taboo connection list as the connection candidate as the processing target.

8. A packet communication method according to claim 6, further comprising a selection procedure which selects, on the basis of the connection candidate list sorted by the connection candidate list sorting procedure, a connection requiring no setting from a connection solution list in which connections to be set are registered, a comparison procedure which sets, as a connection candidate as a processing target, a connection candidate for which reservation is possible in the sorted connection candidate list and compares the priority and band of the connection candidate as the processing target with those of the selected connection, a connection solution list creation/update procedure which, when the priority and band of the connection candidate as the processing target are more than those of the selected connection, excludes the connection candidate as the processing target from the connection candidate list and adds the connection candidate as the processing target to the connection solution list, and excludes the selected connection from the connection solution list and adds the selected connection to the connection candidate list, a taboo connection list registration procedure which records the connection candidate as the processing target in a taboo connection list together with the current number of times of execution of the comparison procedure, and a taboo connection list delete procedure which deletes, from the taboo connection list, a connection candidate recorded together with the number of times of execution which is smaller than the current number of times of execution of the comparison procedure by not less than a predetermined number, wherein the comparison procedure sets, of the connection candidates for which reservation is possible, an uppermost connection candidate which is not registered in the taboo connection list as the connection candidate as the processing target.

9. A packet communication method according to claim 7, further comprising a route calculation procedure which calculates a route when the uppermost connection in the connection solution list between the transmission source connectionless packet communication terminal and the destination connectionless packet communication terminal, a connection setting procedure which, when a transmission resource necessary for transmitting the uppermost connection can be ensured in a transmission link on the calculated route, controls the switching function of the connection switch node to set the uppermost connection, controls the transmission function of the transmission source connectionless packet communication terminal of the flow to transmit the flow assigned to the uppermost connection by using the connection, and excludes the uppermost connection from the connection solution list, and a connection solution list delete procedure which, when the transmission resource cannot be ensured, excludes the uppermost connection from the connection solution list and adds the uppermost connection to the connection candidate list.

10. A packet communication method according to claim 8, further comprising a route calculation procedure which calculates a route when the uppermost connection in the connection solution list between the transmission source connectionless packet communication terminal and the destination connectionless packet communication terminal, a connection setting procedure which, when a transmission resource necessary for transmitting the uppermost connection can be ensured in a transmission link on the calculated route, controls the switching function of the connection switch node to set the uppermost connection, controls the transmission function of the transmission source connectionless packet communication terminal of the flow to transmit the flow assigned to the uppermost connection by using the connection, and excludes the uppermost connection from the connection solution list, and a connection solution list delete procedure which, when the transmission resource cannot be ensured, excludes the uppermost connection from the connection solution list and adds the uppermost connection to the connection candidate list.

11. A packet communication method according to claim 9, wherein when the connection solution list is empty, when the connection interface cannot be reserved for any of the connection candidates registered in the connection candidate list, or when the transmission resource cannot be ensured for any of the connections registered in the connection solution list, one of a series of procedures including:

the flow list sorting procedure, the connection candidate list creation procedure, the connection candidate list sorting procedure, the reservation procedure, the selection procedure, the comparison procedure, the connection solution list creation/update procedure, the taboo connection list registration procedure, the route calculation procedure, the connection setting procedure, and the connection solution list delete procedure, and a series of procedures including:

the flow list sorting procedure, the connection candidate list creation procedure, the connection candidate list sorting procedure, the reservation procedure, the selection procedure, the comparison procedure, the connection solution list creation/update procedure, the taboo connection list registration procedure, the taboo connection list delete procedure, the route calculation procedure, the connection setting procedure, and the connection solution list delete procedure is ended.

12. A packet communication method according to claim 10, wherein when the connection solution list is empty, when the connection interface cannot be reserved for any of the connection candidates registered in the connection candidate list, or when the transmission resource cannot be ensured for any of the connections registered in the connection solution list, one of a series of procedures including:

the flow list sorting procedure, the connection candidate list creation procedure, the connection candidate list sorting procedure, the reservation procedure, the selection procedure, the comparison procedure, the connection solution list creation/update procedure, the taboo connection list registration procedure, the route calculation procedure, the connection setting procedure, and the connection solution list delete procedure, and a series of procedures including the flow list sorting procedure, the connection candidate list creation procedure, the connection candidate list sorting procedure, the reservation procedure, the selection procedure, the comparison procedure, the connection solution list creation/update procedure, the taboo connection list registration procedure, the taboo connection list delete procedure, the route calculation procedure, the connection setting procedure, and the connection solution list delete procedure is ended.

13. A packet communication method according to claim 3, further comprising a notification interval setting procedure which causes the traffic control apparatus to set a notification interval of the statistical information for the connectionless packet communication terminal, wherein the notification procedure records the statistical information, sent from the connectionless packet communication terminal, at the set notification interval and notifies the traffic control apparatus of the statistical information, and the flow list creation procedure updates the flow list on the basis of the statistical information sent from the connectionless packet communication terminal.

14. A packet communication method according to claim 3, further comprising a threshold value setting procedure which causes the traffic control apparatus to set a threshold value of the band for each flow for the connectionless packet communication terminal, wherein the notification procedure records the statistical information for each flow for the received packet, and when the band of the recorded flow exceeds the set threshold value, notifies the traffic control apparatus of the statistical information of the flow whose band exceeds the threshold value, and the flow list creation procedure updates the flow list on the basis of the statistical information sent from the connectionless packet communication terminal.

15. A packet communication method according to claim 1, further comprising
- in a connectionless packet transfer network which is logically build on a connection network comprising a transmission link having a connection multiplex transmission function and a connection switch node having a connection switching function by adding, as a terminal function unit, a connectionless packet transfer node serving as the frame transfer apparatus and a connectionless packet communication terminal serving as the packet transfer apparatus to the connection network, when communication is to be executed between the connectionless packet communication terminals,
- a transfer node selection procedure which selects, as a connection setting target, a connectionless packet transfer node for which the number of connection switch nodes arranged between the connectionless packet transfer node and a destination connectionless packet communication terminal to receive a packet is minimum,
- a first connection setting procedure which causes a control apparatus serving as the network control server to control the connection switch node to set a first connection between a transmission source connectionless packet communication terminal to transmit the packet and the connectionless packet transfer node as the setting target, and
- a second connection setting procedure which causes the control apparatus to control the connection switch node to set a second connection between the connectionless packet transfer node as the setting target and the destination connectionless packet communication terminal.

16. A packet communication method according to claim 15, further comprising
- a transmission setting procedure which causes the control apparatus to control the transmission source connectionless packet communication terminal to transmit the packet from the transmission source connectionless packet communication terminal to the destination connectionless packet communication terminal by using the first connection, and
- a transfer setting procedure which causes the control apparatus to control the connectionless packet transfer node as the setting target to transfer, to the second connection, the packet from the transmission source connectionless packet communication terminal to the destination connectionless packet communication terminal.

17. A packet communication method according to claim 1, further comprising
- in a connectionless packet transfer network which is logically built on a connection network comprising a transmission link having a connection multiplex transmission function and a connection switch node having a connection switching function by adding, as a terminal function unit, a connectionless packet transfer node serving as the frame transfer apparatus and a connectionless packet communication terminal serving as the packet transfer apparatus to the connection network, when communication is to be executed between the connectionless packet communication terminals,
- a first transfer node selection procedure which selects, as a first connection setting target, a connectionless packet transfer node for which the number of connection switch nodes arranged between the connectionless packet transfer node and a transmission source connectionless packet communication terminal to transmit a packet is minimum,
- a second transfer node selection procedure which selects, as a second connection setting target, a connectionless packet transfer node for which the number of connection switch nodes arranged between the connectionless packet transfer node and a destination connectionless packet communication terminal to receive the packet is minimum,
- a first connection setting procedure which causes a control apparatus serving as the network control server to control the connection switch node to set a first connection between the connectionless packet transfer node as the first connection setting target and the connectionless packet transfer node as the second connection setting target,
- a second connection setting procedure which causes the control apparatus to control the connection switch node to set a second connection between the transmission source connectionless packet communication terminal and the connectionless packet transfer node as the first connection setting target, and
- a third connection setting procedure which causes the control apparatus to control the connection switch node to set a third connection between the connectionless packet transfer node as the second connection setting target and the destination connectionless packet communication terminal.

18. A packet communication method according to claim 17, further comprising
- a transmission setting procedure which causes the control apparatus to control the transmission source connectionless packet communication terminal to transmit the packet from the transmission source connectionless packet communication terminal to the destination connectionless packet communication terminal by using the second connection,
- a first transfer setting procedure which causes the control apparatus to control the connectionless packet transfer node as the first transfer setting target to transfer, to the first connection, the packet from the transmission source connectionless packet communication terminal to the destination connectionless packet communication terminal, and
- a second transfer setting procedure which causes the control apparatus to control the connectionless packet transfer node as the second transfer setting target to transfer, to the third connection, the packet from the transmission source connectionless packet communication terminal to the destination connectionless packet communication terminal.

19. A packet communication method according to claim 1, further comprising
- in a connectionless packet transfer network which is logically built on a connection network comprising a transmission link having a connection multiplex transmission function and a connection switch node having a connection switching function by adding, as a terminal function unit, a connectionless packet transfer node serving as the frame transfer apparatus and at least one connectionless packet communication terminal serving as the packet transfer apparatus to the connection network, when communication is to be executed between connectionless packet communication terminals,
- a first transfer node selection procedure which selects, as a first connection setting target, a connectionless packet transfer node in a first area to which a transmission source connectionless packet communication terminal to transmit a packet belongs, a second transfer node selection procedure which selects, as a second connection setting target, a connectionless packet transfer node in a second area to which a destination connectionless packet communication terminal to receive the packet belongs, a third transfer node selection procedure which selects, as a third connection setting target, a connectionless packet transfer node for which the number of connection switch nodes arranged between the connectionless packet transfer node and the transmission source connectionless packet communication terminal is minimum, a fourth transfer node selection procedure which selects, as a fourth connection setting target, a connectionless packet transfer node for which the number of connection switch nodes arranged between the connectionless packet transfer node and the destination connectionless packet communication terminal is minimum, a first connection setting procedure which causes a control apparatus serving as the network control server to control the connection switch node to set a first connection between the connectionless packet transfer node as the first connection setting target and the connectionless packet transfer node as the second connection setting target, a second connection setting procedure which causes the control apparatus to control the connection switch node to set a second connection between the transmission source connectionless packet communication terminal and the connectionless packet transfer node as the third connection setting target, a third connection setting procedure which causes the control apparatus to control the connection switch node to set a third connection between the connectionless packet transfer node as the third connection setting target and the connectionless packet transfer node as the first connection setting target, a fourth connection setting procedure which causes the control apparatus to control the connection switch node to set a fourth connection between the connectionless packet transfer node as the fourth connection setting target and the destination connectionless packet communication terminal, and a fifth connection setting procedure which causes the control apparatus to control the connection switch node to set a fifth connection between the connectionless packet transfer node as the second connection setting target and the connectionless packet transfer node as the fourth connection setting target.

20. A packet communication method according to claim 19, further comprising a transmission setting procedure which causes the control apparatus to control the transmission source connectionless packet communication terminal to transmit the packet from the transmission source connectionless packet communication terminal to the destination connectionless packet communication terminal by using the second connection, a first transfer setting procedure which causes the control apparatus to control the connectionless packet transfer node as the third transfer setting target to transfer, to the third connection, the packet from the transmission source connectionless packet communication terminal to the destination connectionless packet communication terminal, a second transfer setting procedure which causes the control apparatus to control the connectionless packet transfer node as the first transfer setting target to transfer, to the first connection, the packet from the transmission source connectionless packet communication terminal to the destination connectionless packet communication terminal, a third transfer setting procedure which causes the control apparatus to control the connectionless packet transfer node as the second transfer setting target to transfer, to the fifth connection, the packet from the transmission source connectionless packet communication terminal to the destination connectionless packet communication terminal, and a fourth transfer setting procedure which causes the control apparatus to control the connectionless packet transfer node as the fourth transfer setting target to transfer, to the fourth connection, the packet from the transmission source connectionless packet communication terminal to the destination connectionless packet communication terminal.

21. A packet communication method according to claim 19, wherein the connectionless packet transfer node as the third connection setting target and the connectionless packet transfer node as the first connection setting target, which are present in the first area, are connected through a plurality of connectionless packet transfer nodes and connections present in the first area, and the connectionless packet transfer node as the fourth connection setting target and the connectionless packet transfer node as the second connection setting target, which are present in the second area, are connected through a plurality of connectionless packet transfer nodes and connections present in the second area.

22. A packet communication method according to claim 15, further comprising a notification procedure which records, as statistical information, a band of each flow defined by a pair of the transmission source address and destination address for the packet transmitted/received in the connectionless packet transfer node and notifies the control apparatus of the recorded statistical information, and a flow list creation procedure which causes the control apparatus to create a flow list in which information containing the transmission source address, destination address, and band is registered for each flow, on the basis of the statistical information sent from the connectionless packet transfer node, wherein when a connectionless packet transfer node for which a sum of bands of pass flows exceeds a predetermined threshold value is detected by the flow list in setting the connection, a connection which does not pass through the connectionless packet transfer node is set.

23. A packet communication method according to claim 17, further comprising a notification procedure which records, as statistical information, a band of each flow defined by a pair of the transmission source address and destination address for the packet transmitted/received in the connectionless packet transfer node and notifies the control apparatus of the recorded statistical information, and a flow list creation procedure which causes the control apparatus to create a flow list in which information containing the transmission source address, destination address, and band is registered for each flow, on the basis of the statistical information sent from the connectionless packet transfer node, wherein when a connectionless packet transfer node for which a sum of bands of pass flows exceeds a predetermined threshold value is detected by the flow list in setting the connection, a connection which does not pass through the connectionless packet transfer node is set.

24. A packet communication method according to claim 19, further comprising a notification procedure which records, as statistical information, a band of each flow defined by a pair of the transmission source address and destination address for the packet transmitted/received in the connectionless packet transfer node and notifies the control apparatus of the recorded statistical information, and a flow list creation procedure which causes the control apparatus to create a flow list in which information containing the transmission source address, destination address, and band is registered for each flow, on the basis of the statistical information sent from the connectionless packet transfer node, wherein when a connectionless packet transfer node for which a sum of bands of pass flows exceeds a predetermined threshold value is detected by the flow list in setting the connection, a connection which does not pass through the connectionless packet transfer node is set.

* * * * *